United States Patent
Hamaoka et al.

(10) Patent No.: US 11,108,468 B2
(45) Date of Patent: Aug. 31, 2021

(54) OPTICAL TRANSMITTER, OPTICAL RECEIVER AND COMMUNICATION SYSTEM

(71) Applicant: NIPPON TELEGRAPH AND TELEPHONE CORPORATION, Tokyo (JP)

(72) Inventors: Fukutaro Hamaoka, Yokosuka (JP); Masanori Nakamura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/635,130

(22) PCT Filed: Aug. 6, 2018

(86) PCT No.: PCT/JP2018/029400
§ 371 (c)(1),
(2) Date: Jan. 29, 2020

(87) PCT Pub. No.: WO2019/031447
PCT Pub. Date: Feb. 14, 2019

(65) Prior Publication Data
US 2020/0162167 A1 May 21, 2020

(30) Foreign Application Priority Data

Aug. 8, 2017 (JP) .............................. JP2017-153281
Aug. 8, 2017 (JP) .............................. JP2017-153282

(51) Int. Cl.
*H04B 10/50* (2013.01)
*H04B 10/556* (2013.01)
(Continued)

(52) U.S. Cl.
CPC ....... *H04B 10/5561* (2013.01); *H04B 10/532* (2013.01); *H04B 10/616* (2013.01); *H04B 10/50* (2013.01); *H04B 10/60* (2013.01)

(58) Field of Classification Search
CPC .............. H04B 10/5561; H04B 10/532; H04B 10/616; H04B 10/516; H04B 10/61; H04B 10/50; H04B 10/60; H04B 10/548
(Continued)

(56) References Cited

U.S. PATENT DOCUMENTS 7,149,434 B2 * 12/2006 Butman ............ H04B 10/2507
398/185
9,112,608 B2 8/2015 Bai et al.
(Continued)

FOREIGN PATENT DOCUMENTS

EP 3343778 A1 7/2018
JP 2005-328327 A 11/2005
(Continued)

OTHER PUBLICATIONS

Joe Berthold, 100G Ultra Long Haul DWDM Framework Document (Jun. 2009), OIF(Optical Internetworking Forum).
(Continued)

*Primary Examiner* — Dibson J Sanchez
(74) *Attorney, Agent, or Firm* — Harness, Dickey & Pierce, P.L.C.

(57) ABSTRACT

An optical transmitter includes a first narrowband signal processing unit, a wideband signal generation unit, and an optical modulator. The first narrowband signal generation unit is configured to input a first signal and a second signal and output first, second, third and fourth narrowband signals. The wideband signal generation unit is configured to multiply the first and second narrowband signals by sinusoidal signals having a phase difference of ($\pi/2$), respec-
(Continued)

tively, to shift bands of the first and second narrowband signals, and combine the shifted first and second narrowband signal to generate a first wideband signal. The wideband signal generation unit is configured to multiply the third and fourth narrowband signal by sinusoidal signals having a phase difference of ($\pi/2$), respectively, to shift bands of the third and fourth narrowband signals, and combine the shifted third and fourth narrowband signals to generate a second wideband signal.

10 Claims, 39 Drawing Sheets

(51) Int. Cl.
   *H04B 10/532* (2013.01)
   *H04B 10/61* (2013.01)
   *H04B 10/60* (2013.01)

(58) Field of Classification Search
   USPC .................................. 398/140–172, 182–214
   See application file for complete search history.

(56) References Cited

U.S. PATENT DOCUMENTS

| | | | | |
|---|---|---|---|---|
| 2001/0014594 | A1* | 8/2001 | Khlat | H03D 7/166 455/303 |
| 2005/0036789 | A1* | 2/2005 | Bjorndahl | H04B 10/801 398/118 |
| 2006/0057996 | A1* | 3/2006 | Petrovic | H03L 7/087 455/260 |
| 2008/0240221 | A1* | 10/2008 | Morris | H04L 7/0029 375/232 |
| 2009/0290659 | A1* | 11/2009 | Petrovic | H04N 7/20 375/340 |
| 2013/0183921 | A1* | 7/2013 | Mu | H04B 1/06 455/326 |
| 2016/0126893 | A1* | 5/2016 | Sundstrom | H03D 7/14 327/355 |
| 2016/0149666 | A1* | 5/2016 | Tanimura | H04B 10/112 398/152 |
| 2016/0323040 | A1 | 11/2016 | Wood | |

FOREIGN PATENT DOCUMENTS

| | | |
|---|---|---|
| JP | 2011004264 A | 1/2011 |
| JP | 2012528523 A | 11/2012 |
| JP | 2014233039 A | 12/2014 |
| WO | WO-2012071558 A1 | 5/2012 |
| WO | WO-2015075895 A1 | 5/2015 |
| WO | WO-2017/033446 A1 | 3/2017 |

OTHER PUBLICATIONS

Hiroshi Yamazaki et al., Discrete Multitone Transmission at Net Data Rate of 250 Gb/s Using Digital-Preprocessed Analog-Multiplexed DAC with Halved Clock Frequency and Suppressed Image, Journal of Lightwave Technology, vol. 15, No. 7, 2017, pp. 1300 to 1306.

Hiroshi Yamazaki et al., Digital-Preprocessed Analog-Multiplexed DAC for Ultrawideband Multilevel Transmitter, Journal of Lightwave Technology, vol. 34, No. 7, 2015, pp. 1579 to 1584.

International Search Report (in English and Japanese) issued in PCT/JP2018/029400, dated Oct. 23, 2018; ISA/JP.

Japanese Notice of Allowance from counterpart JP2019535646, dated Jun. 2, 2020.

* cited by examiner

FIG. 36

Wideband signal-to-narrowband signal conversion unit 2042, with frequency shifter 2421.

Inputs: $I_x(t)$, $Q_x(t)$, $I_y(t)$, $Q_y(t)$

Outputs:
- $I_{x0}(t)$
- $I'_{x1}(t) = I_{x1}(t) + I_{x2}(t)$
- $Q'_{x1}(t) = -Q_{x1}(t) + Q_{x2}(t)$
- $Q_{x0}(t)$
- $I'_{x2}(t) = I_{x1}(t) - I_{x2}(t)$
- $Q'_{x2}(t) = Q_{x1}(t) + Q_{x2}(t)$
- $I_{y0}(t)$
- $I'_{y1}(t) = I_{y1}(t) + I_{y2}(t)$
- $Q'_{y1}(t) = -Q_{y1}(t) + Q_{y2}(t)$
- $Q_{y0}(t)$
- $I'_{y2}(t) = I_{y1}(t) - I_{y2}(t)$
- $Q'_{y2}(t) = Q_{y1}(t) + Q_{y2}(t)$ Mixers use $\cos(\omega t)$ and $\sin(\omega t)$, followed by LPF blocks.

OPTICAL TRANSMITTER, OPTICAL RECEIVER AND COMMUNICATION SYSTEM

CROSS-REFERENCE TO RELATED APPLICATIONS

This application is a 371 National Stage of International Application No. PCT/JP2018/029400, filed on Aug. 6, 2018, which claims priority to Japanese Application No. 2017-153281, filed on Aug. 8, 2017 and Japanese Application No. 2017-153282, filed on Aug. 8, 2017. The entire disclosures of the above applications are incorporated herein by reference.

The present invention relates to an optical transmitter, an optical receiver, and a communication system.

BACKGROUND ART

In a backbone network of optical communication systems, there has been a demand for the increase in a transmission capacity per channel due to the increase in communication traffic in recent years and the increase in a capacity of lines for accommodating client signals including those of 400 gigabits per second (Gbps) and 1 terabit per second (Tbps) Ethernet (registered trademark). In a current system having a capacity of 100 Gbps per channel, a modulation speed is 32 GBaud, and a digital coherent optical transmission scheme using dual polarization-quadrature phase shift keying (DP-QPSK) is adopted as a modulation scheme (for example, Non-Patent Document 1).

Development of an efficient network configuration, an advanced digital modulation/demodulation system, optical/electronic devices operable at a high speed, and the like are being conducted as elemental technologies for increasing the capacity and functionality of such systems. For example, in the field of a transmission side circuit of a communication device, many studies for performing processes such as advanced multi-level modulation and waveform shaping are being conducted at the digital signal level using a digital signal processor (DSP) which is a processor specialized in digital signal processing.

CITATION LIST

Non-Patent Literature

[Non-Patent Document 1]
Joe Berthold et.al, "100G Ultra Long Haul DWDM Framework Document", OIF (OPTICAL INTERNETWORKING FORUM), Jun. 30, 2009.

SUMMARY OF INVENTION

Technical Problem

In the introduction of such digital signal processing technology using a DSP, a digital-to-analog converter (DAC) operable at a high speed for converting a digital signal generated by the DSP into a high-speed analog signal is indispensable. Also, an analog-to-digital converter (ADC) operable at a high speed for converting a received analog signal into a digital signal is indispensable. However, a DAC and an ADC produced using current complementary metal oxide semiconductor (CMOS) platforms have an input/output band of about 30 GHz (Hertz), which is insufficient for increasing a transmission capacity. The increase in the modulation speed is limited due to the bandwidth shortage of input/output of the DAC and the ADC. Therefore, the bandwidth shortage is a bottleneck in implementing an increase in a transmission capacity in a communication system.

The present invention has been made in view of the above-described circumstances and an objective of the present invention is to provide an optical transmitter, an optical receiver, and a communication system in which a transmission capacity can be increased easily with a simple configuration.

Solution to Problem

According to a $1^{st}$ aspect of the present invention, an optical transmitter includes a first narrowband signal processing unit configured to input a first signal and a second signal and output first, second, third and fourth narrowband signals, the first narrowband signal representing a sum of in-phase components of the first and second signals, the second narrowband signal representing a difference between quadrature components of the first and second signals, the third narrowband signal representing a difference between the in-phase components of the first and second signals, and the fourth narrowband signal representing a sum of the quadrature components of the first and second signals;

a wideband signal generation unit configured to multiply the first and second narrowband signals by sinusoidal signals having a phase difference of ($\pi/2$), respectively, to shift bands of the first and second narrowband signals, and combine the shifted first and second narrowband signal to generate a first wideband signal, the wideband signal generation unit being configured to multiply the third and fourth narrowband signal by sinusoidal signals having a phase difference of ($\pi/2$), respectively, to shift bands of the third and fourth narrowband signals, and combine the shifted third and fourth narrowband signals to generate a second wideband signal; and an optical modulator configured to modulate an optical signal using the first and second wideband signals and output the modulated optical signal.

According to a $2^{nd}$ aspect of the present invention, the optical transmitter according to the $1^{st}$ aspect further includes a band division unit configured to divide a band of a signal obtained by modulating a transmission data sequence and output a third signal corresponding to a band included in an upper sideband among bands obtained by the division and a fourth signal corresponding to a band included in a lower sideband among the bands obtained by the division; and a digital-to-analog converter configured to convert the third and fourth signals from digital signals to analog signals to generate the first and second signals.

According to a $3^{rd}$ aspect of the present invention, the optical transmitter according to the $1^{st}$ aspect further includes:

a band division unit configured to divide a band of a signal obtained by modulating a transmission data sequence, output a signal corresponding to a band included in an upper sideband among bands obtained by the division as the first signal, and output a signal corresponding to a band included in a lower sideband among the bands obtained by the division as the second signal; and a digital-to-analog converter configured to convert the first, second, third, and fourth narrowband signals from digital signals to analog signal, and output the first, second, third, and fourth narrowband signals that have been converted into analog signals to the wideband signal generation unit.

According to a 4$^{th}$ aspect of the present invention, in the optical transmitter according to the 2$^{nd}$ or 3$^{rd}$ aspect, the signal obtained by modulating the transmission data sequence has only an in-phase component or a quadrature component.

According a 5$^{th}$ aspect of the present invention, the optical transmitter according to the 1$^{st}$ aspect further includes:

a first digital signal processing unit configured to convert a signal obtained by modulating a first transmission data sequence from digital signal to analog signal to generate the first signal; and a second digital signal processing unit configured to convert a signal obtained by modulating a second transmission data sequence from digital signal to analog signal to generate the second signal.

According a 6$^{th}$ aspect of the present invention, in the optical transmitter according to any one of the 1$^{st}$ to 5$^{th}$ aspects, the optical modulator is configured to perform polarization multiplexing on an optically modulated signal subjected to modulation using the first and second wideband signals with another optically modulated signal and outputs a polarization-multiplexed signal.

According to a 7$^{th}$ aspect of the present invention, an optical receiver includes a reception unit configured to receive an optically modulated signal and output a wideband signal obtained from the optically modulated signal;

a first signal conversion unit configured to divide a band of the wideband signal and output fifth, sixth, seventh and eighth narrowband signals, the fifth narrowband signal representing a sum of in-phase components of a fifth signal corresponding to a band included in an upper sideband among bands obtained by the division and a sixth signal corresponding to a band included in a lower sideband, the sixth narrowband signal representing a difference between quadrature components of the fifth and sixth signals, the seventh narrowband signal representing a difference between the in-phase components of the fifth and sixth signals, and the eighth narrowband signal representing a sum of the quadrature components of the fifth and sixth signals; and a second narrowband signal processing unit configured to generate a seventh signal representing the in-phase components of the fifth and sixth signals according to addition and subtraction processes of the fifth narrowband signal and the seventh narrowband signal and generate an eighth signal representing the quadrature components of the fifth and sixth signals according to addition and subtraction processes of the sixth narrowband signal and the eighth narrowband signal.

According to an 8$^{th}$ aspect of the present invention, the optical receiver according to the 7$^{th}$ aspect further includes an analog-to-digital converter configured to convert the seventh and eighth signals from analog signals to digital signals.

According to a 9$^{th}$ aspect of the present invention, the optical receiver according to the 7$^{th}$ aspect further includes an analog-to-digital converter configured to convert the fifth, sixth, seventh, and eighth narrowband signals from analog signals to digital signals, and output the fifth, sixth, seventh, and eighth narrowband signals that have been converted into digital signals to the second narrowband signal processing unit.

According to a 10$^{th}$ aspect of the present invention, in the optical receiver according to any one of the 7$^{th}$ to 9$^{th}$ aspects, the reception unit is configured to acquire the optically modulated signal from a plurality of optically modulated signals that are polarization-multiplexed.

According to an 11$^{th}$ aspect of the present invention, a communication system includes an optical transmitter according to any one of the 1$^{st}$ to 6$^{th}$ aspects; and an optical receiver according to any one of the 7$^{th}$ to 10$^{th}$ aspects, wherein the reception unit is configured to receive an output of the optical modulator as the optically modulated signal.

According to a 12$^{th}$ aspect of the present invention, an optical transmitter includes a band division unit configured to divide a first wideband signal into a plurality of narrowband signals and frequency-shift the plurality of narrowband signals obtained by the division; a narrowband signal processing unit configured to perform at least one of addition and subtraction processes on the plurality of narrowband signals obtained by the division of the band division unit; a digital-to-analog conversion unit configured to convert the plurality of narrowband signals on which the at least one of the addition and subtraction processes has been performed by the narrowband signal processing unit into analog signals; a wideband signal generation unit configured to generate a second wideband signal by frequency-shifting a plurality of analog signals obtained by the conversion of the digital-to-analog conversion unit and performing an addition process on a plurality of analog signals that have been frequency-shifted; and a transmission unit configured to output the second wideband signal generated by the wideband signal generation unit.

According to a 13$^{th}$ aspect of the present invention, the optical transmitter according to the 12$^{th}$ aspect includes a signal generation unit configured to generate the first wideband signal in which either an in-phase component or a quadrature component of a digital signal is set to 0 and output the first wideband signal to the band division unit.

According to a 14$^{th}$ aspect of the present invention, an optical transmitter includes a band division unit configured to divide a first wideband signal into a plurality of narrowband signals and frequency-shift the plurality of narrowband signals obtained by the division; a digital-to-analog conversion unit configured to convert the plurality of narrowband signals obtained by the division of the band division unit into analog signals; a narrowband signal processing unit configured to perform at least one of addition and subtraction processes on the plurality of narrowband signals converted into the analog signals by the digital-to-analog conversion unit; a wideband signal generation unit configured to generate a second wideband signal by frequency-shifting the plurality of narrowband signals on which the at least one of the addition and subtraction processes has been performed by the narrowband signal processing unit and performing an addition process on a plurality of analog signals that have been frequency-shifted; and a transmission unit configured to output the second wideband signal generated by the wideband signal generation unit.

According to a 15$^{th}$ aspect of the present invention, an optical transmitter includes a narrowband signal processing unit configured to acquire a plurality of narrowband signals and perform at least one of addition and subtraction processes on the plurality of narrowband signals that have been acquired; a wideband signal generation unit configured to generate a wideband signal by frequency-shifting the plurality of narrowband signals on which the at least one of the addition and subtraction processes has been performed by the narrowband signal processing unit and performing an addition process on a plurality of analog signals that have been frequency-shifted; and a transmission unit configured to output the wideband signal generated by the wideband signal generation unit.

According to a 16$^{th}$ aspect of the present invention, in the optical transmitter according to the 12$^{th}$ aspect, the narrowband signal, the first wideband signal, and the second wideband signal are polarization-multiplexed signals.

According to a 17$^{th}$ aspect of the present invention, in the optical transmitter according to the 15$^{th}$ aspect, the narrowband signal and the wideband signal are polarization-multiplexed signals.

According to an 18$^{th}$ aspect of the present invention, in the optical transmitter according to any one of the 12$^{th}$ to 16$^{th}$ aspects, the plurality of narrowband signals are an upper sideband signal and a lower sideband signal.

According to a 19$^{th}$ aspect of the present invention, an optical receiver includes a reception unit configured to receive a first wideband signal; a wideband signal-to-narrowband signal conversion unit configured to divide the first wideband signal received by the reception unit into a plurality of wideband signals and frequency-shift the plurality of wideband signals obtained by the division to form narrowband signals; a narrowband signal processing unit configured to perform at least one of addition and subtraction processes on a plurality of narrowband signals obtained by the division of the wideband signal-to-narrowband signal conversion unit; an analog-to-digital conversion unit configured to convert the plurality of narrowband signals on which the at least one of the addition and subtraction processes has been performed by the narrowband signal processing unit into digital signals; and a narrowband signal-to-wideband signal conversion unit configured to frequency-shift a plurality of digital signals obtained by the conversion of the analog-to-digital conversion unit and perform conversion into a second wideband signal by performing an addition process on the plurality of digital signals that have been frequency-shifted.

According to a 20$^{th}$ aspect of the present invention, an optical receiver includes a reception unit configured to receive a first wideband signal; a wideband signal-to-narrowband signal conversion unit configured to divide the first wideband signal received by the reception unit into a plurality of wideband signals and frequency-shift the plurality of wideband signals obtained by the division to form narrowband signals; an analog-to-digital conversion unit configured to convert a plurality of narrowband signals obtained by the division of the wideband signal-to-narrowband signal conversion unit into digital signals; a narrowband signal processing unit configured to perform at least one of addition and subtraction processes on a plurality of digital signals obtained by the conversion of the analog-to-digital conversion unit; and a narrowband signal-to-wideband signal conversion unit configured to frequency-shift the plurality of digital signals on which the at least one of the addition and subtraction processes has been performed by the narrowband signal processing unit and perform conversion into a second wideband signal by performing an addition process on the plurality of digital signals that have been frequency-shifted.

According to a 21$^{st}$ aspect of the present invention, in the optical receiver according to a 19$^{th}$ or 20$^{th}$ aspect, the plurality of narrowband signals are an upper sideband signal and a lower sideband signal.

According to a 22$^{nd}$ aspect of the present invention, in the optical receiver according to a 19$^{th}$ or 21$^{st}$ aspect, the narrowband signal, the first wideband signal and the second wideband signal are polarization-multiplexed signals.

According to a 23$^{rd}$ of the present invention, an optical receiver includes a reception unit configured to receive a wideband signal including a plurality of independent narrowband signals; a wideband signal-to-narrowband signal conversion unit configured to divide the wideband signal received by the reception unit into a plurality of wideband signals and perform division into a plurality of independent narrowband signals by frequency-shifting the plurality of wideband signals obtained by the division; a narrowband signal processing unit configured to perform at least one of addition and subtraction processes on the plurality of independent narrowband signals obtained by the division of the wideband signal-to-narrowband signal conversion unit; and an analog-to-digital conversion unit configured to convert the plurality of independent narrowband signals on which the at least one of the addition and subtraction processes has been performed by the narrowband signal processing unit into a plurality of digital signals.

According to a 24$^{th}$ of the present invention, in the optical receiver according to the 23$^{rd}$ aspect, the narrowband signal and the wideband signal are polarization-multiplexed signals.

Advantageous Effects of Invention

According to the present invention, it is possible to provide an optical transmitter, an optical receiver, and a communication system in which a transmission capacity can be increased easily with a simple configuration.

BRIEF DESCRIPTION OF DRAWINGS

FIG. 36 is a diagram showing a configuration of a wideband signal-to-narrowband signal conversion unit of the optical receiver according to the eleventh embodiment of the present invention.

DESCRIPTION OF EMBODIMENTS

First Embodiment

Hereinafter, a first embodiment of the present invention will be described.

[Configuration of Optical Transmitter]

Figure 1:
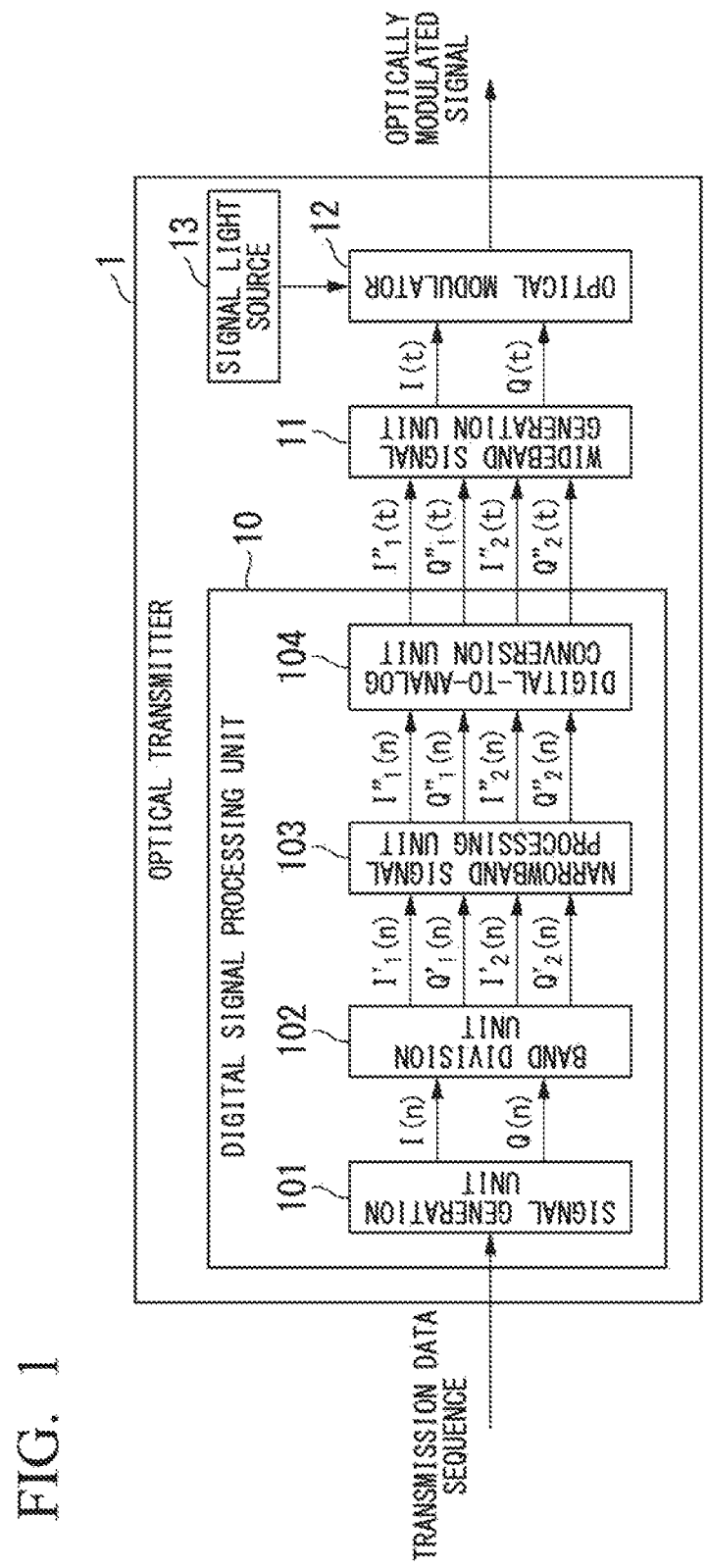
FIG. 1 is a diagram showing a configuration of an optical transmitter according to a first embodiment of the present invention.

FIG. 1 is a diagram showing a configuration of an optical transmitter 1 according to the first embodiment of the present invention.

As shown in FIG. 1, the optical transmitter 1 according to the first embodiment includes a digital signal processing unit 10, a wideband signal generation unit 11, an optical modulator 12, and a signal light source 13. The digital signal processing unit 10 includes a signal generation unit 101, a band division unit 102, a narrowband signal processing unit 103, and a digital-to-analog conversion unit 104.

The signal generation unit 101 generates modulation signal sequences (I(n), Q(n)) that are high-speed signals (wideband signals) from a transmission data sequence that includes binary information. The signal generation unit 101 outputs the generated modulated signal sequences (I(n), Q(n)) to the band division unit 102.

The band division unit 102 divides the input signals that are the modulation signal sequences (I(n), Q(n)) input from the signal generation unit 101 into signals of an upper sideband and a lower sideband and shifts the bands of the signals. The band division unit 102 outputs the frequency-shifted upper sideband signals that are narrowband signals ($I_1'(n)$, $Q_1'(n)$) and the frequency-shifted lower sideband signals that are narrowband signals ($I_2'(n)$, $Q_2'(n)$) to the narrowband signal processing unit 103.

The narrowband signal processing unit 103 receives the upper sideband signals and the lower sideband signals from the band division unit 102, and performs at least one of addition and subtraction processes on the upper sideband signals and the lower sideband signal. The narrowband signal processing unit 103 outputs narrowband signals ($I_1''(n)$, $Q_1''(n)$) and ($I_2''(n)$, $Q_2''(n)$) obtained by performing at least one of addition and subtraction processes to the digital-to-analog conversion unit 104.

The digital-to-analog conversion unit 104 converts the narrowband signals input from the narrowband signal processing unit 103 into analog signals. The digital-to-analog conversion unit 104 outputs the analog signals ($I_1''(t)$, $Q_1''(t)$) and ($I_2''(t)$, $Q_2''(t)$) obtained by the conversion to the wideband signal generation unit 11.

The wideband signal generation unit 11 shifts the band of each of the plurality of analog signals input from the digital-to-analog conversion unit 104. The wideband signal generation unit 11 performs an addition process on the plurality of analog signals of which the band has been shifted and generates wideband signals. The wideband signal generation unit 11 outputs the generated wideband signals ($I(t)$, $Q(t)$) to the optical modulator 12.

The optical transmitter 1 may include a driver amplifier configured to amplify an analog signal in a stage previous to the wideband signal generation unit 11. Alternatively, the wideband signal generation unit 11 may include a driver amplifier configured to amplify an analog signal input from the digital-to-analog conversion unit 104.

The optical modulator 12 as a transmission unit modulates an optical signal serving as carrier waves output from the signal light source 13 with the wideband signal input from the wideband signal generation unit 11 to generate an optically modulated signal. The optical modulator 12 outputs the optically modulated signal that has been generated.

Also, the optical transmitter 1 may include a driver amplifier configured to amplify a wideband signal in a stage previous to the optical modulator 12. Alternatively, the wideband signal generation unit 11 may include a driver amplifier configured to amplify a wideband signal to be output to the optical modulator 12.

[Configuration of Signal Generation Unit]

The signal generation unit 101 includes a bit mapping unit (not shown) and a digital waveform generation unit (not shown).

For example, the bit mapping unit allocates transmission bits of a transmission data sequence that is binary information to symbol points of a modulation format such as quadrature phase shift keying (QPSK) or 16 quadrature amplitude modulation (16QAM).

The digital waveform generation unit performs a sampling rate conversion process, a filtering process using a raised cosine filter, a root raised cosine filter, or the like. The digital waveform generation unit further performs a modulation process such as frequency division multiplexing (FDM), orthogonal FDM (OFDM), or discrete multi-tone modulation (DMT) when a transmission signal is a multi-carrier signal.

The signal generation unit 101 may further include a digital waveform pre-equalization unit configured to perform any equalization process such as wavelength dispersion pre-compensation, non-linear optical effect pre-compensation, or frequency characteristic pre-compensation.

[Configuration of Band Division Unit]

Figure 2:
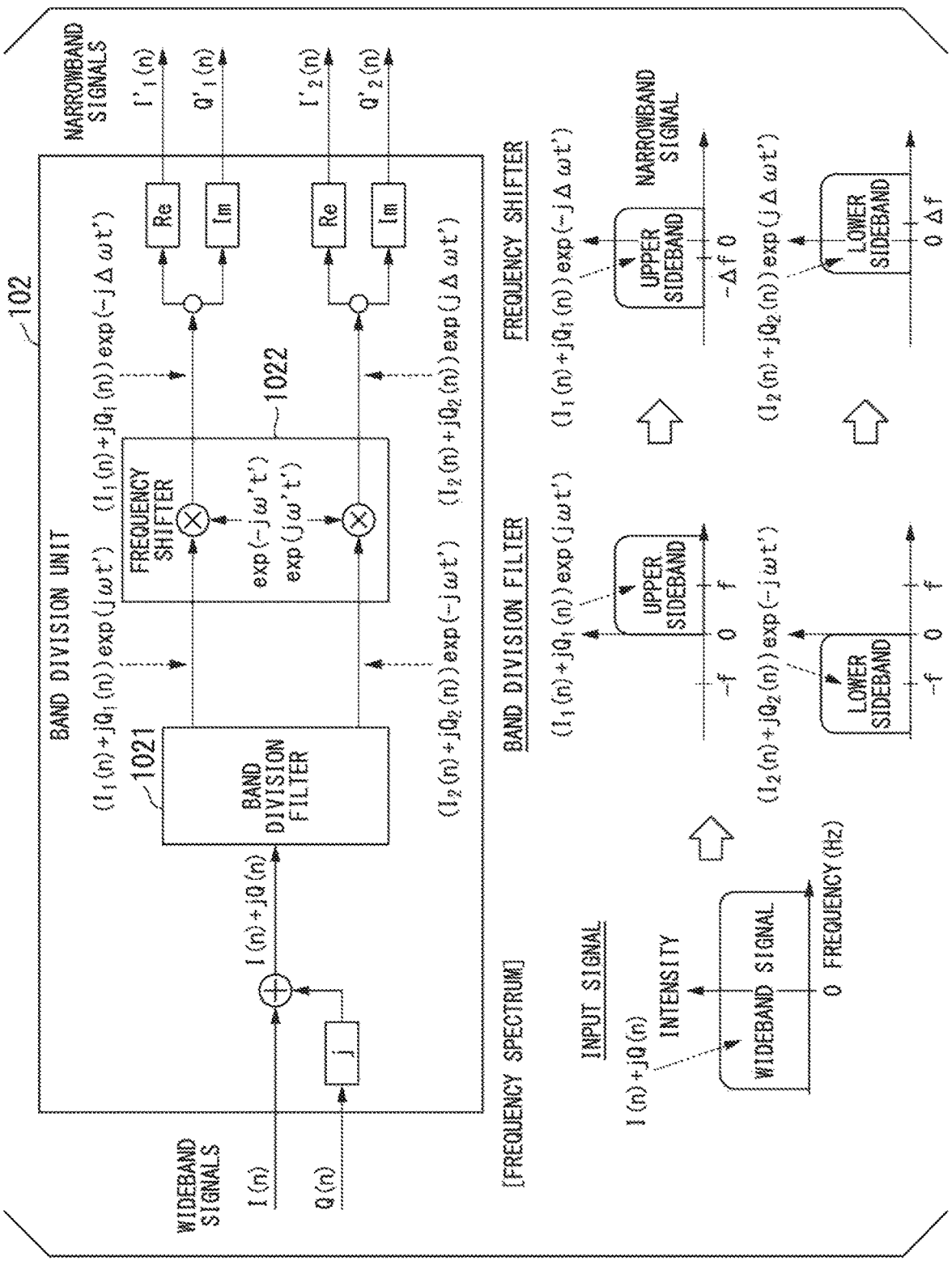
FIG. 2 is a diagram showing a configuration of a band division unit of the optical transmitter according to the first embodiment of the present invention.

FIG. 2 is a diagram showing a configuration of the band division unit 102 of the optical transmitter 1 according to the first embodiment of the present invention. The band division unit 102 treats modulated signal sequences ($I(n)$, $Q(n)$), which is input signals (wideband signals), input from the signal generation unit 101 as a complex digital signal ($I(n)+jQ(n)$).

As shown in FIG. 2, the band division unit 102 includes a band division filter 1021 and a frequency shifter 1022.

The band division filter 1021 divides the input signal (the wideband signal) input from the signal generation unit 101 into an upper sideband signal and a lower sideband signal. The band division filter 1021 outputs the upper sideband signal ($I_1(n)+jQ_1(n))\exp(j\omega')$ and the lower sideband signal ($I_2(n)+jQ_2(n))\exp(-j\omega t')$) obtained by the division to the frequency shifter 1022.

The frequency shifter 1022 shifts the bands of the upper sideband signal and the lower sideband signal input from the band division filter 1021 by a frequency $-f'=-(f+\Delta f)$ and a frequency $f'=f+\Delta f$, respectively. The frequency shifts using the frequencies $-f'$ and $f'$ correspond to calculations of multiplying by sinusoidal signals $\exp(-j\omega't)$ and $\exp(j\omega't)$, respectively. According to these frequency shifts, the frequency shifter 1022 sets the input upper and lower sideband signals as narrowband signals (($I_1(n)+jQ_1(n))\exp(-j\Delta\omega t')$ and ($I_2(n)+jQ_2(n))\exp(j\Delta\omega t')$). That is, the frequency shifter 1022 shifts center frequencies of the upper sideband signal and the lower sideband signal so that the center frequencies are close to 0 Hz and lowers maximum frequencies of the upper sideband signal and the lower sideband signal. The maximum frequencies of the upper sideband signal and the lower sideband signal are lowered, and therefore the upper sideband signal and the lower sideband signal are converted into narrowband signals, respectively. The frequencies $-f'$ and $f'$ may be determined in accordance with the allowable bandwidth of the digital-to-analog converter used in the subsequent stage. The allowable bandwidth is represented by the sampling frequency of the digital-to-analog converter.

The frequency shifter 1022 outputs real parts (Re) $I_1'(n)$ and $I_2'(n)$ and imaginary parts (Im) $Q_1'(n)$ and $Q_2'(n)$, which are the frequency-shifted narrowband signals, to the narrowband signal processing unit 103.

Also, in the above, $t'=nT$: discrete time (s (seconds)) ($n=1, 2, 3, \ldots$), $T=1/fs$: sampling period (s (seconds)), $fs$: sampling frequency (Hz), $j$: imaginary unit, $\omega=2\pi f$ (rad/s), $f=b/4$ (Hz), $b$: baud rate (baud=1/s), $\omega'=2\pi f'=2\pi(f+\Delta f)=\omega+\Delta\omega$, $\Delta\omega=\omega'-\omega$, Re: real part, Im: imaginary part.

Also, although the band division unit 102 treats an in-phase (I) component and a quadrature (Q) component of the digital signal as a complex digital signal in the above-described process, the present invention is not limited thereto. The band division unit 102 may treat IQ signal components as independent signals and performs a calculation process corresponding to complex number calculation.

Also, when the optical transmitter includes a digital signal processing device including a field-programmable gate array (FPGA) or an application specific integrated circuit (ASIC), the device may treat IQ signal components as independent signals as described above.

[Configuration of Band Division Filter]

Figure 3:
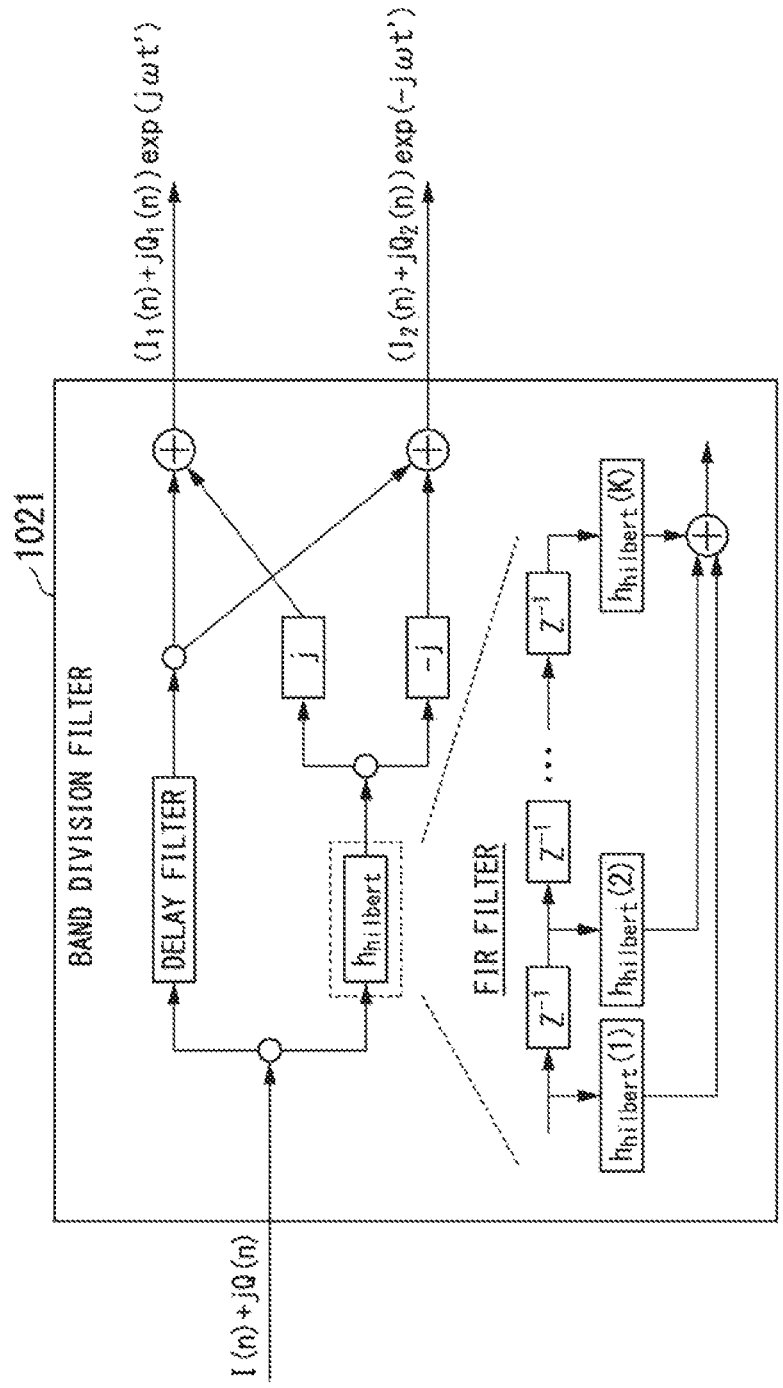
FIG. 3 is a diagram showing a configuration of a band division filter of the band division unit of the optical transmitter according to the first embodiment of the present invention.

FIG. 3 is a diagram showing a configuration of the band division filter 1021 of the band division unit 102 of the optical transmitter 1 according to the first embodiment of the present invention.

The band division filter 1021 includes a band pass filter configured to pass only positive and negative frequency components.

The band division filter 1021 shown in FIG. 3 has a configuration using a Hilbert transform as a band pass filter. The band division filter 1021 may have a configuration in which any other means is used.

The term "$h_{hilbert}$" represents a tap coefficient (a transfer function) for a Hilbert transform. The delay filter delays the input signal by the same amount of delay as an amount of delay that occurs in a finite impulse response (FIR) filter configured to perform the Hilbert transform. Also, the band division filter 1021 may include a delay correction filter in a stage subsequent to the FIR filter for the Hilbert transform.

In a time domain, a process performed by the FIR filter corresponds to convolution calculation. The convolution calculation in the time domain corresponds to a product of the frequency domain. Consequently, a band division filter may include, instead of an FIR filter, a configuration in which the tap coefficient and the input signal are respectively subjected to a fast Fourier transform (FFT) and multiplied, and then subjected to an inverse FFT (IFFT).

Figure 4:
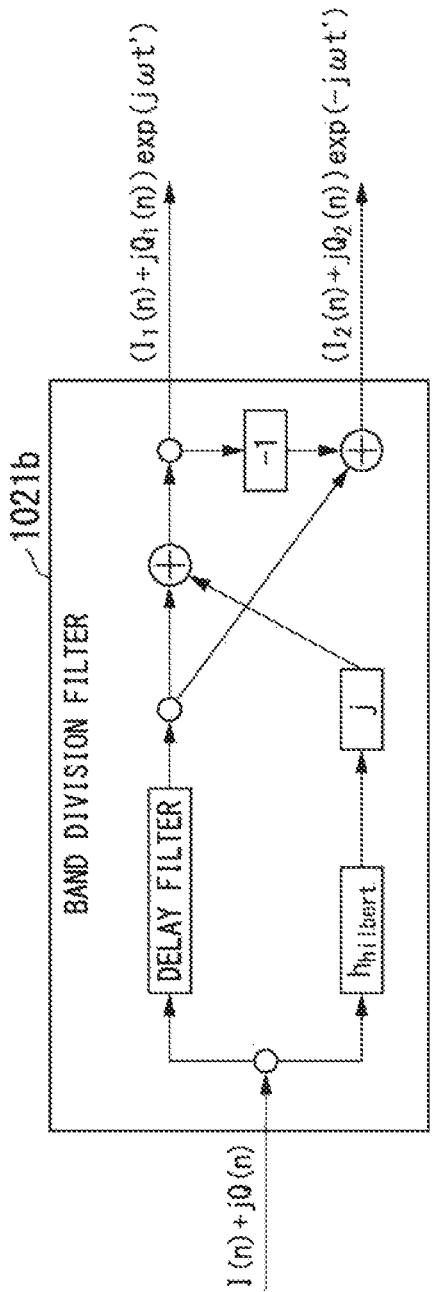
FIG. 4 is a diagram showing another configuration of the band division filter of the band division unit of the optical transmitter according to the first embodiment of the present invention.
Figure 5:
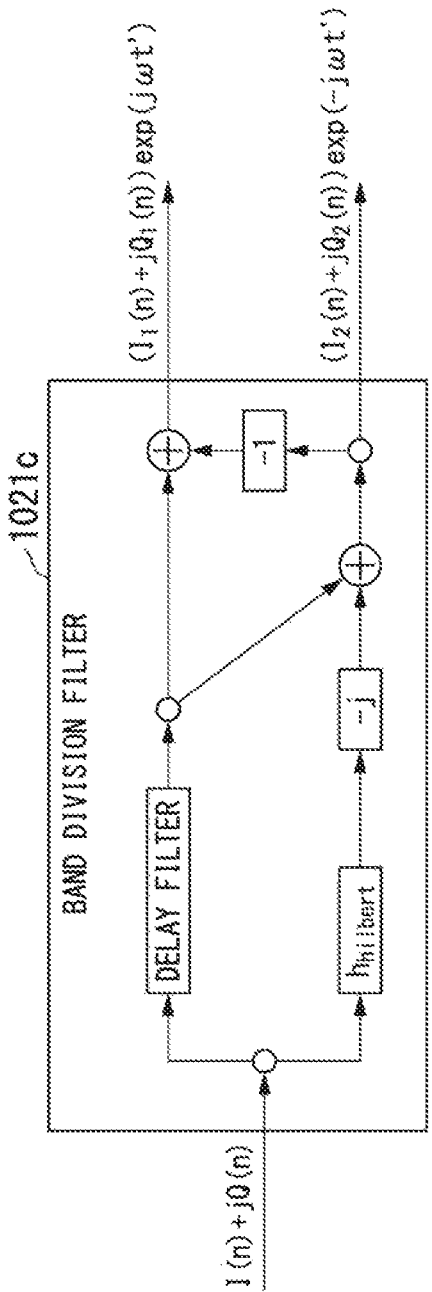
FIG. 5 is a diagram showing still another configuration of the band division filter of the band division unit of the optical transmitter according to the first embodiment of the present invention.

Also, the band division filter 1021 may have another configuration using the Hilbert transform as a band pass filter such as the band division filter 1021b shown in FIG. 4 and the band division filter 1021c shown in FIG. 5.

Figure 6:
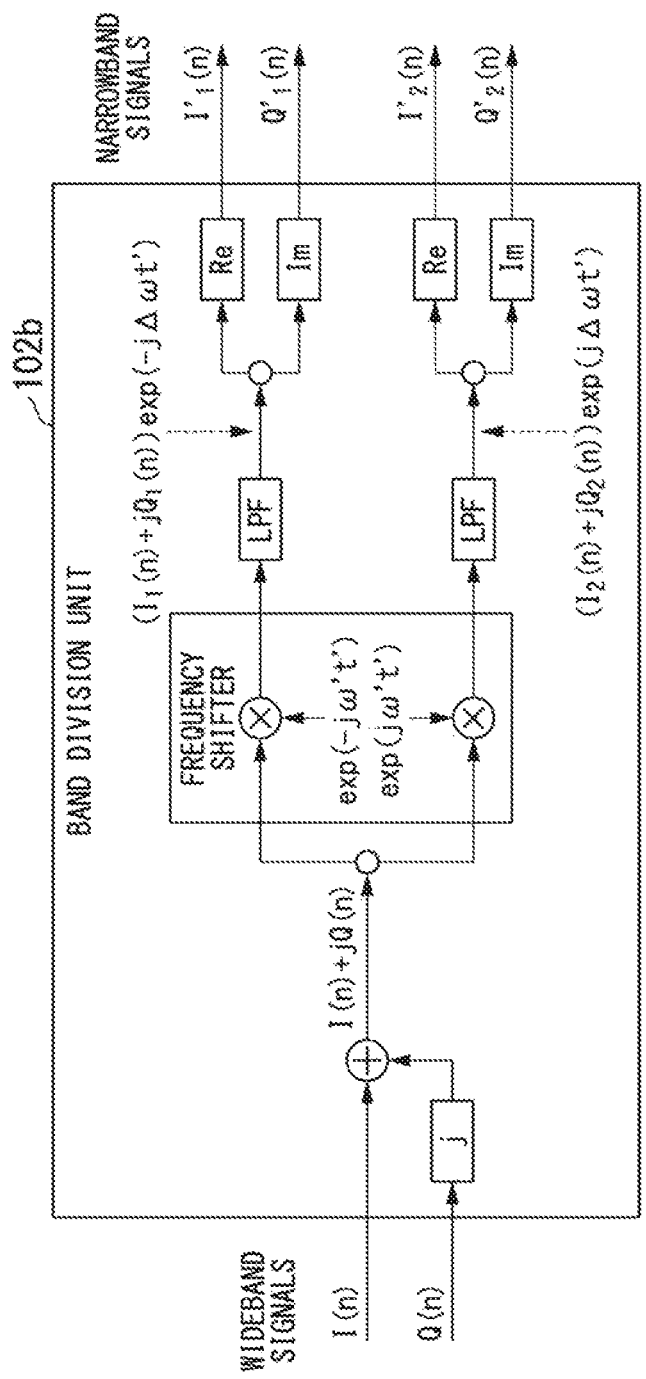
FIG. 6 is a diagram showing another configuration of the band division unit of the optical transmitter according to the first embodiment of the present invention.
Figure 7:
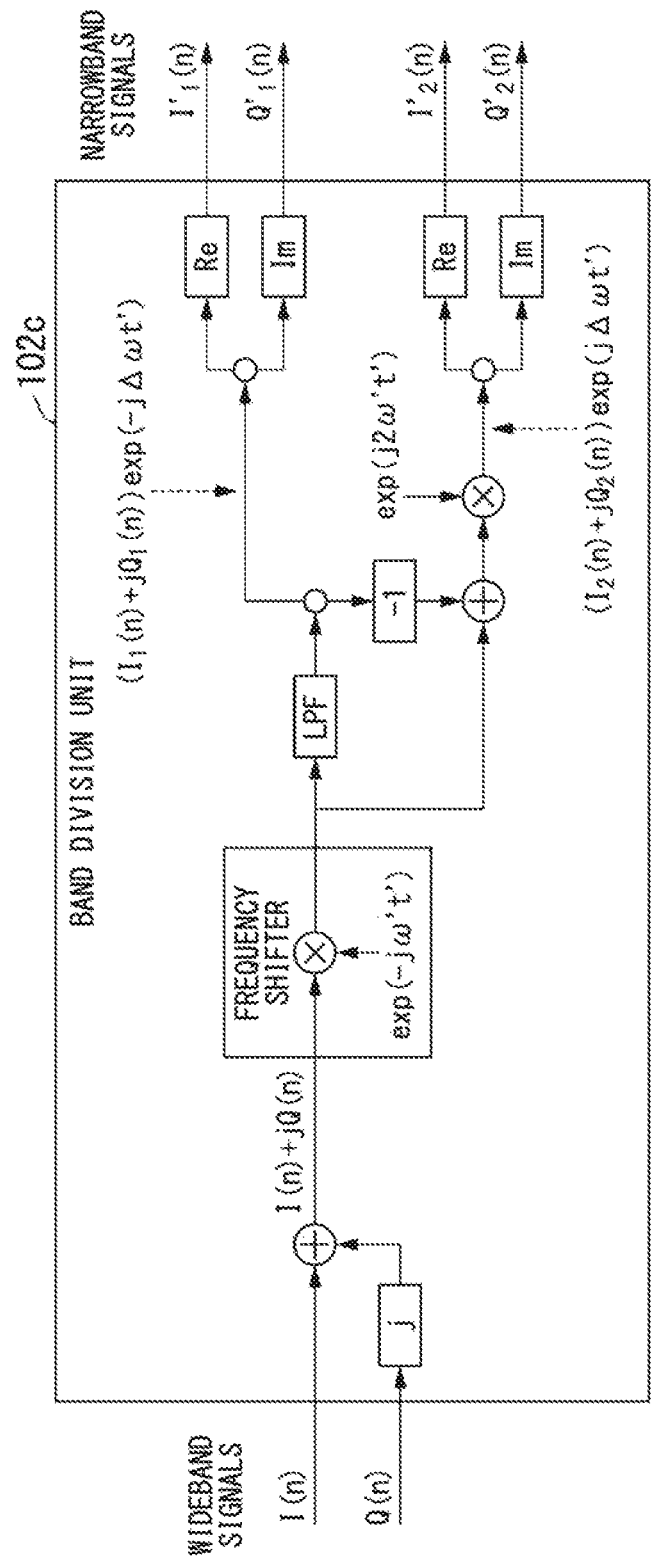
FIG. 7 is a diagram showing still another configuration of the band division unit of the optical transmitter according to the first embodiment of the present invention.
Figure 8:
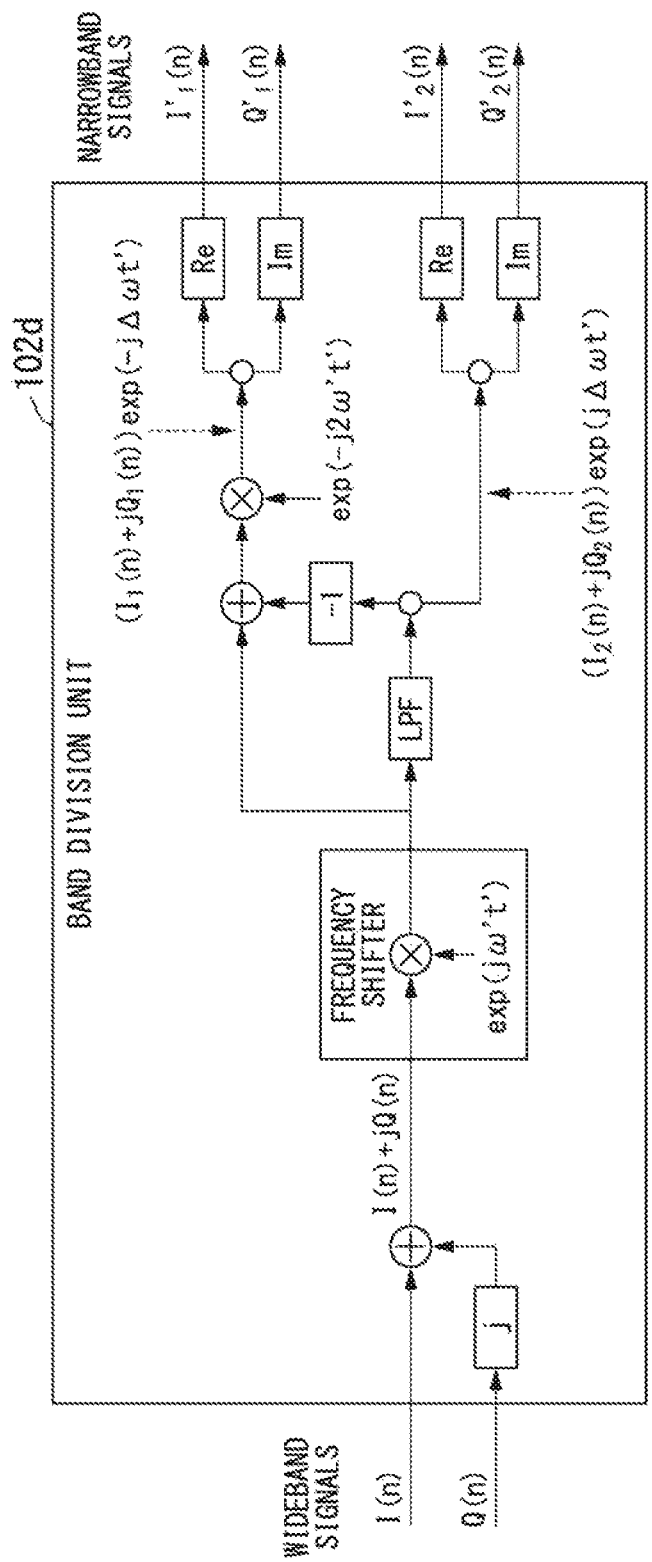
FIG. 8 is a diagram showing yet another configuration of the band division unit of the optical transmitter according to the first embodiment of the present invention.

Also, the band division unit 102 may have a configuration in which a band division process is performed using a low-pass filter (LPF) without using the Hilbert transform as in the band division unit 102b shown in FIG. 6, the band division unit 102c shown in FIG. 7, and the band division unit 102d shown in FIG. 8.

[Configuration of Narrowband Signal Processing Unit]

Figure 9:
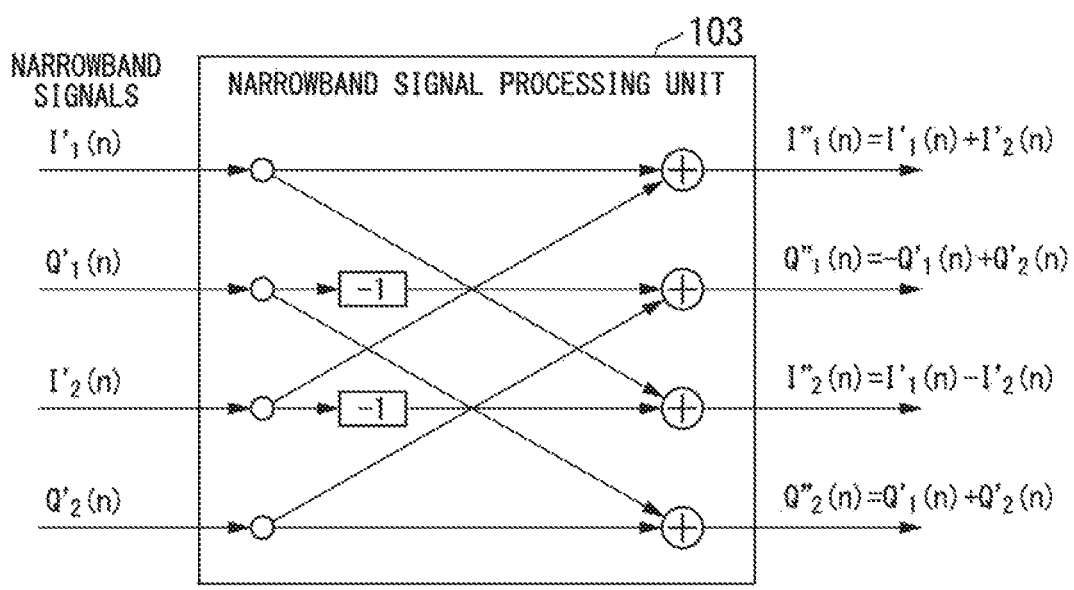
FIG. 9 is a diagram showing a configuration of a narrowband signal processing unit of the optical transmitter according to the first embodiment of the present invention.

FIG. 9 is a diagram showing a configuration of the narrowband signal processing unit 103 of the optical transmitter 1 according to the first embodiment of the present invention.

The narrowband signal processing unit 103 inputs a plurality of narrowband signals (($I_1'(n)$, $Q_1'(n)$), ($I_2'(n)$, $Q_2'(n)$)) from the band division unit 102, and performs at least one of addition and subtraction processes on the plurality of narrowband signals. As shown in FIG. 9, the narrowband signal processing unit 103 performs the at least one of the addition and subtraction processes on the plurality of narrowband signals input from the band division unit 102 as shown in (Expressions 1). That is, the narrowband signal processing unit 103 performs the addition and subtraction processes on the in-phase components ($I_1'(n)$, $I_2'(n)$) of the narrowband signals and performs the addition and subtraction processes on the quadrature components ($Q_1'(n)$ and $Q_2'(n)$) of the narrowband signals.

$$I_1''(n) = I_1'(n) + I_2'(n),$$

$$Q_1''(n) = -Q_1'(n) + Q_2'(n),$$

$$I_2''(n) = I_1'(n) - I_2'(n),$$

$$Q_2''(n) = Q_1'(n) + Q_2'(n) \quad \text{(Expressions 1)}$$

The narrowband signal processing unit 103 outputs narrowband signals ($I_1''(n)$, $Q_1''(n)$, $I_2''(n)$, $Q_2''(n)$) obtained by performing at least one of the addition and subtraction processes to the digital-to-analog conversion unit 104.

Figure 10:
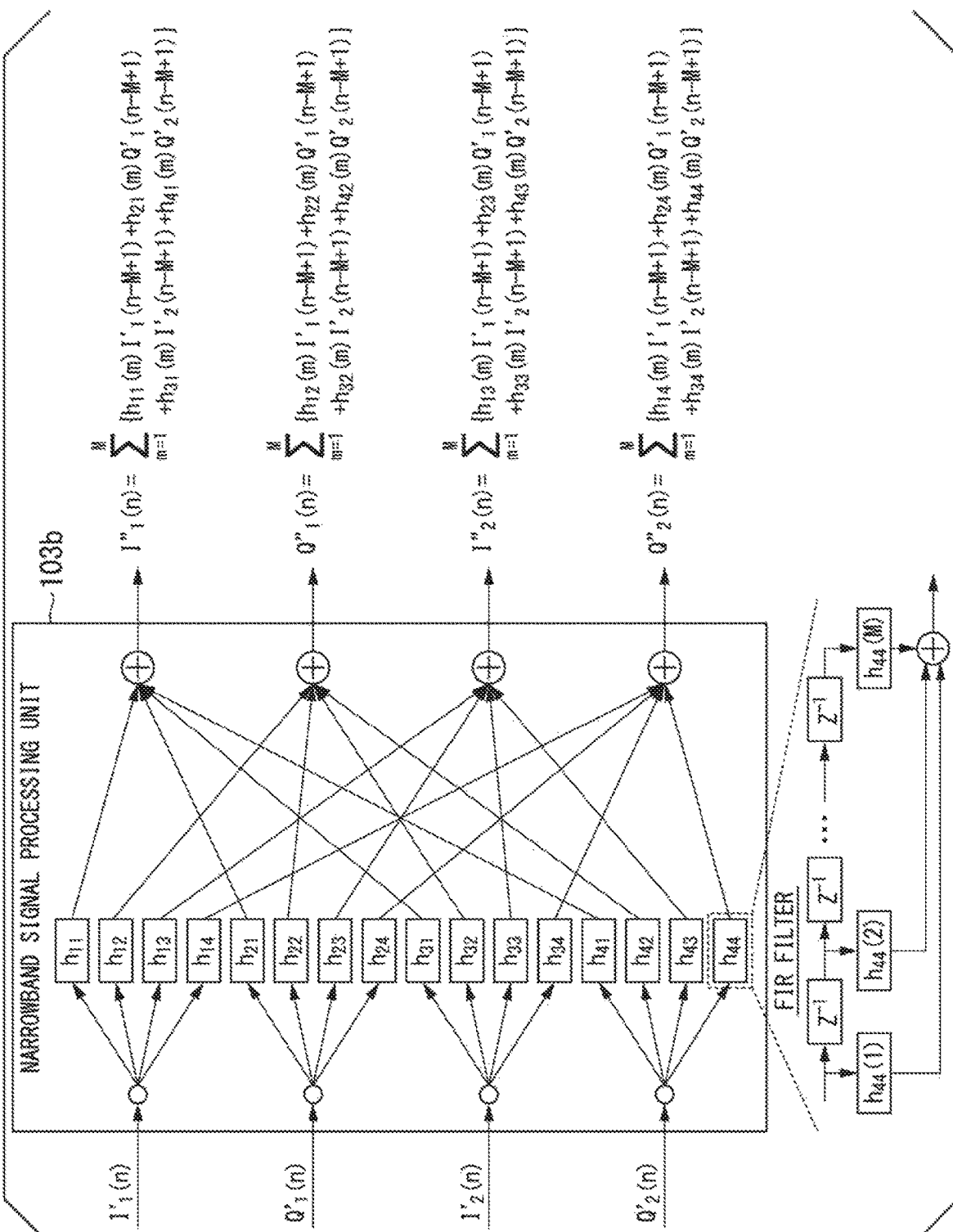
FIG. 10 is a diagram showing another configuration of the narrowband signal processing unit of the optical transmitter according to the first embodiment of the present invention.

Also, the narrowband signal processing unit 103 may be configured to perform pre-equalization to equalize inter-signal interference caused by device imperfections as in the narrowband signal processing unit 103b shown in FIG. 10.

$$h_{kl} = (h_{kl}(1), h_{kl}(2), \ldots, h_{kl}(M)),$$

($k=1, 2, 3, 4$; $l=1, 2, 3, 4$)

Each $h_{kl}$ represents a tap coefficient for pre-equalization.

For example, $I_1''(n)$ corresponds to an $n^{th}$ output of convolution calculation $I_1'' = h_{11}*I_1' + h_{21}*Q_1' + h_{31}*I_2' + h_{41}*Q_2'$. This convolution calculation can be performed by the FIR filter as shown in FIG. 10.

The convolution calculation in the time domain corresponds to a product of the frequency domain. Consequently, the narrowband signal processing unit 103b may have a configuration in which the tap coefficient and the input signal are respectively subjected to an FFT and multiplied and then subjected to an IFFT.

Also, the above calculation may be performed in the frequency domain.

As shown in FIG. 10, the narrowband signal processing unit 103b pre-equalizes a plurality of input narrowband signals (($I_1'(n)$, $Q_1'(n)$), ($I_2'(n)$, $Q_2'(n)$)) and outputs signals (($I_1''(n)$, $Q_1''(n)$), ($I_2''(n)$, $Q_2''(n)$)).

As shown in FIG. 10, the signals $I_1''(n)$, $Q_1''(n)$, $I_2''(n)$, and $Q_2''(n)$ are respectively represented as shown in (Expressions 2).

$$I_1''(n) = \sum_{m=1}^{M} \{h_{11}(m)I_1'(n-M+1) + h_{21}(m)Q_1'(n-M+1) + h_{31}(m)I_2'(n-M+1) + h_{41}(m)Q_2'(n-M+1)\},$$

$$Q_1''(n) = \sum_{m=1}^{M} \{h_{12}(m)I_1'(n-M+1) + h_{22}(m)Q_1'(n-M+1) + h_{32}(m)I_2'(n-M+1) + h_{42}(m)Q_2'(n-M+1)\},$$

$$I_2''(n) = \sum_{m=1}^{M} \{h_{13}(m)I_1'(n-M+1) + h_{23}(m)Q_1'(n-M+1) + h_{33}(m)I_2'(n-M+1) + h_{43}(m)Q_2'(n-M+1)\},$$

$$Q_2''(n) = \sum_{m=1}^{M} \{h_{14}(m)I_1'(n-M+1) + h_{24}(m)Q_1'(n-M+1) + h_{34}(m)I_2'(n-M+1) + h_{44}(m)Q_2'(n-M+1)\} \quad \text{(Expressions 2)}$$

Figure 11:
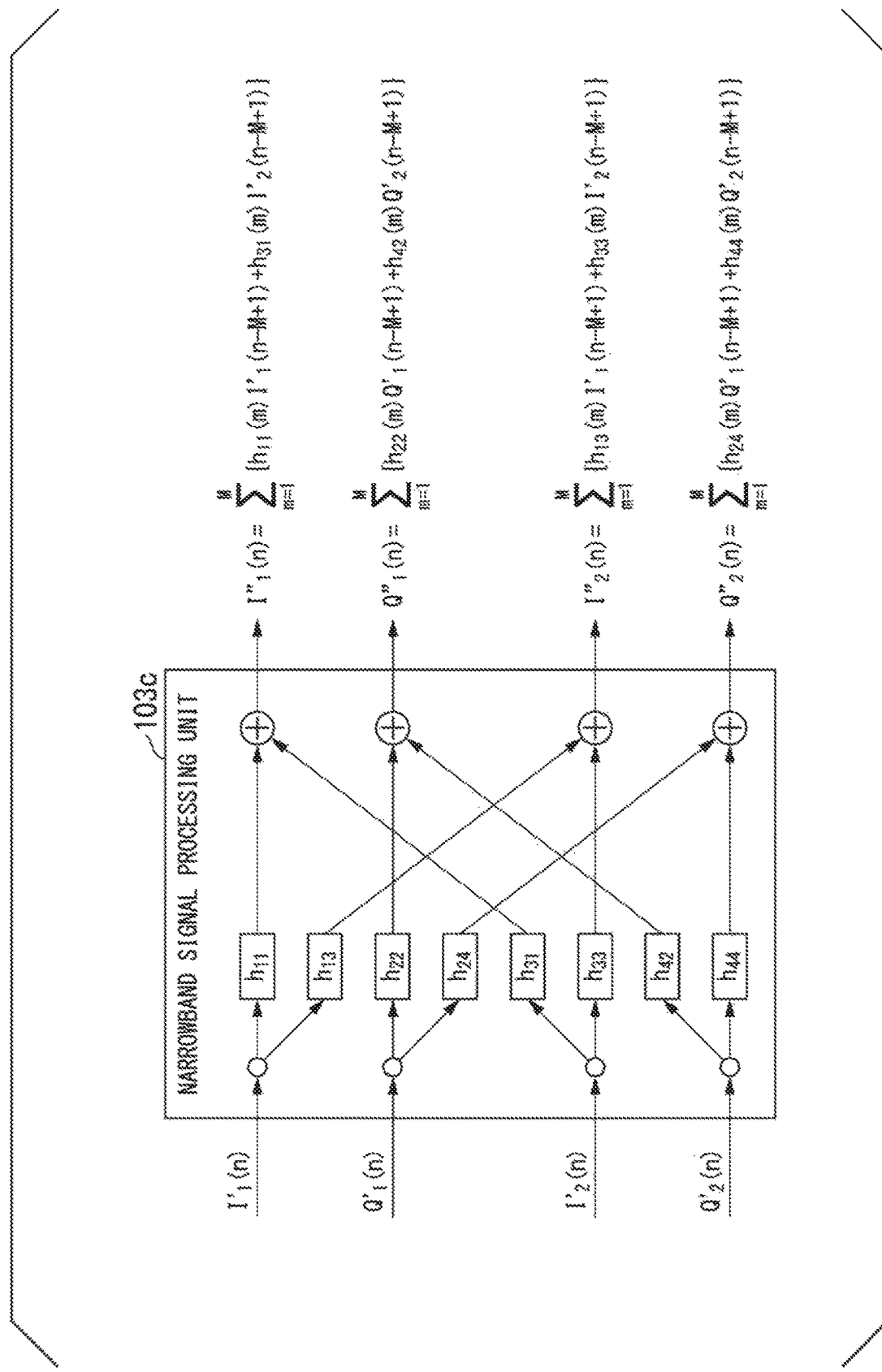
FIG. 11 is a diagram showing still another configuration of the narrowband signal processing unit of the optical transmitter according to the first embodiment of the present invention.

Also, a configuration in which some convolution calculations are omitted may be adopted to simplify a calculation process as in the narrowband signal processing unit 103c shown in FIG. 11. In this regard, a configuration in which the output signal is obtained by the configuration of the narrowband signal processing unit 103 shown in FIG. 9 is necessary. The tap coefficients $h_{12}$, $h_{14}$, $h_{21}$, $h_{23}$, $h_{31}$, $h_{34}$, $h_{41}$, and $h_{43}$ shown in FIG. 10 can be omitted.

When $h_{11}(1)=1$, $h_{13}(1)=1$, $h_{22}(1)=-1$, $h_{24}(1)=1$, $h_{31}(1)=1$, $h_{33}(1)=-1$, $h_{42}(1)=1$, $h_{44}(1)=1$, and the number of taps is 1 (i.e., M=1), an output signal equal to the output signal from the configuration of the narrowband signal processing unit 103 shown in FIG. 9 is obtained.

As shown in FIG. 11, the narrowband signal processing unit 103c performs pre-equalization on the plurality of input narrowband signals (($I_1'(n)$, $Q_1'(n)$), ($I_2'(n)$, $Q_2'(n)$)) and outputs signals (($I_1''(n)$, $Q_1''(n)$), ($I_2''(n)$, $Q_2''(n)$)). As shown in FIG. 11, the signals $I_1''(n)$, $Q_1''(n)$, $I_2''(n)$, and $Q_2''(n)$ are represented as shown in (Expressions 3), respectively.

$$I_1''(n) = \sum_{m=1}^{M} \{h_{11}(m)I_1'(n-M+1) + h_{31}(m)I_2'(n-M+1)\},$$

$$Q_1''(n) = \sum_{m=1}^{M} \{h_{22}(m)Q_1'(n-M+1) + h_{42}(m)Q_2'(n-M+1)\},$$

$$I_2''(n) = \sum_{m=1}^{M} \{h_{13}(m)I_1'(n-M+1) + h_{33}(m)I_2'(n-M+1)\},$$

$$Q_2''(n) = \sum_{m=1}^{M} \{h_{24}(m)Q_1'(n-M+1) + h_{44}(m)Q_2'(n-M+1)\} \quad \text{(Expressions 3)}$$

Also, the convolution calculation can be further simplified when a specific condition is satisfied. For example, when $h_{11}=h_{13}$, the convolution calculation can be further simplified by adopting a configuration of pre-convolution with $I_1'$ as $h_1$. Also, for example, when $h_{11}=h_{31}$, the convolution calculation can be simplified by adopting a configuration of convolution with $I_1"$ as $h_1'$.

[Configuration of Wideband Signal Generation Unit]

Figure 12:
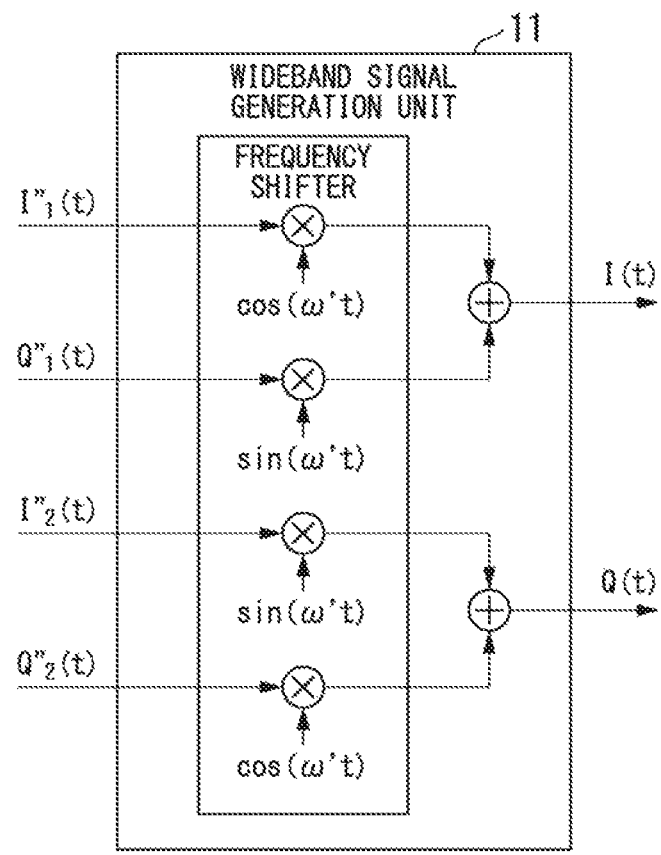
FIG. 12 is a diagram showing a configuration of a wideband signal generation unit of the optical transmitter according to the first embodiment of the present invention.

FIG. 12 is a diagram showing a configuration of the wideband signal generation unit 11 of the optical transmitter 1 according to the first embodiment of the present invention. Also, for example, any device such as a switch circuit can be used as a multiplication circuit (a mixer) in the frequency shifter. Also, for example, any device such as a power combiner can be used as the addition circuit.

The wideband signal generation unit 11 shifts the bands of the narrowband signals $I_1"(n)$ and $Q_1"(n)$ by sinusoidal signals of a frequency f' having a phase difference of $\pi/2$, respectively. Also, the wideband signal generation unit 11 also shifts the bands of the narrowband signals $I_2"(n)$ and $Q_2"(n)$ by sinusoidal signals having a frequency $-f'$ having a phase difference of $\pi/2$, respectively. The frequency shift performed by the wideband signal generation unit 11 is conversion of the frequency band of the narrowband signal into the frequency band of the modulated signal sequences (I(n), Q(n)) output from the signal generation unit 101. That is, the frequency shift in the wideband signal generation unit 11 is frequency conversion in an opposite direction to the frequency shift in the frequency shifter 1022. The wideband signal generation unit 11 generates the modulated signal sequence I(n) as a first wideband signal by combining the frequency-shifted narrowband signals $I_1"(n)$ and $Q_1"(n)$. Also, the wideband signal generation unit 11 generates the modulated signal sequence Q(n) as a second wideband signal by combining the frequency-shifted narrowband signals $I_2"(n)$ and $Q_2"(n)$.

Figure 13:
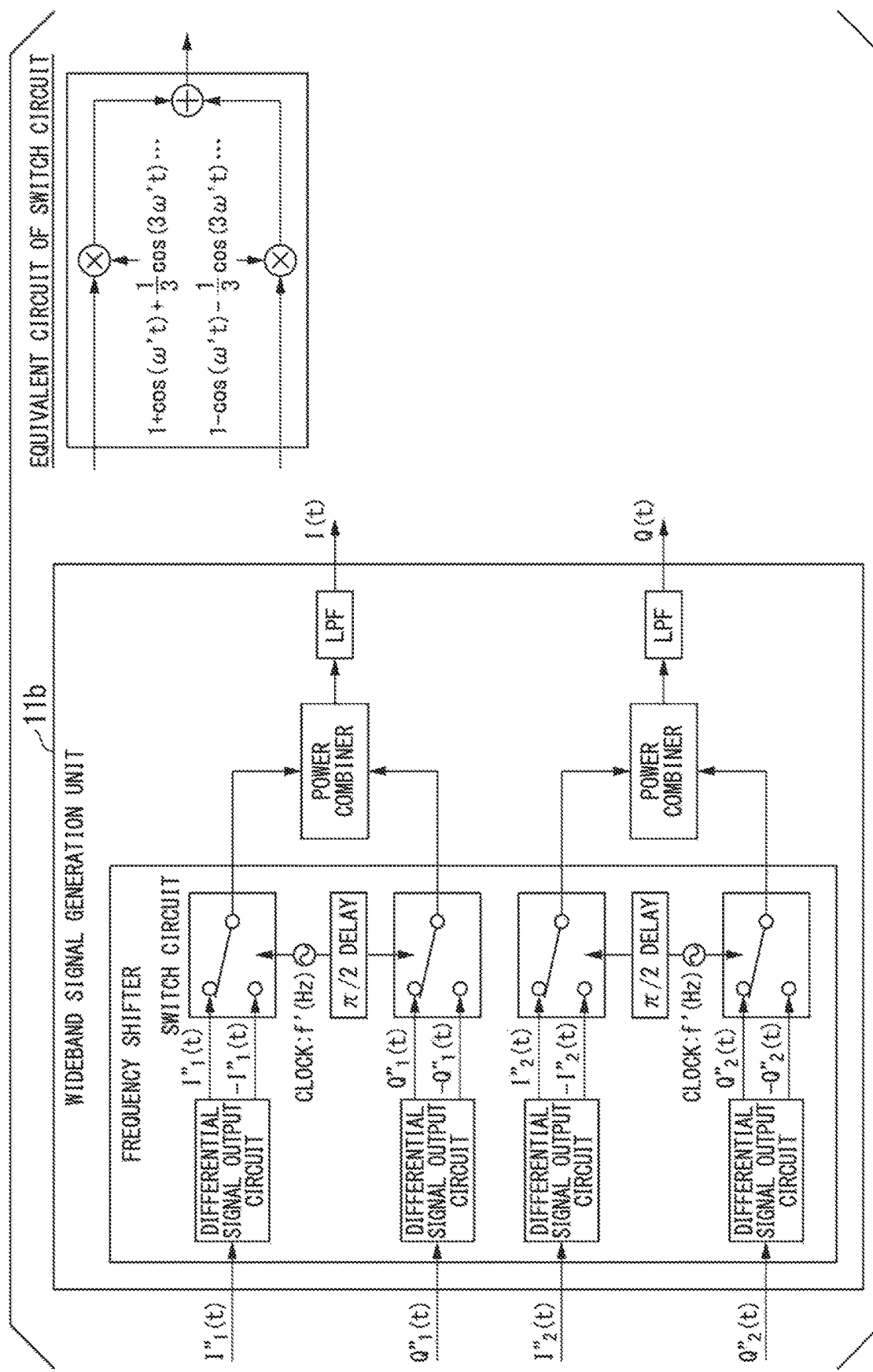
FIG. 13 is a diagram showing another configuration of the wideband signal generation unit of the optical transmitter according to the first embodiment of the present invention.

Also, the wideband signal generation unit 11 may have a configuration in which a differential signal output circuit is provided within the frequency shifter as in the wideband signal generation unit 11b shown in FIG. 13. Also, the differential signal output circuit may be provided outside the frequency shifter and in a stage previous to the wideband signal generation unit 11. Also, when the digital-to-analog conversion unit 104 has differential outputs, the differential signal output circuit can be omitted. Also, the differential signal output circuit can be omitted even in the case where the driver amplifier is provided in a stage previous to the wideband signal generation unit 11 and the driver amplifier outputs differential signals.

Also, input signals to the switch circuit may be differential signals. The wideband signal generation unit 11 removes harmonic waves of the frequency-shifted signal using a low pass filter (LPF). Also, the LPF may be provided in a state subsequent to the frequency shifter.

Also, the LPF can be omitted when the influence of the harmonic waves is ignored such as when harmonic waves are generated outside the band range of the analog signals. Also, in the case of a system in which harmonic waves are allowed, the LPF can be omitted. Also, an optical filter may be provided in a stage subsequent to the output of the optical modulator in order to remove harmonic waves. Also, a driver amplifier may be provided in the output unit of the wideband signal generation unit 11, and the driver amplifier may amplify the modulated signal sequences I(n) and Q(n) output from the wideband signal generation unit and outputs the amplified signal sequences.

[Wideband Signal Generation Process (in Case that the Bandwidth of Wideband Signals is Double Those of Narrowband Signals)]

As described above, the optical transmitter 1 according to the first embodiment divides a wideband signal into upper and lower sideband signals using the Hilbert transform and shifts the upper and lower signals, thereby obtaining two narrowband signals. The optical transmitter 1 performs digital-to-analog conversion on each of the two narrowband signals obtained by the division. The optical transmitter 1 shifts the bands of the two narrowband signals converted into analog signals. The optical transmitter 1 generates a wideband signal by performing an addition process on the two narrowband signals that have been frequency-shifted. The above-described process can be represented as follows.

The optical transmitter 1 divides the wideband signal into the upper and lower sideband signals using the Hilbert transform and shifts the bands of the upper and lower sideband signals by frequencies $-f'$ and $f'$, respectively. The frequency shifts using the frequencies $-f'$ and $f'$ correspond to calculations for multiplying by sinusoidal signals $\exp(-j\omega't)$ and $\exp(j\omega't)$. Signal processing is represented as shown in (Expression 4).

$$I + jQ = (1/2)(I + j(h_{hilbert} * I) + I - j(h_{hilbert} * I)) + \quad \text{(Expression 4)}$$
$$(j/2)(Q + j(h_{hilbert} * Q) +$$
$$Q - j(h_{hilbert} * Q))$$
$$= (I_1 + jQ_1)\exp(j\omega t) +$$
$$(I_2 + jQ_2)\exp(-j\omega t)$$
$$= (I_1 + jQ_1)\exp(j(\omega' - \Delta\omega)t) +$$
$$(I_2 + jQ_2)\exp(-j(\omega' - \Delta\omega)t)$$
$$= (I_1 + jQ_1)\exp(j(\omega'\Delta\omega)t) +$$
$$(I_2 + jQ_2)\exp(-j\Delta\omega t)\exp(-j\omega' t)$$

The two narrowband signals (i.e., the upper and lower sideband signals) are represented as shown in (Expressions 5).

$$(I_1 + jQ_1)\exp(-j\Delta\omega t) = I_1\cos\Delta\omega t + Q_1\sin\Delta\omega t + \quad \text{(Expressions 5)}$$
$$j(-I_1\sin\Delta\omega t + Q_1\cos\Delta\omega t)$$
$$= I_1' + jQ_1',$$
$$(I_2 + jQ_2)\exp(j\Delta\omega t) = I_2\cos\Delta\omega t - Q_2\sin\Delta\omega t +$$
$$j(I_2\sin\Delta\omega t + Q_2\cos\Delta\omega t)$$
$$= I_2' + jQ_2'$$

The optical transmitter 1 shifts the bands of the two narrowband signals shown in (Expressions 5) by the frequencies f' and $-f'$, respectively. The frequency shifts using the frequencies f' and $-f'$ correspond to calculations for multiplying the sinusoidal signals $\exp(j\omega't)$ and $\exp(-j\omega't)$, respectively. Two narrowband signals frequency-shifted by the frequencies f' and $-f'$ are represented by (Expressions 6).

$$(I_1'+jQ_1')\exp(j\omega't)=I_1'\cos\omega't-Q_1'\sin\omega't+j(I_1'\sin\omega't+Q_1'\cos\omega't),$$

$$(I_2'+jQ_2')\exp(-j\omega't)=I_2'\cos\omega't+Q_1'\sin\omega't+j(-I_2'\sin\omega't+Q_2'\cos\omega't) \quad \text{(Expressions 6)}$$

The optical transmitter 1 performs an addition process on the two narrowband signals of (Expressions 6). Thereby, as shown in (Expression 7), a wideband signal is generated from two narrowband signals.

$$I + jQ = (I'_1 + I'_2)\cos\omega' t + (-Q'_1 + Q'_2)\sin\omega' t +$$ (Expression 7)
$$j[(I'_1 - I'_2)\sin\omega' t + (Q'_1 + Q'_2)\cos\omega' t]$$
$$= I''_1\cos\omega' t + Q''_1\sin\omega' t +$$
$$j(I''_2\sin\omega' t + Q''_2\cos\omega' t)$$

Also, in the above, j: imaginary unit, $h_{hilbert}$: transfer function of Hilbert transform, $\omega=2\pi f$ (rad/s), f=b/4 (Hz), b: baud rate (baud=1/s), $\omega'=2\pi f'=2\pi(f+\Delta f)=\omega+\Delta\omega$.

Also, in each of the above Expressions, I, Q, and $h_{hilbert}$ are functions of t, but (t) is omitted.

Also, any frequency (real number) is applicable to the frequency Δf, but it is desirable to satisfy Δf≥0 when the influence of harmonic waves is taken into account as described for using the wideband signal generation unit 11b shown in FIG. 13. This is because when Δf<0, harmonic waves are generated within the band range of the wideband signal and the signal quality is deteriorated.

Second Embodiment

Hereinafter, a second embodiment of the present invention will be described.
[Configuration of Optical Transmitter]

Figure 14:
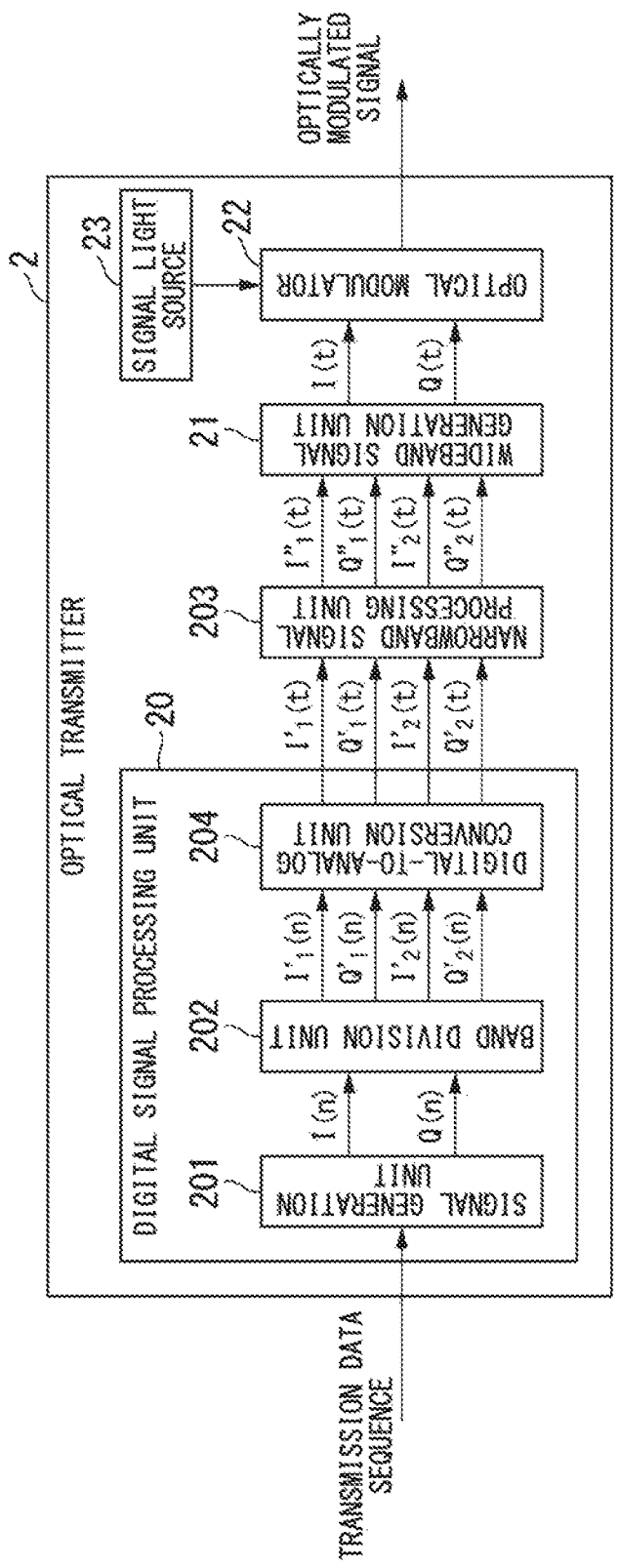
FIG. 14 is a diagram showing a configuration of an optical transmitter according to a second embodiment of the present invention.

FIG. 14 is a diagram showing a configuration of an optical transmitter 2 according to the second embodiment of the present invention.

As shown in FIG. 14, the optical transmitter 2 according to the second embodiment is different from the optical transmitter 1 according to the first embodiment shown in FIG. 1 in that a narrowband signal processing unit 203 is provided outside a digital signal processing unit 20. The narrowband signal processing unit 203 receives analog signals output from a digital-to-analog conversion unit 204, performs at least one of addition and subtraction processes on frequency-shifted upper and lower sideband signals, and outputs a result of the process to a wideband signal generation unit 21.

As shown in FIG. 14, the optical transmitter 2 according to the second embodiment includes the digital signal processing unit 20, the narrowband signal processing unit 203, a wideband signal generation unit 21, an optical modulator 22, and a signal light source 23. The digital signal processing unit 20 includes a signal generation unit 201, a band division unit 202, and the digital-to-analog conversion unit 204.

The signal generation unit 201 generates modulated signal sequences (I(n), Q(n)) that are high-speed signals (wideband signals) from the transmission data sequence that includes binary information. The signal generation unit 201 outputs the generated modulated signal sequences (I(n), Q(n)) to the band division unit 202.

The band division unit 202 divides the input signals that are the modulated signal sequences (I(n), Q(n)) input from the signal generation unit 101 into an upper sideband signal and a lower sideband signal and shifts the bands of the signals obtained by the division. The band division unit 202 outputs upper sideband signals that are narrowband signals ($I_1'(n)$, $Q_1'(n)$) and lower sideband signals that are narrowband signals ($I_2'(n)$, $Q_2'(n)$) obtained by the frequency shift to the digital-to-analog conversion unit 204.

The digital-to-analog conversion unit 204 converts the narrowband signals input from the band division unit 202 into analog signals. The digital-to-analog conversion unit 204 outputs analog signals ($I_1'(t)$, $Q_1'(t)$) and ($I_2'(t)$, $Q_2'(t)$) obtained by the conversion to the narrowband signal processing unit 203.

The narrowband signal processing unit 203 receives the upper sideband signals and the lower sideband signals which are analog signals from the digital-to-analog conversion unit 204, performs at least one of addition and subtraction processes on the upper sideband signals and the lower sideband signals. The narrowband signal processing unit 203 outputs narrowband signals ($I_1''(t)$, $Q_1''(t)$) and ($I_2''(t)$, $Q_2''(t)$) obtained by performing the at least one of the addition and subtraction processes to the wideband signal generation unit 21. The narrowband signal processing unit 203 generates the narrowband signals ($I_1''(t)$, $Q_1''(t)$) and ($I_2''(t)$, $Q_2''(t)$) from analog signals ($I_1'(t)$, $Q_1'(t)$) and ($I_2'(t)$, $Q_2'(t)$) according to signal processing similar to signal processing represented by (Expressions 1) to be performed by the narrowband signal processing unit 103 according to the first embodiment.

Also, because the configurations and operations of the wideband signal generation unit 21, the optical modulator 22, and the signal light source 23 are similar to those of the wideband signal generation unit 11, the optical modulator 12, and the signal light source 13 in the optical transmitter 1 according to the first embodiment described above, a description thereof will be omitted.

Figure 15:
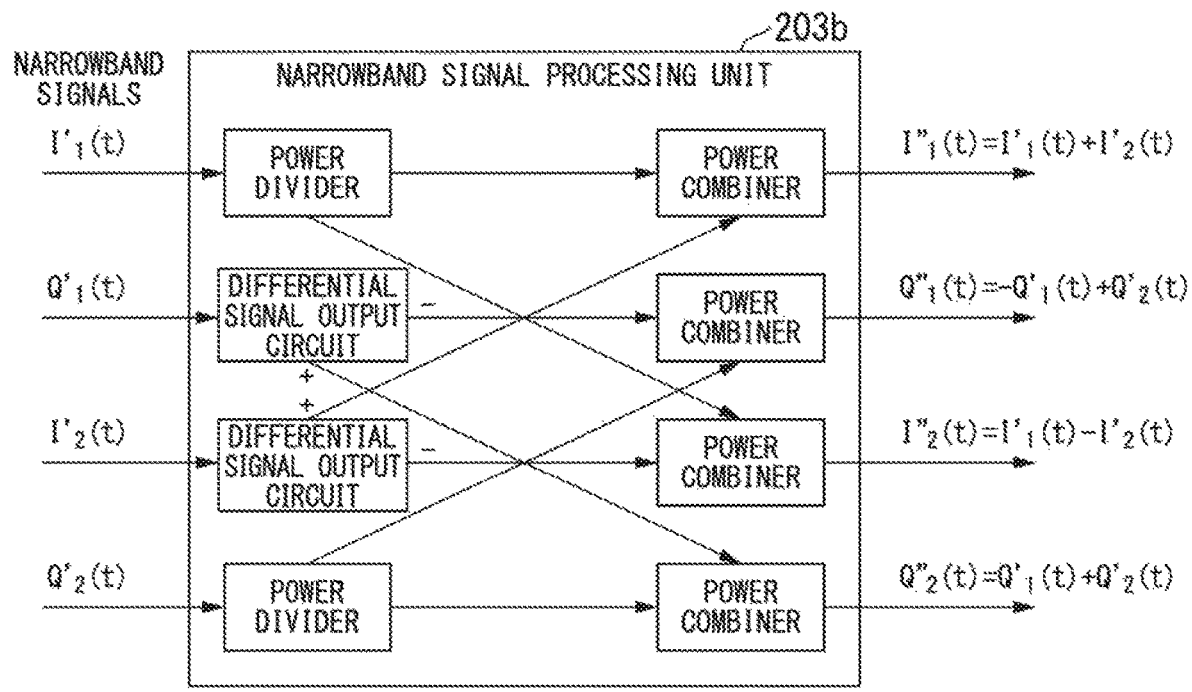
FIG. 15 is a diagram showing a configuration of a narrowband signal processing unit of the optical transmitter according to the second embodiment of the present invention.

As described above, the narrowband signal processing unit 103 of the optical transmitter 1 according to the first embodiment shown in FIG. 9 performs digital signal processing. On the other hand, the narrowband signal processing unit 203 according to the second embodiment processes the analog signal output from the digital-to-analog conversion unit 204. Thus, the narrowband signal processing unit 203 according to the second embodiment includes, for example, an analog circuit including two power dividers, four power combiners, and two differential signal output circuits as in the narrowband signal processing unit 203b shown in FIG. 15. Also, the narrowband signal processing unit 203 may include another analog circuit capable of obtaining an output equivalent to the output of the analog circuit shown in FIG. 15.

Third Embodiment

Hereinafter, a third embodiment of the present invention will be described.
[Configuration of Optical Transmitter]

Figure 16:
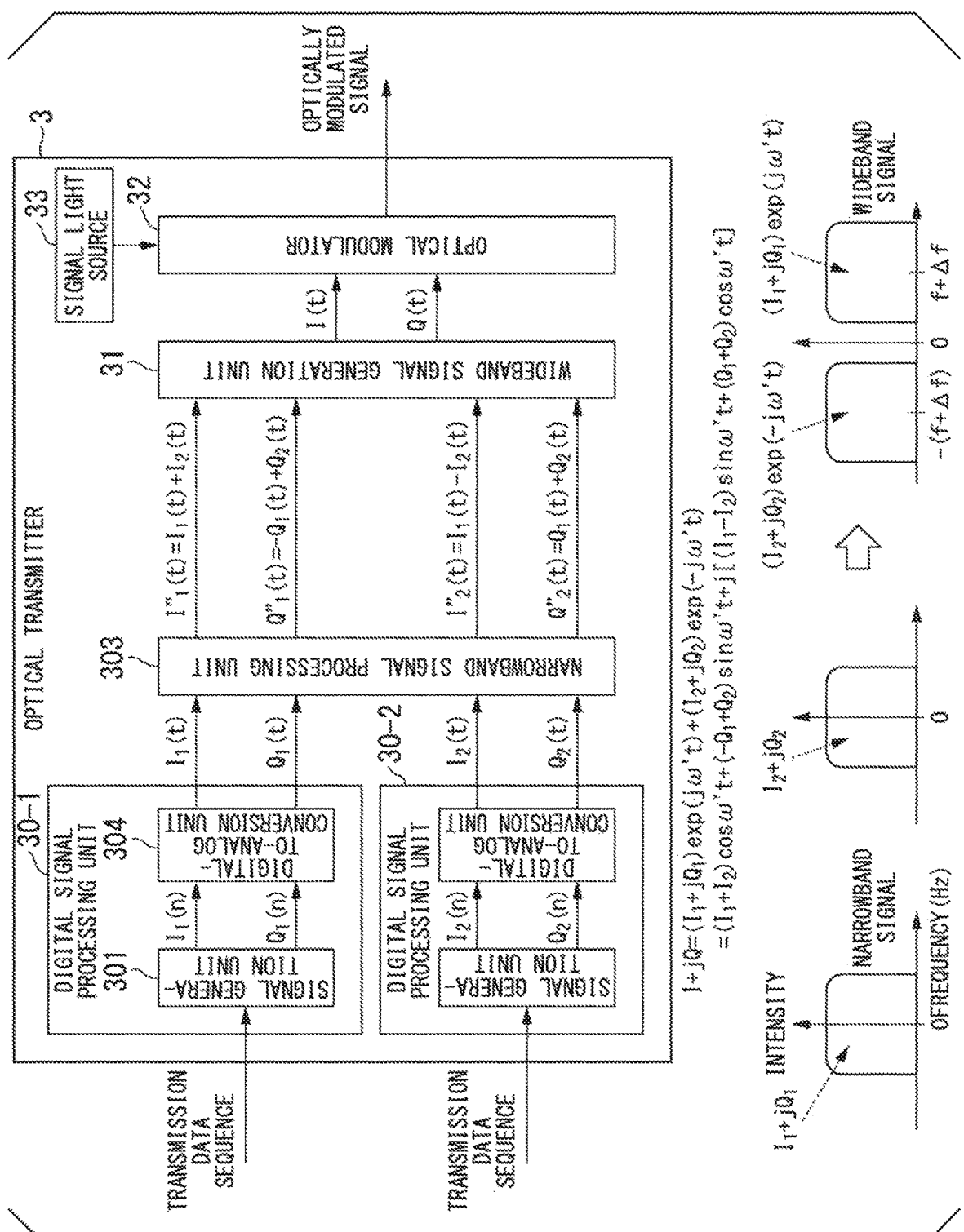
FIG. 16 is a diagram showing a configuration of an optical transmitter according to a third embodiment of the present invention.

FIG. 16 is a diagram showing a configuration of an optical transmitter 3 according to the third embodiment of the present invention.

As shown in FIG. 16, in the optical transmitter 3 according to the third embodiment, independent narrowband signals are output from a plurality of digital signal processing units (digital signal processing units 30-1 and 30-2) and a wideband signal is generated on the basis of the independent narrowband signals. For example, a transmission data sequence input to the digital signal processing unit 30-1 and a transmission data sequence input to the digital signal processing unit 30-2 may be independent of each other.

As shown in FIG. 16, the optical transmitter 3 according to the third embodiment includes two digital signal processing units 30 (30-1 and 30-2), a narrowband signal processing unit 303, a wideband signal generation unit 31, an optical modulator 32, and a signal light source 33. Each of the two digital signal processing units 30 includes a signal generation unit 301 and a digital-to-analog conversion unit 304.

The signal generation unit 301 of the digital signal processing unit 30-1 generates modulated signal sequences ($I_1(n)$, $Q_1(n)$) that are narrowband signals from a transmission data sequence that includes binary information. The signal generation unit 301 of the digital signal processing unit 30-1 outputs the generated modulated signal sequences ($I_1(n)$, $Q_1(n)$) to the digital-to-analog conversion unit 304.

Likewise, the signal generation unit 301 of the digital signal processing unit 30-2 generates modulated signal sequences ($I_2(n)$, $Q_2(n)$) that are narrowband signals from a transmission data sequence that includes binary information. The signal generation unit 301 of the digital signal processing unit 30-2 outputs the generated modulated signal sequences ($I_2(n)$, $Q_2(n)$) to the digital-to-analog conversion unit 304.

The digital-to-analog conversion unit 304 of the digital signal processing unit 30-1 converts the modulated signal sequences input from the signal generation unit 301 into analog signals. The digital-to-analog conversion unit 304 of the digital signal processing unit 30-1 outputs analog signals ($I_1(t)$, $Q_1(t)$) obtained by the conversion to the narrowband signal processing unit 303.

Likewise, the digital-to-analog conversion unit 304 of the digital signal processing unit 30-2 converts the modulated signal sequences input from the signal generation unit 301 into analog signals. The digital-to-analog conversion unit 304 of the digital signal processing unit 30-2 outputs analog signals ($I_2(t)$, $Q_2(t)$) obtained by the conversion to the narrowband signal processing unit 303.

The narrowband signal processing unit 303 receives the narrowband signals that are analog signals input from the digital-to-analog conversion unit 304 of the digital signal processing unit 30-1 and the digital-to-analog conversion unit 304 of the digital signal processing unit 30-2, and performs at least one of addition and subtraction processes on the narrowband signals.

The narrowband signal processing unit 303 outputs narrowband signals ($I_1''(t)$, $Q_1''(0)$ and ($I_2''(t)$, $Q_2''(t)$) obtained by performing the at least one of the addition and subtraction processes to the wideband signal generation unit 31. The narrowband signals ($I_1''(t)$, $Q_1''(t)$), ($I_2''(t)$, $Q_2''(t)$) are represented by (Expressions 8).

$I_1''(t)=I_1(t)+I_2(t)$, $Q_1''(t)=-Q_1(t)+Q_2(t)$, $I_2''(t)=I_1(t)-I_2(t)$, $Q_2''(t)=Q_1(t)+Q_2(t)$ (Expressions 8)

Also, because the configurations and operations of the wideband signal generation unit 31, the optical modulator 32, and the signal light source 33 are similar to those of the wideband signal generation unit 11, the optical modulator 12, and the signal light source 13 in the optical transmitter 1 according to the first embodiment described above, a description thereof will be omitted.

Also, the optical transmitter according to the conventional technology modulates and outputs the output narrowband signals by two optical modulators. On the other hand, the optical transmitter 3 according to the third embodiment can perform collective modulation by a single optical modulator 32.

Fourth Embodiment

Hereinafter, a fourth embodiment of the present invention will be described.

[Configuration of Optical Transmitter]

Figure 17:
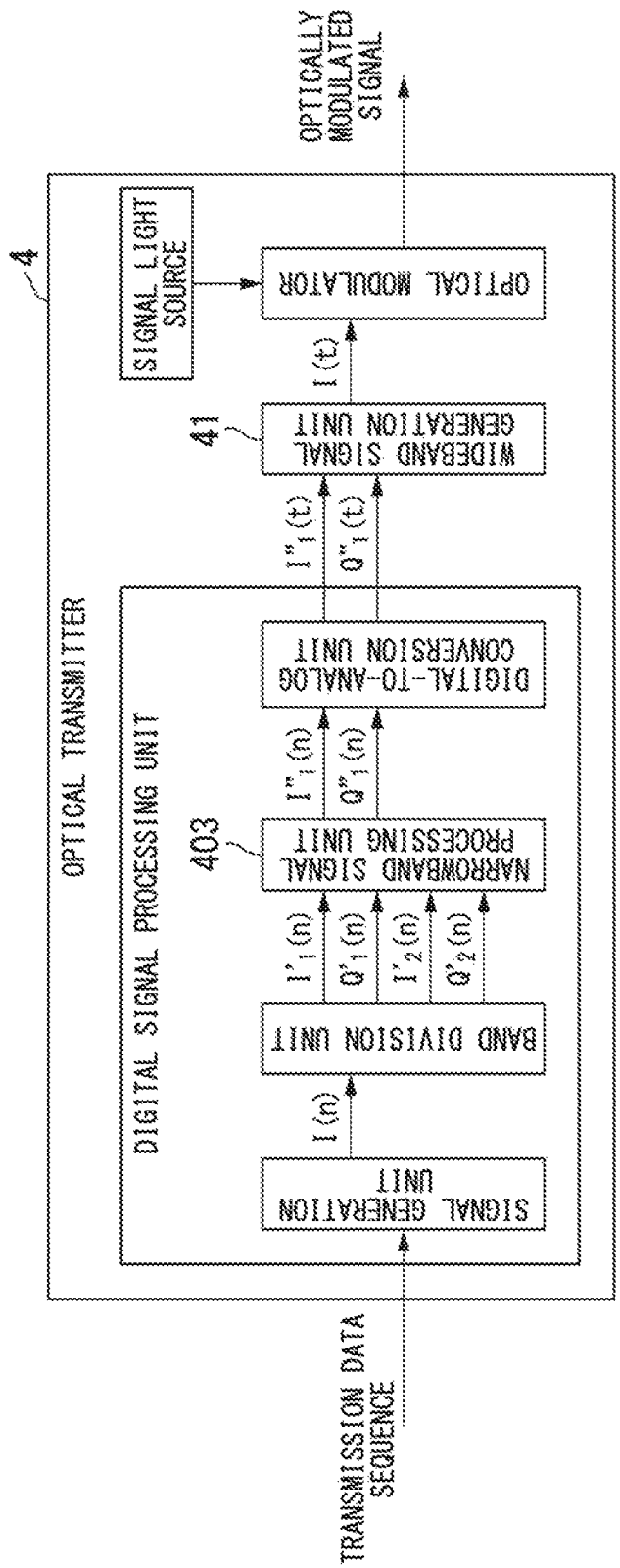
FIG. 17 is a diagram showing a configuration of an optical transmitter according to a fourth embodiment of the present invention.

FIG. 17 is a diagram showing a configuration of an optical transmitter 4 according to the fourth embodiment of the present invention.

As shown in FIG. 17, the configuration of the optical transmitter 4 according to the fourth embodiment is a configuration in the case that a quadrature component is zero (i.e., Q=0) of a complex digital signal ($I(n)+jQ(n)$). An in-phase component I of the complex digital signal ($I(n)+jQ(n)$) may be zero (I=0).

When Q=0, $I_2=I_1$ and $Q_2=-Q_1$. Consequently, because $I_2'=I_1'$ and $Q_2'=-Q_1'$, $I_1''=2I_1'$, $Q_1''=-2Q_1'$, $I_2''=0$, and $Q_2''=0$.

Thereby, in the narrowband signal processing unit 403 and the wideband signal generation unit 41, the processing on the $I_2''$ and $Q_2''$ side can be omitted as shown in (Expression 9).

$$I = (I_1' + I_2')\cos\omega't + (-Q_1' + Q_2')\sin\omega't + \quad \text{(Expression 9)}$$
$$j[(I_1' - I_2')\sin\omega't + (Q_1' + Q_2')\cos\omega't]$$
$$= I_1''\cos\omega't + Q_1''\sin\omega't + j[I_2''\sin\omega't + Q_2''\cos\omega't]$$
$$= 2I_1'[-2I_2'\cos\omega't + 2Q_2'\sin\omega't]$$

When I=0, $I_1=-I_2$ and $Q_1=Q_2$. Consequently, because and $Q_2'=Q_1'$, $I_1''=0$, $Q_1''=0$, $I_2''=-2I_2'$, and $Q_2''=2Q_2'$.

Thereby, in the narrowband signal processing unit 403 and the wideband signal generation unit 41, the processing on the $I_1''$ and $Q_1''$ side can be omitted as shown in (Expression 10).

$$jQ = (I_1' + I_2')\cos\omega't + (-Q_1' + Q_2')\sin\omega't + \quad \text{(Expression 10)}$$
$$j[(I_1' - I_2')\sin\omega't + (Q_1' + Q_2')\cos\omega't]$$
$$= I_1''\cos\omega't + Q_1''\sin\omega't +$$
$$j[I_2''\sin\omega't + Q_2''\cos\omega't]$$
$$= j[-2I_2'\cos\omega't + 2Q_2'\sin\omega't]$$

Fifth Embodiment

Hereinafter, a fifth embodiment of the present invention will be described.

[Configuration of Optical Transmitter]

Figure 18:
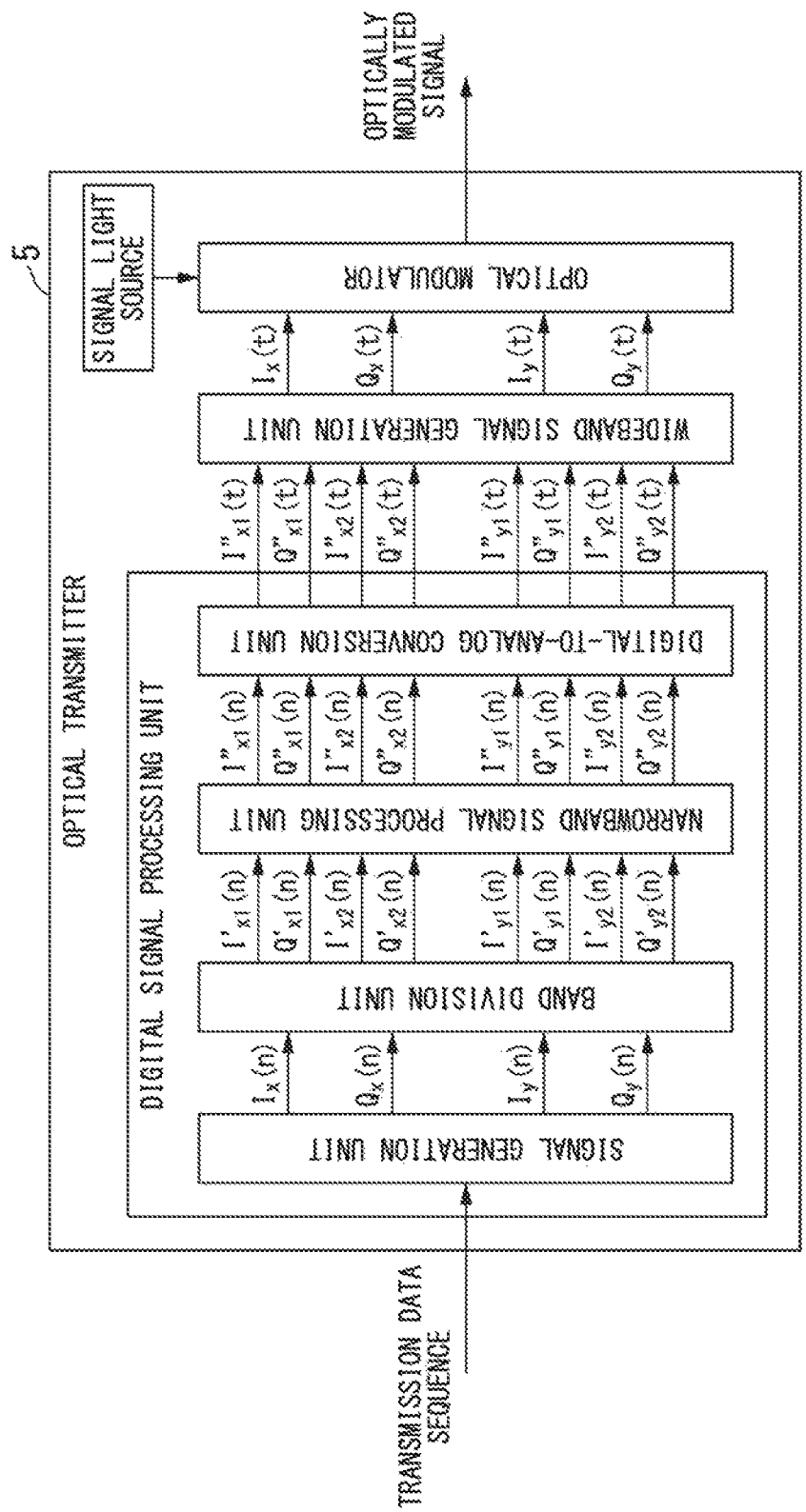
FIG. 18 is a diagram showing a configuration of an optical transmitter according to a fifth embodiment of the present invention.

FIG. 18 is a diagram showing a configuration of an optical transmitter 5 according to the fifth embodiment of the present invention.

As shown in FIG. 18, the optical transmitter 5 according to the fifth embodiment is an application example for a polarization-multiplexed signal. The optical transmitter 5 according to the fifth embodiment includes functional blocks (a signal generation unit 101, a band division unit 102, a narrowband signal processing unit 103, a digital-to-analog conversion unit 104, a wideband signal generation unit 11, and an optical modulator 12) provided in the optical transmitter 1 according to the first embodiment shown in FIG. 1 with respect to each of x-polarization and y-polarization. A transmission data sequence is divided into two data sequences corresponding to the x-polarization and the y-polarization in the signal generation unit. Each of the two data sequences is subjected to signal processing similar to the signal processing in the optical transmitter 1 according to the first embodiment.

Sixth Embodiment

Hereinafter, a sixth embodiment of the present invention will be described.

[Configuration of Optical Transmitter]

Figure 19:
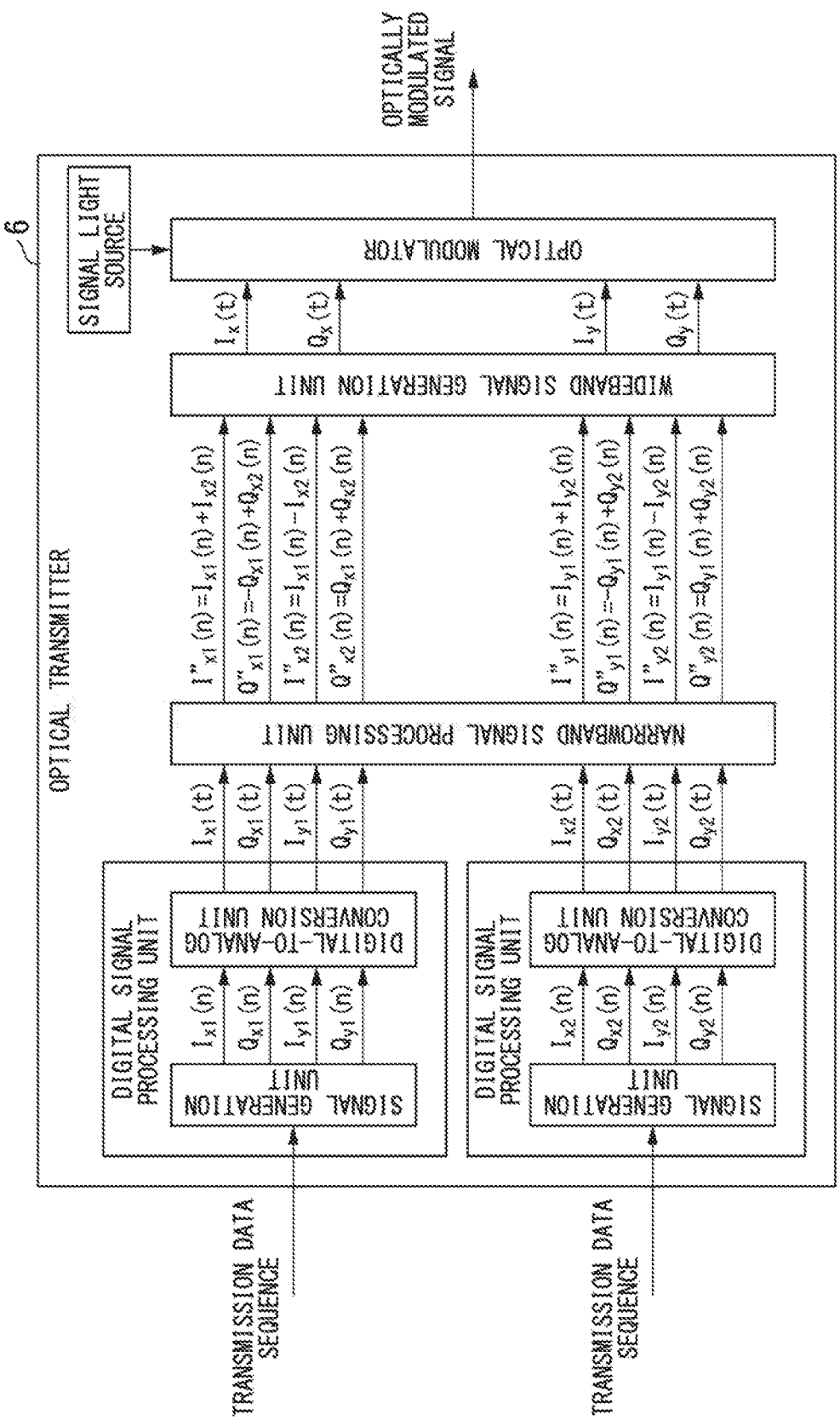
FIG. 19 is a diagram showing a configuration of an optical transmitter according to a sixth embodiment of the present invention.

FIG. 19 is a diagram showing a configuration of an optical transmitter 6 according to the sixth embodiment of the present invention.

As shown in FIG. 19, the optical transmitter 6 according to the sixth embodiment is another application example for a polarization-multiplexed signal. The optical transmitter 6 according to the sixth embodiment includes the functional blocks included in the optical transmitter 3 according to the third embodiment shown in FIG. 16 with respect to each of x-polarization and y-polarization.

Seventh Embodiment

Hereinafter, a seventh embodiment of the present invention will be described.

[Configuration of Optical Transmitter]

Figure 20:
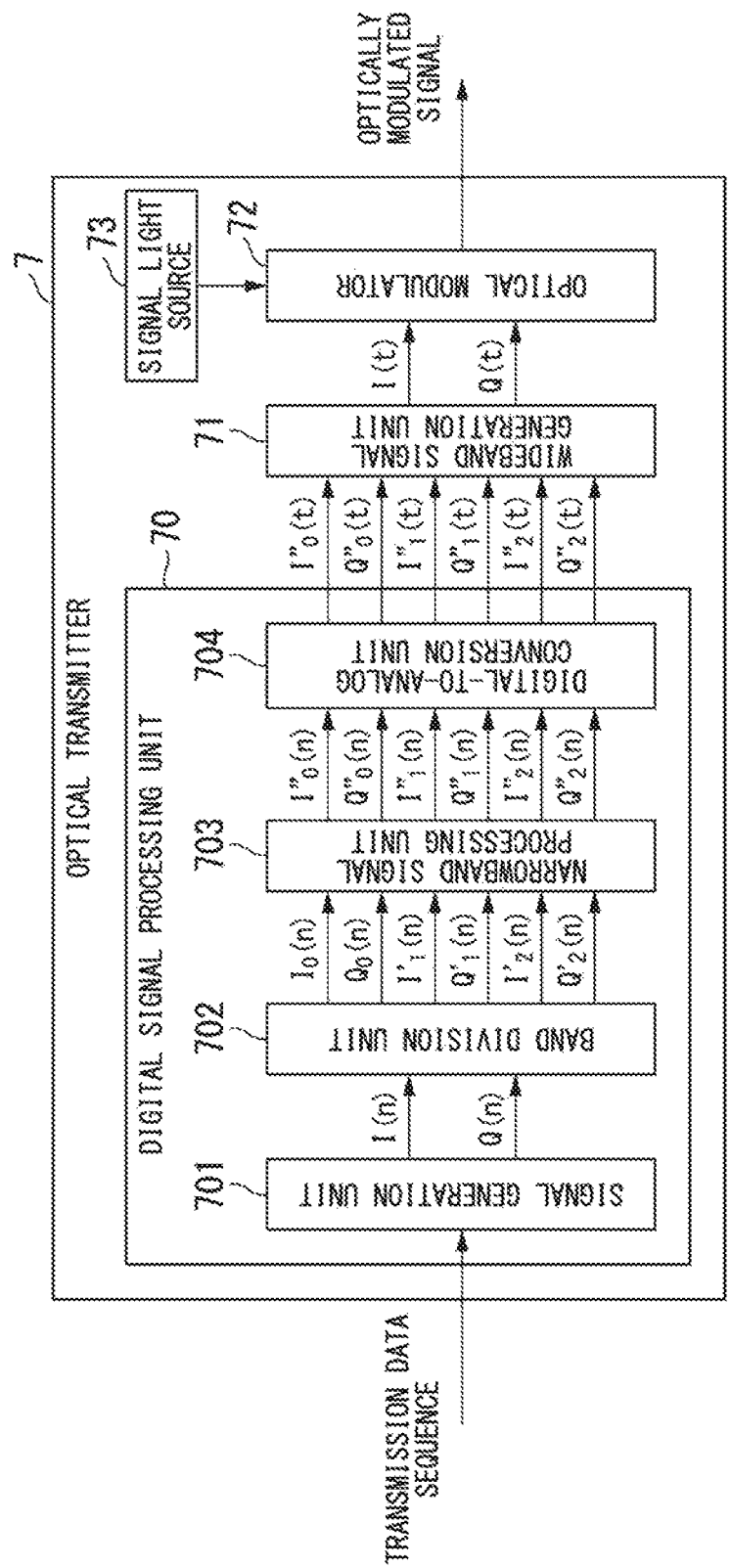
FIG. 20 is a diagram showing a configuration of an optical transmitter according to a seventh embodiment of the present invention.

FIG. 20 is a diagram showing a configuration of an optical transmitter 7 according to the seventh embodiment of the present invention.

As shown in FIG. 20, the optical transmitter 7 according to the seventh embodiment includes a digital signal processing unit 70 including a signal generation unit 701, a band division unit 702, a narrowband signal processing unit 703, and a digital-to-analog conversion unit 704, a wideband signal generation unit 71, an optical modulator 72, and a signal light source 73.

In the above-described embodiments, the optical transmitter divides a wideband signal into two narrowband signals (i.e., an upper sideband signal and a lower sideband signal). On the other hand, in the seventh embodiment, the optical transmitter 7 divides a wideband signal into three narrowband signals.

In the seventh embodiment, it is necessary to further consider the narrow band signals ($I_0$, $Q_0$) in addition to the narrowband signals ($I_1$, $Q_1$) and ($I_2$, $Q_2$) in the above-described embodiment. However, the configuration of the optical transmitter 7 according to the seventh embodiment can take a variation similar to that of the configuration of the optical transmitter that divides a wideband signal into two narrowband signals as described above.

For example, the configuration of the optical transmitter 7 according to the seventh embodiment can include a plurality of digital signal processing units 70 as in the configuration of the optical transmitter 3 according to the third embodiment shown in FIG. 16.

Also, the configuration of the optical transmitter 7 according to the seventh embodiment can be applied to a polarization-multiplexed signal as in the configuration of the optical transmitter 5 according to the fifth embodiment shown in FIG. 18 and the configuration of the optical transmitter 6 according to the sixth embodiment shown in FIG. 19.

Figure 21:
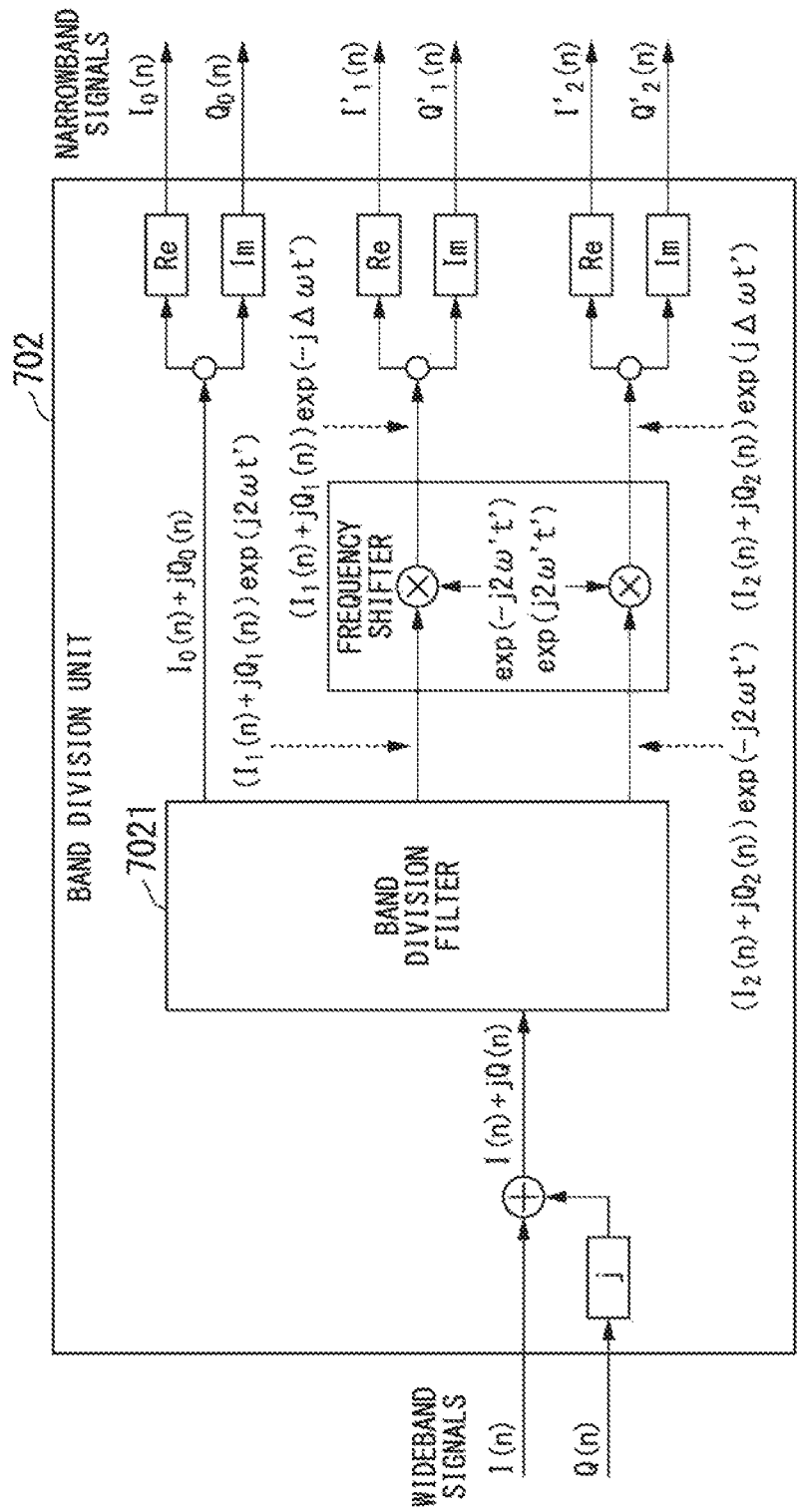
FIG. 21 is a diagram showing a configuration of a band division unit of the optical transmitter according to the seventh embodiment of the present invention.
Figure 22:
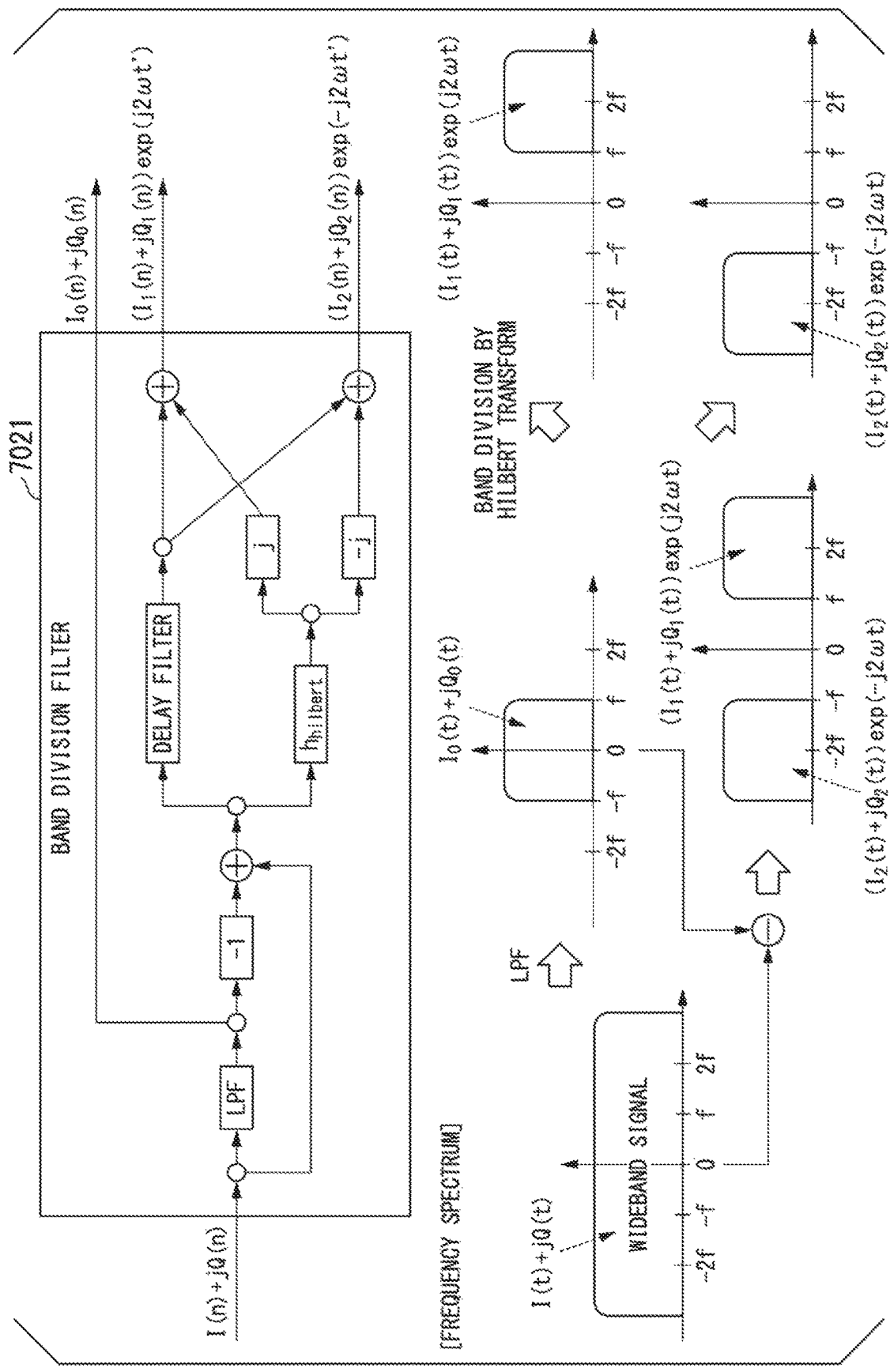
FIG. 22 is a diagram showing a configuration of a band division filter of the band division unit of the optical transmitter according to the seventh embodiment of the present invention.

FIG. 21 is a diagram showing a configuration of the band division unit 702 of the optical transmitter 7 according to the seventh embodiment of the present invention. Also, FIG. 22 is a diagram showing a configuration of a band division filter 7021 of the band division unit 702 of the optical transmitter 7 according to the seventh embodiment of the present invention.

Figure 23:
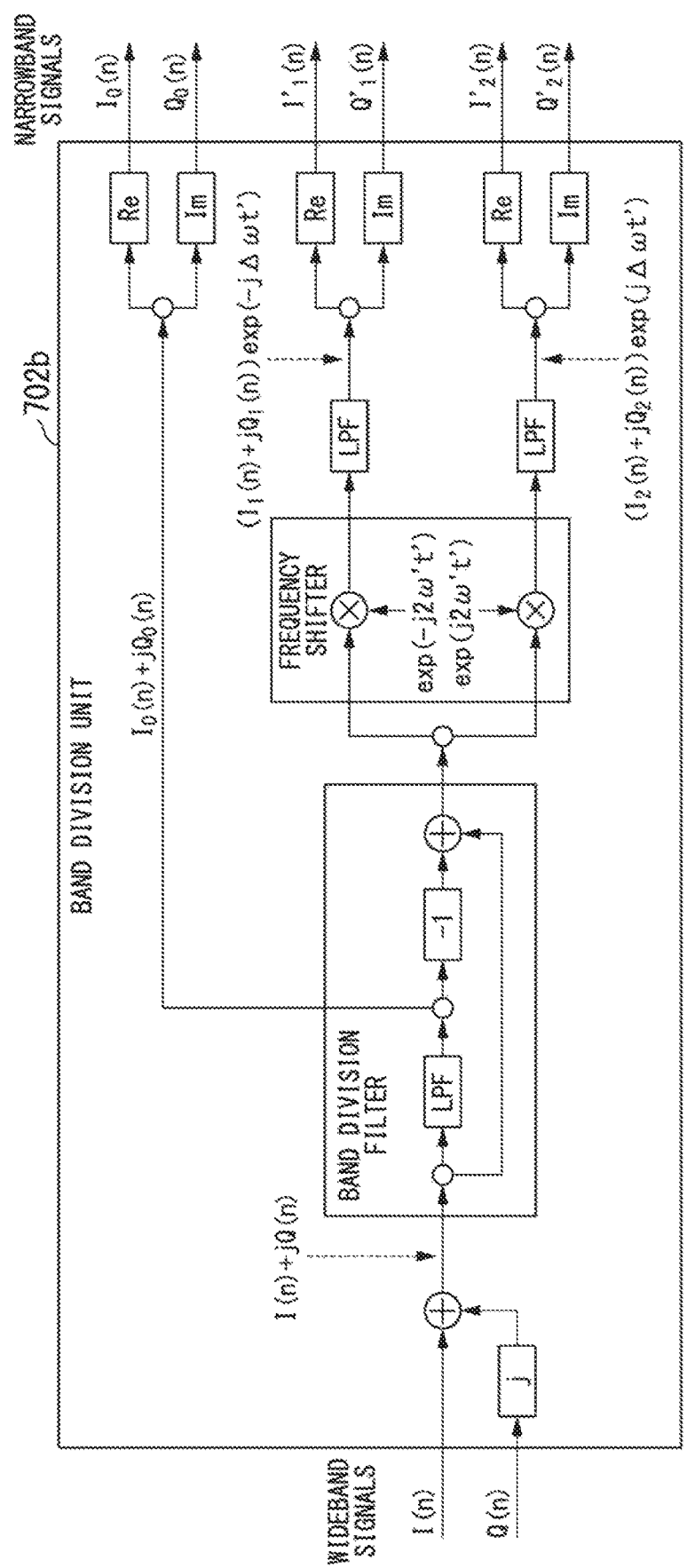
FIG. 23 is a diagram showing another configuration of the band division unit of the optical transmitter according to the seventh embodiment of the present invention.

Also, the band division unit 702 may include a configuration in which band division is performed without using the Hilbert transform as in the band division unit 102b shown in FIG. 6. FIG. 23 is a diagram showing a configuration of a band division unit 702b that divides a wideband signal into three narrowband signals without using the Hilbert transform.

Figure 24:
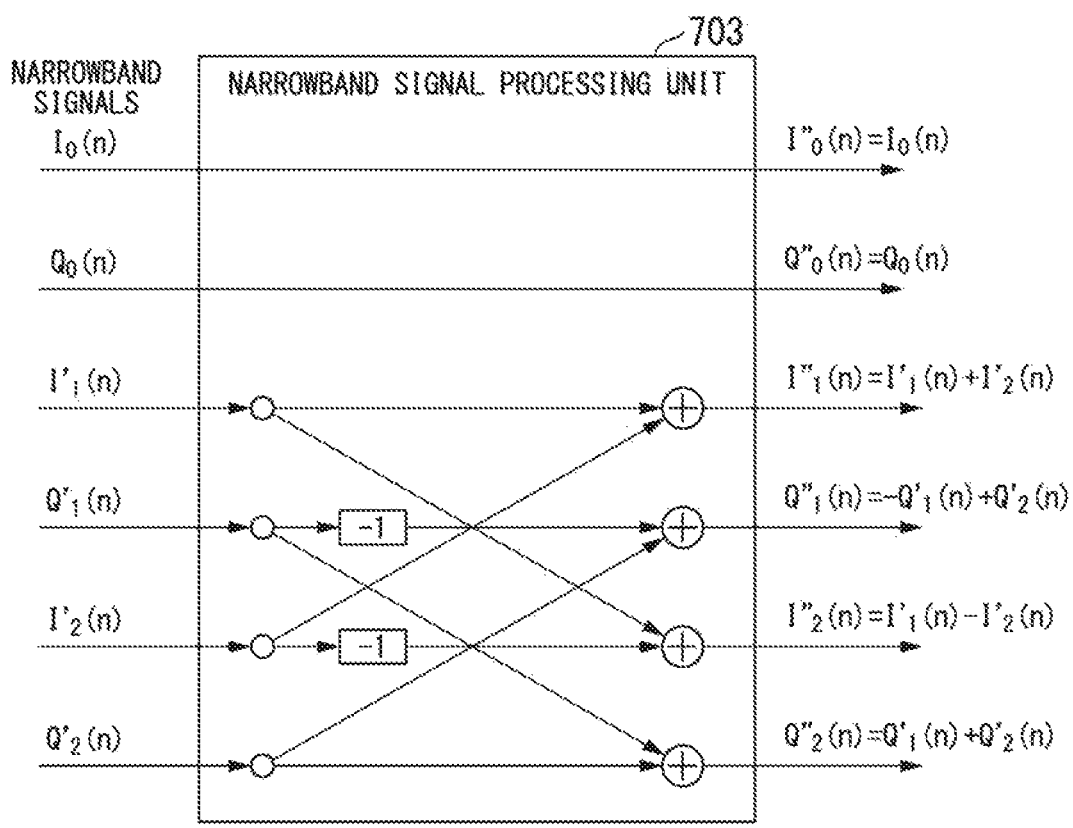
FIG. 24 is a diagram showing a configuration of a narrowband signal processing unit of the optical transmitter according to the seventh embodiment of the present invention.

FIG. 24 is a diagram showing a configuration of the narrowband signal processing unit 703 of the optical transmitter 7 according to the seventh embodiment of the present invention. As shown in FIG. 24, the configuration of the narrowband signal processing unit 703 according to the seventh embodiment is a minimum configuration equivalent to the configuration of the narrowband signal processing unit 103 according to the first embodiment shown in FIG. 9. Also, in the seventh embodiment, when waveform equalization as in the narrowband signal processing unit 103b shown in FIG. 10 is taken into account, it is only necessary to extend a 4×4 configuration in the narrowband signal processing unit 103b shown in FIG. 10 to a 6×6 configuration.

Figure 25:
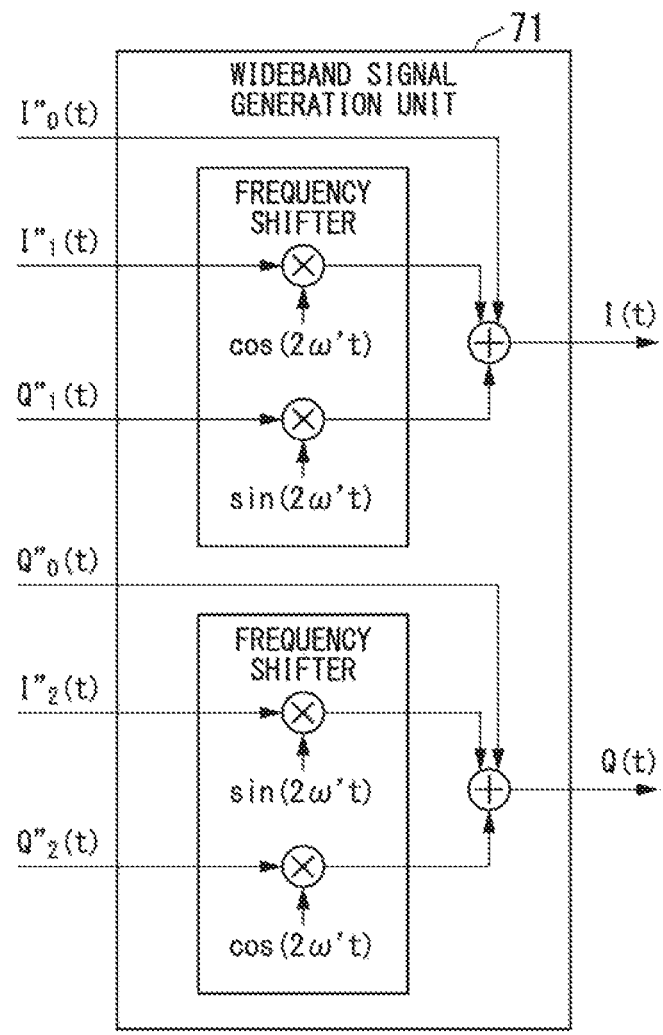
FIG. 25 is a diagram showing a configuration of a wideband signal generation unit of the optical transmitter according to the seventh embodiment of the present invention.

FIG. 25 is a diagram showing a configuration of the wideband signal generation unit 71 of the optical transmitter 7 according to the seventh embodiment of the present invention. As shown in FIG. 25, the configuration of the wideband signal generation unit 71 according to the seventh embodiment is equivalent to the configuration of the wideband signal generation unit 11 according to the first embodiment shown in FIG. 12, except that the narrowband signals $I_0''$ and $Q_0''$ are added to the outputs of the frequency shifters, respectively.

Also, it is only necessary to use an operation signal output circuit, a switch circuit, and a power combiner in an analog circuit that implements the wideband signal generation unit 71 as in the configuration of the wideband signal generation unit 11b shown in FIG. 13.

[Broadband Signal Generation Process (in Case that the Bandwidth of Wideband Signal is Triple Those of Narrowband Signals)]

As described above, the optical transmitter 7 according to the seventh embodiment divides a wideband signal into three narrowband signals using the Hilbert transform, and shifts the band of each of the three signals obtained by the band division, thereby obtaining three narrowband signals. The optical transmitter 7 performs digital-to-analog conversion on each of the three narrowband signals. The optical transmitter 7 shifts the bands of two signals of the three narrowband signals converted into analog signals. The optical transmitter 7 generates a wideband signal by performing an addition process on the three narrowband signals. The above-described process can be represented as follows. Two narrowband signals other than the narrowband signal near 0 Hz among the three narrowband signals are frequency-shift targets.

The optical transmitter 7 divides the wideband signal into three narrowband signals using an LPF and a Hilbert transform. Among the three bands of the signals, the band having the highest frequency is defined as a first band, the band having the lowest frequency is defined as a second band, and the band having the intermediate frequency is defined as a third band. The optical transmitter 7 shifts the bands of the signals of the first band and the second band by frequencies −f' and f'. The frequency shifter of the band division unit 702 multiplies the signal of the first band by a sinusoidal signal $\exp(j\omega't)$ and multiplies the signal of the second band by a sinusoidal signal $\exp(j\omega't)$. The signal processing in the band division unit 702 is represented by (Expression 11).

$I + jQ = I_0 + jQ_0 + (I_1 + jQ_1)\exp(j2\omega t) +$  (Expression 11)

$(I_2 + jQ_2)\exp(-j2\omega t)$ $= I_0 + jQ_0 + (I_1 + jQ_1)\exp(j(2\omega' - \Delta\omega)t) +$ $(I_2 + jQ_2)\exp(-j(2\omega' - \Delta\omega)t)$ $I_0 + jQ_0 + (I_1 + jQ_1)\exp(-j\Delta\omega t)\exp(j2\omega' t) +$ $(I_2 + jQ_2)\exp(j\Delta\omega t)\exp(-j2\omega' t)$ Each of the three narrowband signals is represented as shown in (Expressions 12). Also, the signal ($I_0$+$jQ_0$) of the third band passes through the LPF. The optical transmitter 7 can obtain signals of the first band and the second band by band-dividing the wideband signal from which the signal ($I_0$+$jQ_0$) is subtracted by means of the Hilbert transform.

Third band signal:  (Expression 12)

$I_0 + jQ_0$,

First band signal:

$(I_1 + jQ_1)\exp(-j\Delta\omega t) = I_1\cos\Delta\omega t + Q_1\sin\Delta\omega t +$
$\qquad j(-I_1\sin\Delta\omega t + Q_1\cos\Delta\omega t)$
$\qquad = I'_1 + jQ'_1$, Second band signal:

$(I_2 + jQ_2)\exp(j\Delta\omega t) = I_2\cos\Delta\omega t - Q_2\sin\Delta\omega t +$
$\qquad j(I_2\sin\Delta\omega t + Q_2\cos\Delta\omega t)$
$\qquad = I'_2 + jQ'_2$ The optical transmitter 7 shifts the bands of the narrowband signals corresponding to the first and second bands by the frequencies 2f' and −2f', respectively. The narrowband signal corresponding to the first band is multiplied by the sinusoidal signal (exp(j2ω't)), and the narrowband signal corresponding to the second band is multiplied by the sinusoidal signal exp(−j2ω't). Also, ω'=2πf'. The frequency-shifted signal is represented by (Expressions 13).

$(I_1'+jQ_1')\exp(j2\omega't)=I_1'\cos 2\omega't-Q_1'\sin 2\omega't+j(I_1'\sin 2\omega't+Q_1'\cos 2\omega't)$, $(I_2'+jQ_2')\exp(-j2\omega't)=I_2'\cos 2\omega't+Q_2'\sin 2\omega't+j(-I_2'\sin 2\omega't+Q_2'\cos 2\omega't)$  (Expressions 13)

The wideband signal generation unit 71 of the optical transmitter 7 performs an addition process on the above-described three narrowband signals. Thereby, a wideband signal is generated from the three narrowband signals shown in (Expressions 14).

$I + jQ =$  (Expression 14)

$I_0 + jQ_0 + (I'_1 + I'_2)\cos2\omega't + (-Q'_1 + Q'_2)\sin2\omega't +$ $j[(I'_1 - I'_2)\sin2\omega't + (Q'_1 + Q'_2)\cos2\omega't] =$ $I_0 + I''_1\cos2\omega't + Q''_1\sin2\omega't +$ $j(Q_0 + I''_2\sin2\omega't + Q''_2\cos2\omega't)$ Also, in the above, j: imaginary unit, ω=2πf (rad/s), f=b/4 (Hz), b: baud rate (baud=1/s), ω'=2πf'=2π(f+Δf)=ω+Δω. Also, in the above, signals I and Q are functions of time t, but (t) is omitted.

Also, any frequency (real number) is applicable to the frequency Δf, but it is desirable to satisfy Δf≥0 when the influence of harmonic waves is taken into account as described for using the wideband signal generation unit 11b shown in FIG. 13. This is because when Δf<0, harmonic waves are generated within the band range of wideband signal and the signal quality is deteriorated.

Also, as described above, the optical transmitters according to the first to sixth embodiments of the present invention divide a wideband signal into two narrowband signals, perform digital-to-analog conversion, and generate a wideband signal from the two narrowband signals converted into analog signals. Also, as described above, the optical transmitter according to the seventh embodiment of the present invention divides a wideband signal into three narrowband signals, performs digital-to-analog conversion, and generates a wideband signal from the three narrowband signals converted into analog signals.

As described below, according to the present invention, it is possible to further make an extension so that a wideband signal having a bandwidth that is 2N times (2 times, 4 times, 6 times, or the like) a bandwidth of a narrowband signal is generated using 2N (2, 4, 6, or the like) narrowband signals. Also, according to the present invention, it is possible to make an extension so that a wideband signal having a band that is (2N+1) times (3 times, 5 times, 7 times, or the like) a band of a narrowband signal is generated using 2N+1 (3, 5, 7, or the like) narrowband signals.

<Wideband Signal Generation Process (Extension to Bandwidth Multiplied by 2N)>

Hereinafter, the case that an optical transmitter generates a wideband signal having a bandwidth that is 2N times those of narrowband signals using 2N narrowband signals will be described. The optical transmitter divides the wideband signal into 2N signals and shifts the bands of the 2N signals obtained by the band division by frequencies (−(2k−1)f') and (2k−1)f'. The bands of the signals obtained by the band division are shifted by signal processing for multiplying by sinusoidal signals exp(−j(2k−1)(ω't) and exp(j(2k−1)ω't). The optical transmitter divides the wideband signal into 2N narrowband signals and then performs digital-to-analog conversion on each narrowband signal.

The optical transmitter shifts the bands of the 2N narrowband signals converted into the analog signals. The optical transmitter generates a wideband signal by performing an addition process on the frequency-shifted 2N narrowband signals. The above process can be represented as follows.

The optical transmitter divides the wideband signal into 2N signals and shifts the bands of the 2N signals by frequencies (−(2k−1)f') and (2k−1)f', respectively, where k=1, 2, ..., (N/2). Among the 2N signals obtained by the band division, a signal having a center frequency greater than 0 Hz is multiplied by a sinusoidal signal exp(−j(2k−1)(ω't) and converted into a signal in the vicinity of 0 Hz. A signal having a center frequency less than 0 Hz is multiplied by a sinusoidal signal exp(j(2k−1)ω't) and converted into a signal in the vicinity of 0 Hz. A signal (I+jQ) band-divided into 2N signals is represented by (Expression 15).

$I + jQ = \sum_k [(I_{2k-1} + jQ_{2k-1})\exp(j(2k-1)\omega t) +$  (Expression 15)

$(I_{2k} + jQ_{2k})\exp(-j(2k-1)\omega t)]$ $= \sum_k [(I_{2k-1} + jQ_{2k-1})\exp(-j\Delta\omega t)\exp$ -continued
$$(j(2k-1)\omega't) +$$
$$(I_{2k} + jQ_{2k})\exp(j\Delta\omega t)\exp$$
$$(-j(2k-1)\omega't)]$$

Each of the 2N narrowband signals is represented as shown in (Expressions 16).

$$(I_{2k-1} + jQ_{2k-1})\exp(-j\Delta\omega t) = I_{2k-1}\cos\Delta\omega t + \quad \text{(Expressions 16)}$$
$$Q_{2k-1}\sin\Delta\omega t +$$
$$j(-I_{2k-1}\sin\Delta\omega t +$$
$$Q_{2k-1}\cos\Delta\omega t)$$
$$= I'_{2k-1} + jQ'_{2k-1},$$

$$(I_{2k} + jQ_{2k})\exp(j\Delta\omega t) = I_{2k}\cos\Delta\omega t - Q_{2k}\sin\Delta\omega t +$$
$$j(I_{2k}\sin\Delta\omega t - Q_{2k}\cos\Delta\omega t)$$
$$= I'_{2k} + jQ'_{2k}$$

The optical transmitter shifts the bands of the above-described 2N narrowband signals by the frequency (±(2k−1)f'). As shown in (Expressions 17), 2N narrowband signals are multiplied by a sinusoidal signal $\exp(\pm j(2k-1)\omega't)$, respectively.

$$(I_{2k-1}'+jQ_{2k-1}')\exp(j(2k-1)\omega't) = I_{2k-1}'\cos(2k-1)\omega't - Q_{2k-1}'\sin(2k-1)\omega't + j(I_{2k-1}'\sin(2k-1)\omega't + Q_{2k-1}'\cos(2k-1)\omega't),$$

$$(I_{2k}'+jQ_{2k}')\exp(-j(2k-1)\omega't) = I_{2k}'\cos(2k-1)\omega't + Q_{2k}'\sin(2k-1)\omega't + j(-I_{2k}'\sin(2k-1)\omega't + Q_{2k}'\cos(2k-1)\omega't) \quad \text{(Expression 17)}$$

The optical transmitter performs an addition process on the above-described 2N narrowband signals. Thereby, as shown in (Expression 18), a wideband signal having the same bandwidth as the wideband signal before band division is generated from 2N narrowband signals.

$$I + jQ = (I'_1 + I'_2)\cos\omega't + (-Q'_1 + Q'_2)\sin\omega't + \quad \text{(Expressions 18)}$$
$$j[(I'_1 - I'_2)\sin\omega't + (Q'_1 + Q'_2)\cos\omega't] +$$
$$(I'_3 + I'_4)\cos 3\omega't + (-Q'_3 + Q'_4)\sin 3\omega't +$$
$$j[(I'_3 - I'_4)\sin 3\omega't + (Q'_3 + Q'_4)\cos 3\omega't] + \ldots$$
$$= \sum_k [(I'_{2k-1} + I'_{2k})\cos(2k-1)\omega't +$$
$$(-Q'_{2k-1} + Q'_{2k})\sin(2k-1)\omega't +$$
$$j((I'_{2k-1} - I'_{2k})\sin(2k-1)\omega't +$$
$$(Q'_{2k-1} + Q'_{2k})\cos(2k-1)\omega't]$$
$$= \sum_k [I''_{2k-1}\cos(2k-1)\omega't +$$
$$Q''_{2k-1}\sin(2k-1)\omega't +$$
$$j(I''_{2k}\sin(2k-1)\omega't) +$$
$$Q''_{2k}\cos(2k-1)\omega't)]$$

Also, in the above, j: imaginary unit, $\omega = 2\pi f$ (rad/s), $f = b/4$ (Hz), b: baud rate (baud=1/s), $\omega' = 2\pi f' = 2\pi(f+\Delta f) = \omega + \Delta\omega$. Also, in the above, signals I and Q are functions of time t, but (t) is omitted.

Also, any frequency (real number) is applicable to the frequency $\Delta f$, but it is desirable to satisfy $\Delta f \geq 0$ when the influence of harmonic waves is taken into account as described for using the wideband signal generation unit 11b shown in FIG. 13. This is because when $\Delta f < 0$, harmonic waves are generated within the band range of the wideband signal and the signal quality is deteriorated.

<Wideband Signal Generation Processing (Extension to Bandwidth Multiplied by (2N+1))>

Hereinafter, the case that an optical transmitter generates a wideband signal having a bandwidth that is (2N+1) times those of narrowband signals using (2N+1) narrowband signals will be described. The optical transmitter divides the wideband signal into (2N+1) signals and shifts the bands of the signals by frequencies (−2kf') and 2kf'. The bands of signals obtained by the band division are shifted by signal processing for multiplying by sinusoidal signals $\exp(-j(2k\omega't))$ and $\exp(j2k\omega't)$. The optical transmitter divides the wideband signal into (2N+1) narrowband signals and then performs digital-to-analog conversion on each narrowband signal.

The optical transmitter shifts the bands of 2N narrowband signals among the (2N+1) narrowband signals converted into the analog signals. The optical transmitter generates a wideband signal by performing an addition process on the (2N+1) narrowband signals. The above-described process can be represented as follows.

The optical transmitter divides a wideband signal into (2N+1) signals, and shifts the bands of the (2N+1) signals by frequencies (−2kf') and (2kf'), respectively, where k=1, 2, ..., (N/2). Among the (2N+1) signals obtained by the band division, a signal which has the center frequency greater than 0 Hz and which does not include 0 Hz in the band is multiplied by a sinusoidal signal $\exp(-j(2k\omega't))$ and converted into a signal in the vicinity of 0 Hz. A signal which has the center frequency less than 0 Hz and which does not include 0 Hz in the band is multiplied by a sinusoidal signal $\exp(j(2k\omega't))$ and converted into a signal in the vicinity of 0 Hz. Among the signals obtained by the band division, the signal $(I_0+jQ_0)$ of which the band range includes 0 Hz is not frequency-shift target. The signal (I+jQ) band-divided into (2N+1) signals is represented by (Expression 19).

$$I + jQ = I_0 + jQ_0 + \sum_k [(I_{2k-1} + \quad \text{(Expression 19)}$$
$$jQ_{2k-1})\exp(j2k\omega t) +$$
$$(I_{2k} + Q_{2k})\exp(-j2k\omega t)]$$
$$= I_0 + jQ_0 + \sum_k [(I_{2k-1} + jQ_{2k-1})$$
$$\exp(-j\Delta\omega t)\exp(j2k\omega't) +$$
$$(I_{2k} + Q_{2k})\exp(j\Delta\omega t)\exp(-j2k\omega't)]$$

(2N+1) narrowband signals are represented as shown in (Expressions 20).

$$I_0 + jQ_0, \quad \text{(Expressions 20)}$$
$$(I_{2k-1} + jQ_{2k-1})\exp(-j\Delta\omega t) = I_{2k-1}\cos\Delta\omega t + Q_{2k-1}\sin\Delta\omega t +$$
$$j(-I_{2k-1}\sin\Delta\omega t + Q_{2k-1}\cos\Delta\omega t)$$
$$= I'_{2k-1} + jQ'_{2k-1},$$

$$(I_{2k} + jQ_{2k})\exp(j\Delta\omega t) = I_{2k}\cos\Delta\omega t - Q_{2k}\sin\Delta\omega t +$$
$$j(I_{2k}\cos\Delta\omega t - Q_{2k}\sin\delta\omega t)$$
$$= I'_{2k} + jQ'_{2k}$$

The optical transmitter shifts the bands of the above-described (2N+1) narrowband signals by a frequency (±2kf). As shown in (Expressions 21), 2N narrowband signals among the (2N+1) narrowband signals are multiplied by the sinusoidal signal exp(±j2kω't), respectively. However, the optical transmitter does not shift the band of the narrowband signal ($I_0+jQ_0$).

$$I_0 + jQ_0, \quad \text{(Expressions 21)}$$
$$(I'_{2k-1} + jQ'_{2k-1})\exp(j2k\omega' t) = I'_{2k-1}\cos 2k\omega' t - Q'_{2k-1}\sin 2k\omega' t +$$
$$j(I'_{2k-1}\sin 2k\omega' t + Q'_{2k-1}\cos 2k\omega' t),$$
$$(I'_{2k} + jQ'_{2k})\exp(-j2k\omega' t) = I'_{2k}\cos 2k\omega + Q'_{2k}\sin 2k\omega' +$$
$$j(-I'_{2k}\sin 2k\omega' t + Q'_{2k}\cos 2k\omega' t)$$

The optical transmitter performs an addition process on the above-described (2N+1) narrowband signals. Thereby, as shown in (Expression 22), a wideband signal having the same bandwidth as the wideband signal before band division is generated from the (2N+1) narrowband signals.

$$\begin{aligned}I + jQ = & I_0 + jQ_0 + (I'_1 + I'_2)\cos\omega' t + \\ & (-Q'_1 + Q'_2)\sin 2\omega' t + \\ & j[(I'_1 - I'_2)\sin 2\omega' t + (Q'_1 + Q'_2)\cos 2\omega' t] + \\ & +(I'_3 + I'_4)\cos 4\omega' t + (-Q'_3 + Q'_4)\sin 4\omega' t \\ & (-Q'_3 + Q'_4)\sin 4\omega' t + \\ & j[(I'_3 - I'_4)\sin 4\omega' t + \\ & (Q'_3 + Q'_4)\cos 4\omega' t] + \\ = & I_0 + jQ_0 + \sum_k [(I'_{2k-1} + I'_{2k})\cos 2k\omega' t + \\ & (-Q'_{2k-1} + Q'_{2k})\sin 2k\omega' t + \\ & j((I'_{2k-1} - I'_{2k})\sin 2k\omega' t + \\ & (Q'_{2k-1} + Q'_{2k})\cos 2k\omega' t)] \\ = & I_0 + jQ_0 + \sum_k [I''_{2k-1}\cos 2k\omega' t + \\ & Q''_{2k-1}\sin 2k\omega' t + \\ & j(I''_{2k}\sin 2k\omega' t + Q''_{2k}\cos 2k\omega' t)]\end{aligned}$$

(Expression 22)

Also, in the above, j: imaginary unit, ω=2πf (rad/s), f=b/4 (Hz), b: baud rate (baud=1/s), ω'=2πf'=2π(f+Δf)=ω+Δω. Also, in the above, signals I and Q are functions of time t, but (t) is omitted.

Also, any frequency (real number) is applicable to the frequency Δf, but it is desirable to satisfy Δf≥0 when the influence of harmonic waves is taken into account as described for using the wideband signal generation unit 11b shown in FIG. 13. This is because when Δf<0, harmonic waves are generated within the band range of the wideband signal and the signal quality is deteriorated.

As described above, according to the optical transmitter of the present invention, it is possible to combine a plurality of low-speed signals (narrowband signals) in an analog manner and generate a high-speed signal (a wideband signal). Specifically, it is possible to generate a high-speed signal with a simple configuration using an addition/subtraction circuit and a frequency shifter (for example, a switch circuit) with respect to a low-speed signal.

Thereby, the optical transmitter of the present invention can increase a modulation speed without being limited to the output bandwidth of the DAC.

Also, according to the optical transmitter of the present invention, it is possible to easily implement an extension for generating a wideband signal having a bandwidth that is 2N times (2 times, 4 times, 6 times, or the like) that of a narrowband signal using 2N (2, 4, 6, or the like) narrowband signals or an extension for generating a wideband signal having a band that is (2N+1) times (3 times, 5 times, 7 times, or the like) that of a narrowband signal using (2N+1) (3, 5, 7, or the like) narrowband signals.

Furthermore, the optical transmitter of the present invention can equalize the deterioration of signal quality caused by imperfection of the analog device of the DAC or the combining unit when a high-speed signal is generated from a low-speed signal.

Eighth Embodiment

Figure 26:
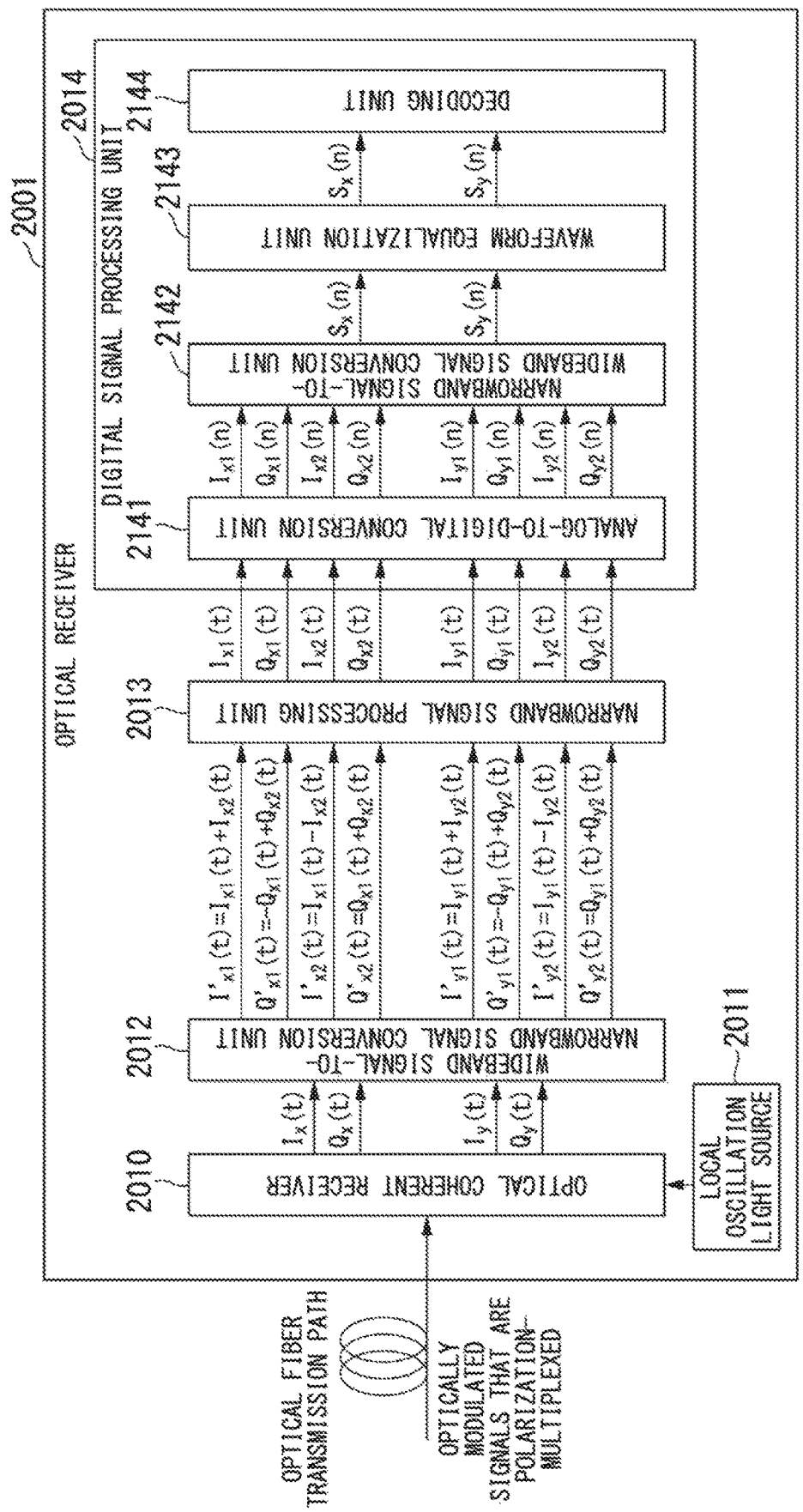
FIG. 26 is a diagram showing a configuration of an optical receiver according to an eighth embodiment of the present invention.

Hereinafter, an eighth embodiment of the present invention will be described.
[Configuration of Optical Receiver]
FIG. 26 is a diagram showing a configuration of an optical receiver 2001 according to the eighth embodiment of the present invention.

As shown in FIG. 26, the optical receiver 2001 according to the present embodiment includes an optical coherent receiver 2010, a local oscillation light source 2011, a wideband signal-to-narrowband signal conversion unit 2012, a narrowband signal processing unit 2013, and a digital signal processing unit 2014. Also, the digital signal processing unit 2014 includes an analog-to-digital conversion unit 2141, a narrowband signal-to-wideband signal conversion unit 2142, a waveform equalization unit 2143, and a decoding unit 2144.

The optical coherent receiver 2010 as a reception unit causes an optically modulated signal that has been polarization-multiplexed (a polarization-multiplexed signal) received from an optical fiber transmission path to interfere with local oscillation light output from the local oscillation light source 2011 and performs conversion into a baseband signals by a photoelectric converter (not shown). The optical coherent receiver 2010 outputs the baseband signals as wideband signals obtained by the conversion to the wideband signal-to-narrowband signal conversion unit 2012.

The wideband signal-to-narrowband signal conversion unit 2012 divides wideband signals ($I_x(t)$, $Q_x(t)$) and ($I_y(t)$, $Q_y(t)$) input from the optical coherent receiver 2010 into a plurality of wideband signals. The plurality of wideband signals includes two wideband signals in the present embodiment. The wideband signal-to-narrowband signal conversion unit 2012 shifts the bands of the plurality of wideband signals obtained by the division to form narrowband signals. The wideband signal-to-narrowband signal conversion unit 2012 outputs a plurality of frequency-shifted narrowband signals (($I_{x1}'(t)$, $Q_{x1}'(t)$), ($I_{x2}'(t)$, $Q_{x2}'(t)$), ($I_{y1}'(t)$, $Q_{y1}'(t)$), ($I_{y2}'(t)$, $Q_{y2}'(t)$)) to the narrowband signal processing unit 2013. Each narrowband signal is represented by (Expressions 23).

$$I_{x1}'(t)=I_{x1}(t)+I_{x2}(t),$$
$$Q_{x1}'(t)=-Q_{x1}(t)+Q_{x2}(t),$$
$$I_{x2}'(t)=I_{x1}(t)-I_{x2}(t),$$
$$Q_{x2}'(t)=Q_{x1}(t)+Q_{x2}(t),$$

$I_{y1}'(t)=I_{y1}(t)+I_{y2}(t),$ $Q_{y1}'(t)=-Q_{y1}(t)+Q_{y2}(t),$ $I_{y2}'(t)=I_{y1}(t)-I_{y2}(t),$ $Q_{y2}'(t)=Q_{y1}(t)+Q_{y2}(t)$  (Expressions 23)

The narrowband signal processing unit 2013 receives the plurality of narrowband signals input from the wideband signal-to-narrowband signal conversion unit 2012, and performs at least one of addition and subtraction processes on the plurality of narrowband signals. The narrowband signal processing unit 2013 outputs a plurality of narrowband signals (($I_{x1}(t)$, $Q_{x1}(t)$), ($I_{x2}(t)$, $Q_{x2}(t)$), ($I_{y1}(t)$, $Q_{y1}(t)$), ($I_{y2}(t)$, $Q_{y2}(t)$)) obtained by performing the at least one of the addition and subtraction processes to the analog-to-digital conversion unit 2141.

The analog-to-digital conversion unit 2141 converts the plurality of narrowband signals input from the narrowband signal processing unit 2013 into digital signals. The analog-to-digital conversion unit 2141 outputs the digital signals (($I_{x1}(n)$, $Q_{x1}(n)$), ($I_{x2}(n)$, $Q_{x2}(n)$), ($I_{y1}(n)$, $Q_{y1}(n)$), ($I_{y2}(n)$, $Q_{y2}(n)$)) obtained by the conversion to the narrowband signal-to-wideband signal conversion unit 2142.

The narrowband signal-to-wideband signal conversion unit 2142 shifts the bands of the digital signals that are narrowband signals input from the analog-to-digital conversion unit 2141, performs an addition process on the plurality of digital signals, and performs conversion into wideband signals. The narrowband signal-to-wideband signal conversion unit 2142 outputs wideband signals ($S_x(n)$ and $S_y(n)$) obtained by the conversion to the waveform equalization unit 2143.

The waveform equalization unit 2143 performs waveform equalization on the wideband signals input from the narrowband signal-to-wideband signal conversion unit 2142 and compensates for waveform deterioration due to wavelength dispersion, polarization fluctuation, and nonlinear optical effect that occur in the optical fiber transmission path. Also, the waveform equalization unit 2143 compensates for phase noise due to a frequency error between the laser on a transmission side and the laser on a reception side, and a line width of each laser. Also, the waveform equalization unit 2143 performs any other waveform equalization. The waveform equalization unit 2143 outputs wideband signals ($S_x(n)$ and $S_y(n)$) equalized by the above-described process to the decoding unit 2144.

The decoding unit 2144 decodes the wideband signals input from the waveform equalization unit 2143.

[Configuration of Wideband Signal-to-Narrowband Signal Conversion Unit]

Figure 27:
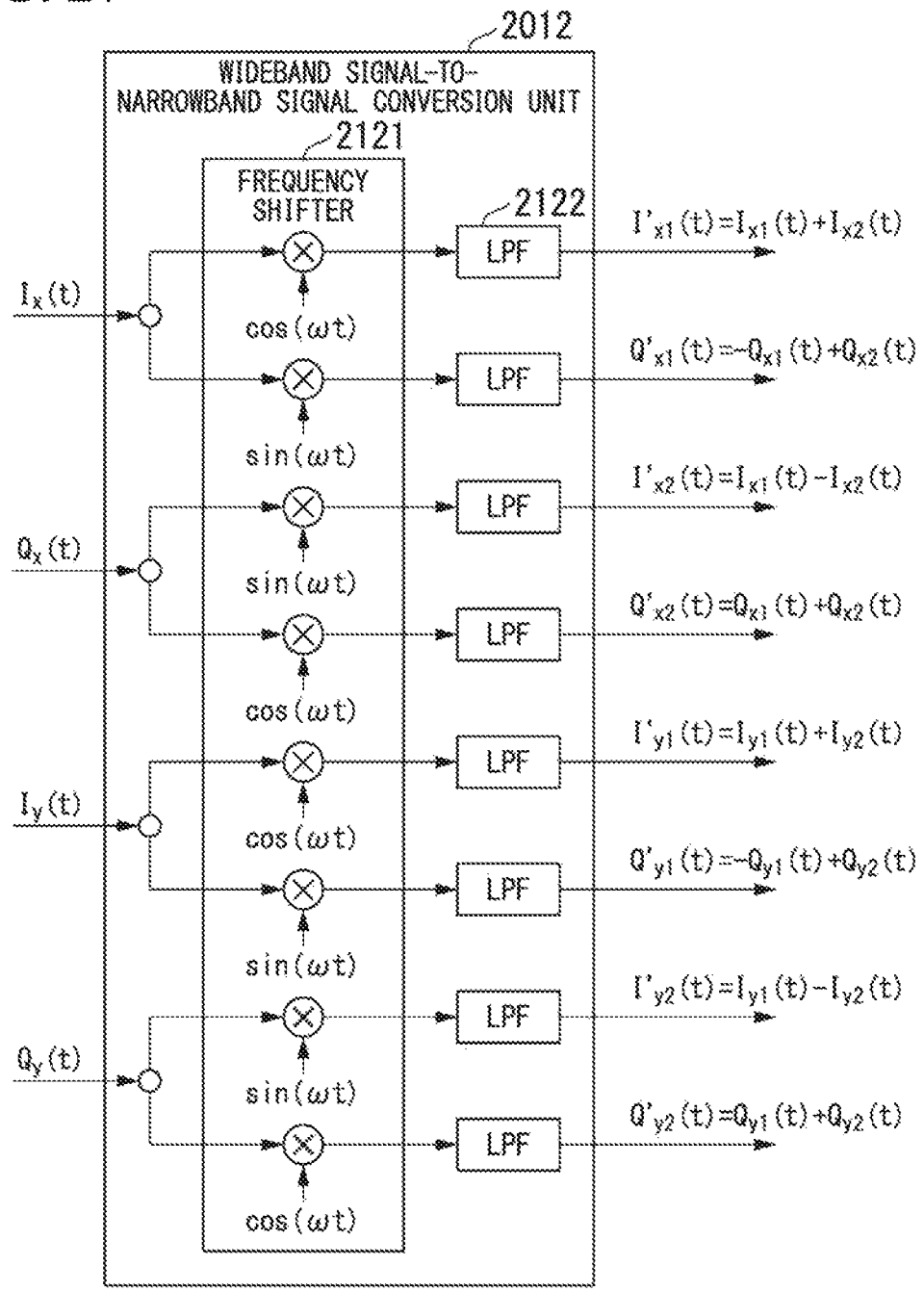
FIG. 27 is a diagram showing a configuration of a wideband signal-to-narrowband signal conversion unit of the optical receiver according to the eighth embodiment of the present invention.

FIG. 27 is a diagram showing a configuration of the wideband signal-to-narrowband signal conversion unit 2012 of the optical receiver 2001 according to the eighth embodiment of the present invention.

The wideband signal-to-narrowband signal conversion unit 2012 divides each of the wideband signals ($I_x(t)$, $Q_x(t)$) and ($I_y(t)$, $Q_y(t)$) input from the optical coherent receiver 2010 into a plurality of narrowband signals. The plurality of narrowband signals includes two narrowband signals in the present embodiment. For example, the wideband signal-to-narrowband signal conversion unit 2012 divides the wideband signal into the plurality of wideband signals by a power divider. The wideband signal-to-narrowband signal conversion unit 2012 shifts the bands of the plurality of wideband signals obtained by the division by means of the frequency shifter 2121 to form narrowband signals.

Also, any device such as a switch circuit can be used as a multiplication circuit (a mixer) in the frequency shifter. Also, any device such as a power combiner can be used as an addition circuit.

The wideband signal-to-narrowband signal conversion unit 2012 removes harmonic waves of a plurality of frequency-shifted narrowband signals by an LPF 2122. Also, the LPF 2122 may be omitted when the influence of harmonic waves can be ignored, for example, such as when harmonic waves are generated outside the analog band. Also, in the case of a system in which harmonic waves is allowed, the LPF 2122 may be omitted.

The wideband signal-to-narrowband signal conversion unit 2012 outputs narrowband signals (($I_{x1}'(t)$, $Q_{x1}'(t)$), ($I_{x2}'(t)$, $Q_{x2}'(t)$), ($I_{y1}'(t)$, $Q_{y1}'(t)$), ($I_{y2}'(t)$, $Q_{y2}'(t)$)) obtained by removing the harmonic waves with the LPF 2122 to the narrowband signal processing unit 2013. Each narrowband signal is represented by the above-described (Expressions 23).

The wideband signal-to-narrowband signal conversion unit 2012 multiplies an in-phase component $I_x(t)$ of the wideband signal ($I_x(t)$, $Q_x(t)$) by sinusoidal signals ($\cos(\omega t)$, $\sin(\omega t)$) having a phase difference of ($\pi/2$). The wideband signal-to-narrowband signal conversion unit 2012 shifts a band of a signal of the in-phase component $I_x(t)$ to a band near 0 Hz by multiplying the in-phase component $I_x(t)$ by the sinusoidal signal $\cos(\omega t)$. The wideband signal-to-narrowband signal conversion unit 2012 removes a harmonic component from the frequency-shifted signal and obtains a signal $I_{x1}'(t)$ indicating a sum of in-phase components of the upper sideband and the lower sideband of the wideband signal as a narrowband signal. Also, the wideband signal-to-narrowband signal conversion unit 2012 shifts a band of a signal of a quadrature component $Q_x(t)$ of the wideband signal to a band near 0 Hz by multiplying the in-phase component $I_x(t)$ by a sinusoidal signal $\sin(\omega t)$. The wideband signal-to-narrowband signal conversion unit 2012 removes a harmonic component from the frequency-shifted signal and obtains a signal $Q_{x1}'(t)$ indicating a difference between quadrature components of the upper sideband and the lower sideband of the wideband signal as a narrowband signal.

The wideband signal-to-narrowband signal conversion unit 2012 multiplies a quadrature component $Q_x(t)$ of the wideband signal ($I_x(t)$, $Q_x(t)$) by sinusoidal signals ($\sin(\omega t)$, $\cos(\omega t)$) having a phase difference of ($\pi/2$). The wideband signal-to-narrowband signal conversion unit 2012 shifts a band of a signal of an in-phase component $I_x(t)$ of the wideband signal to a band near 0 Hz by multiplying the quadrature component $Q_x(t)$ by the sinusoidal signal $\sin(\omega t)$. The wideband signal-to-narrowband signal conversion unit 2012 removes a harmonic component from the frequency-shifted signal and obtains a signal $I_{x2}'(t)$ indicating a difference between in-phase components of the upper sideband and the lower sideband of the wideband signal as a narrowband signal. Also, the wideband signal-to-narrowband signal conversion unit 2012 shifts a band of a signal of the quadrature component $Q_x(t)$ to a band near 0 Hz by multiplying the quadrature component $Q_x(t)$ by the sinusoidal signal $\cos(\omega t)$. The wideband signal-to-narrowband signal conversion unit 2012 removes a harmonic component from the frequency-shifted signal and obtains a signal $Q_{x1}'(t)$ indicating a sum of quadrature components of the upper sideband and the lower sideband of the wideband signal as a narrowband signal.

The wideband signal-to-narrowband signal conversion unit 2012 obtains narrowband signals (($I_{y1}'(t)$, $Q_{y1}'(t)$), ($I_{y2}'$ (t), $Q_{y2}'(t)$)) by performing signal processing similar to signal processing on the wideband signal ($I_x(t)$, $Q_x(t)$) with respect to the wideband signal ($I_y(t)$, $Q_y(t)$). Also, an angular frequency ω of the sinusoidal signals sin(ωt) and cos(ωt) for use in the frequency shift may be determined in accordance with an allowable bandwidth of an analog-to-digital converter used in a subsequent stage. The allowable bandwidth is represented by the sampling frequency of the analog-to-digital converter.

Figure 28:
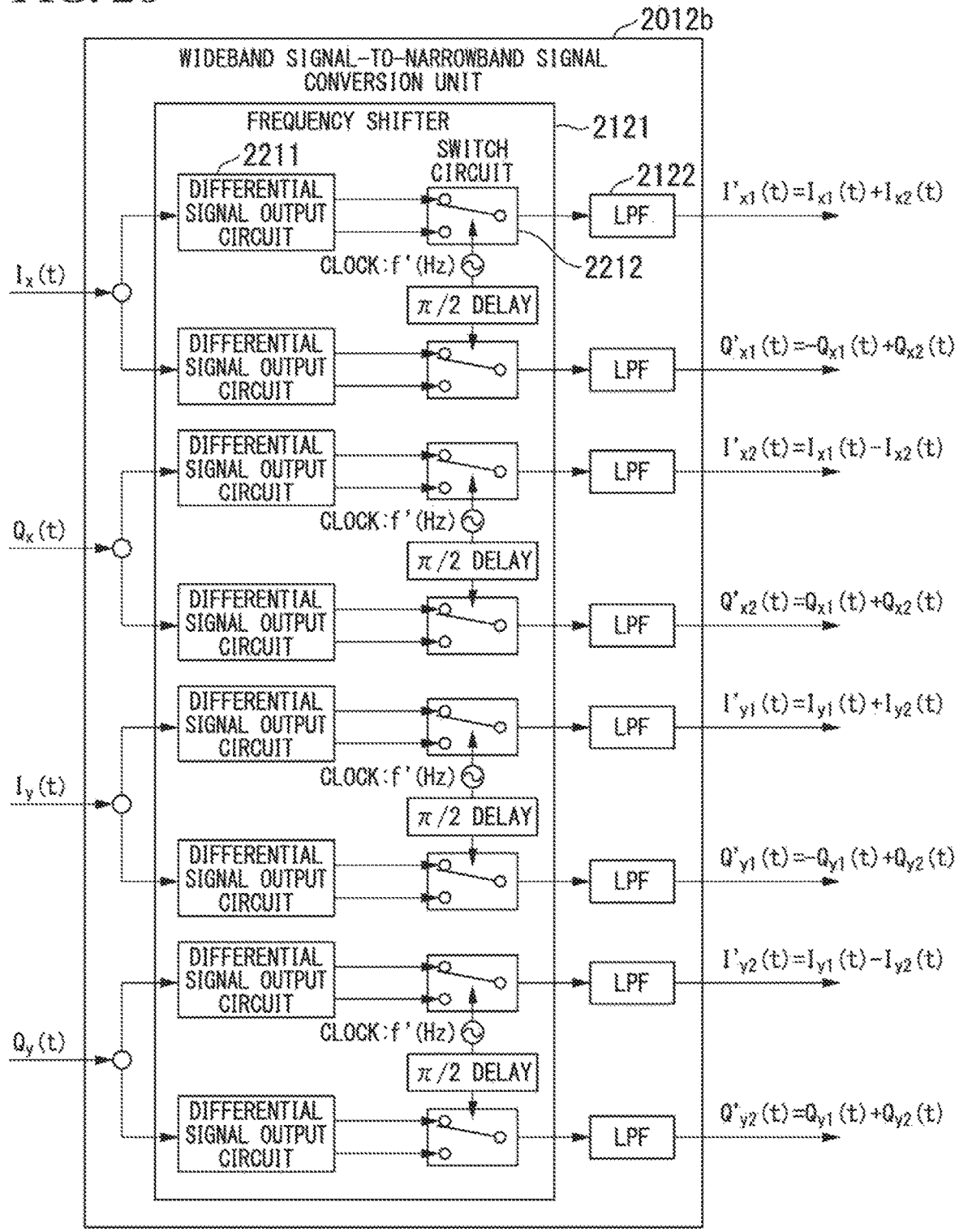
FIG. 28 is a diagram showing another configuration of the wideband signal-to-narrowband signal conversion unit of the optical receiver according to the eighth embodiment of the present invention.

Also, the wideband signal-to-narrowband signal conversion unit 2012 may include a differential signal output circuit 2211 in the frequency shifter 2121 as in the wideband signal-to-narrowband signal conversion unit 2012b shown in FIG. 28.

Also, the differential signal output circuit 2211 may be provided outside the frequency shifter 2121 and in a stage previous to the wideband signal-to-narrowband signal conversion unit 2012.

Also, when the optical coherent receiver 2010 has a differential output, the differential signal output circuit 2211 can be omitted.

Also, the input signals of the switch circuit 2212 may be differential signals.

[Configuration of Narrowband Signal Processing Unit]

Figure 29:
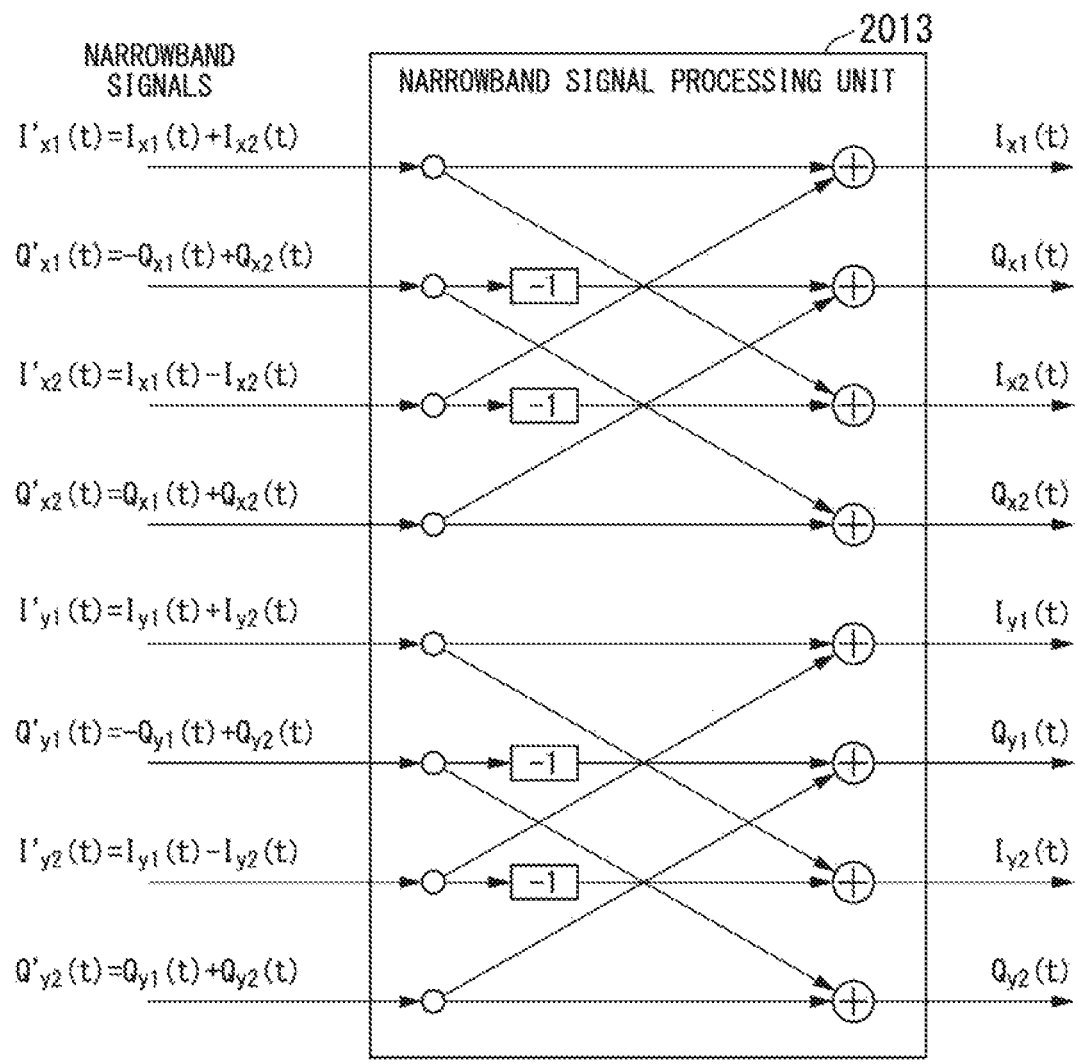
FIG. 29 is a diagram showing a configuration of a narrowband signal processing unit of the optical receiver according to the eighth embodiment of the present invention.

FIG. 29 is a diagram showing a configuration of the narrowband signal processing unit 2013 of the optical receiver 2001 according to the eighth embodiment of the present invention.

The narrowband signal processing unit 2013 receives the plurality of narrowband signals (($I_{x1}'(t)$, $Q_{x1}'(t)$), ($I_{x2}'(t)$, $Q_{x2}'(t)$), ($I_{y1}'(t)$, $Q_{y1}'(t)$), ($I_{y2}'(t)$, $Q_{y2}'(t)$)) from the wideband signal-to-narrowband signal conversion unit 2012, and performs at least one of addition and subtraction processes on the plurality of narrowband signals. The narrowband signal processing unit 2013 outputs a plurality of narrowband signals (($I_{x1}(t)$, $Q_{x1}(t)$), ($I_{x2}(t)$, $Q_{x2}(t)$), ($I_{y1}(t)$, $Q_{y1}(t)$), ($I_{y2}(t)$, $Q_{y2}(t)$)) obtained by performing the at least one of the addition and subtraction processes to the analog-to-digital conversion unit 2141.

The narrowband signal processing unit 2013 performs addition and subtraction processes shown in (Expressions 24) on input narrowband signals (($I_{x1}'(t)$, $Q_{x1}'(t)$), ($I_{x2}'(t)$, $Q_{x2}'(t)$). The narrowband signal processing unit 2013 obtains the upper sideband signal ($I_{x1}(t)$, $Q_{x1}(t)$) and the lower sideband signal ($I_{x2}(t)$, $Q_{x2}(t)$) of the wideband signal ($I_x(t)$, $Q_x(t)$) according to addition and subtraction processes shown in (Expressions 24). Also, the narrowband signal processing unit 2013 performs addition and subtraction processes shown in (Expressions 24) on input narrowband signals (($I_{y1}'(t)$, $Q_{y1}'(t)$), ($I_{y2}'(t)$, $Q_{y2}'(t)$). The narrowband signal processing unit 2013 obtains an upper sideband signal ($I_{y1}(t)$, $Q_{y1}(t)$) and a lower sideband signal ($I_{y2}(t)$, $Q_{y2}(t)$) of the wideband signal ($I_y(t)$, $Q_y(t)$) according to addition and subtraction processes shown in (Equation 24).

$$I_{x1}'(t) + I_{x2}'(t) = (I_{x1}(t) + I_{x2}(t)) + (I_{x1}(t) - I_{x2}(t))$$
$$= 2I_{x1}(t),$$

$$-Q_{x1}'(t) + Q_{x2}'(t) = -(-Q_{x1}(t) + Q_{x2}(t)) +$$
$$(Q_{x1}(t) + Q_{x2}(t))$$
$$= 2Q_{x1}(t),$$

$$-I_{x2}'(t) + I_{x1}'(t) = -(I_{x1}(t) - I_{x2}(t)) +$$
$$(I_{x1}(t) + I_{x2}(t))$$
$$= 2I_{x2}(t),$$

(Expressions 24)

$$Q_{x2}'(t) + Q_{x1}'(t) = (Q_{x1}(t) + Q_{x2}(t)) +$$
$$(-Q_{x1}(t) + Q_{x2}(t))$$
$$= 2Q_{x2}(t),$$

$$I_{y1}'(t) + I_{y2}'(t) = (I_{y1}(t) + I_{y2}(t)) +$$
$$(-I_{y1}(t) - I_{y2}(t))$$
$$= 2I_{y1}(t),$$

$$-Q_{y1}'(t) + Q_{y2}'(t) = -(-Q_{y1}(t) + Q_{y2}(t)) +$$
$$(Q_{y1}(t) + Q_{y2}(t))$$
$$= 2Q_{y1}(t),$$

$$-I_{y2}'(t) + I_{y1}'(t) = -(I_{y1}(t) - I_{y2}(t)) +$$
$$(I_{y1}(t) + I_{y2}(t))$$
$$= 2I_{y2}(t),$$

$$Q_{y2}'(t) + Q_{y1}'(t) = (Q_{y1}(t) + Q_{y2}(t)) +$$
$$(-Q_{y1}(t) + Q_{y2}(t))$$
$$= 2Q_{y2}(t)$$

Figure 30:
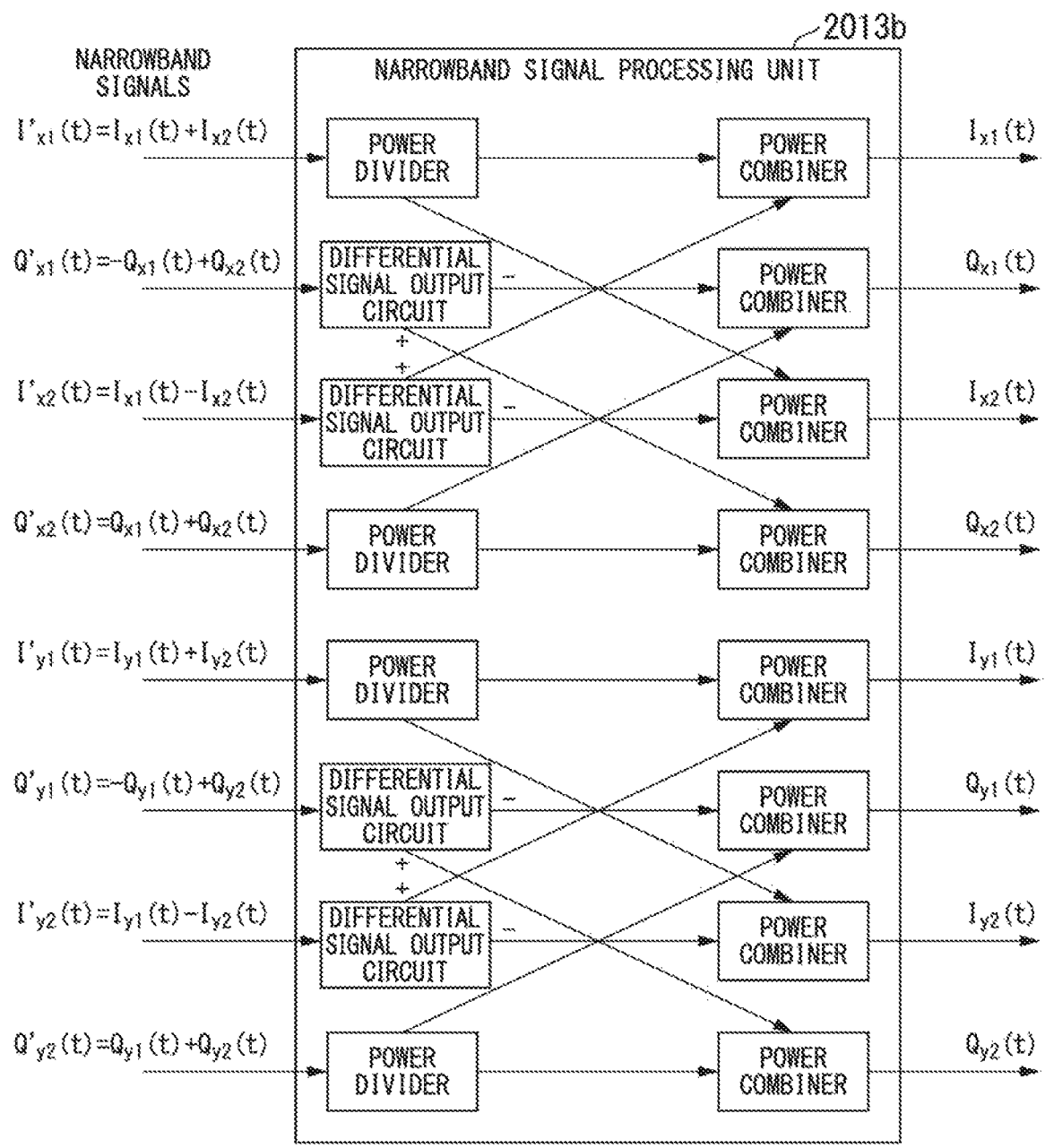
FIG. 30 is a diagram showing another configuration of the narrowband signal processing unit of the optical receiver according to the eighth embodiment of the present invention.

Also, the narrowband signal processing unit 2013 includes, for example, an analog circuit including four power dividers, eight power combiners, and four differential signal output circuits as in the narrowband signal processing unit 2013b shown in FIG. 30. Also, the narrowband signal processing unit 2013 may include another analog circuit from which an output equivalent to that of the analog circuit shown in FIG. 30 is obtained.

[Configuration of Narrowband Signal-to-Wideband Signal Conversion Unit]

Figure 31:
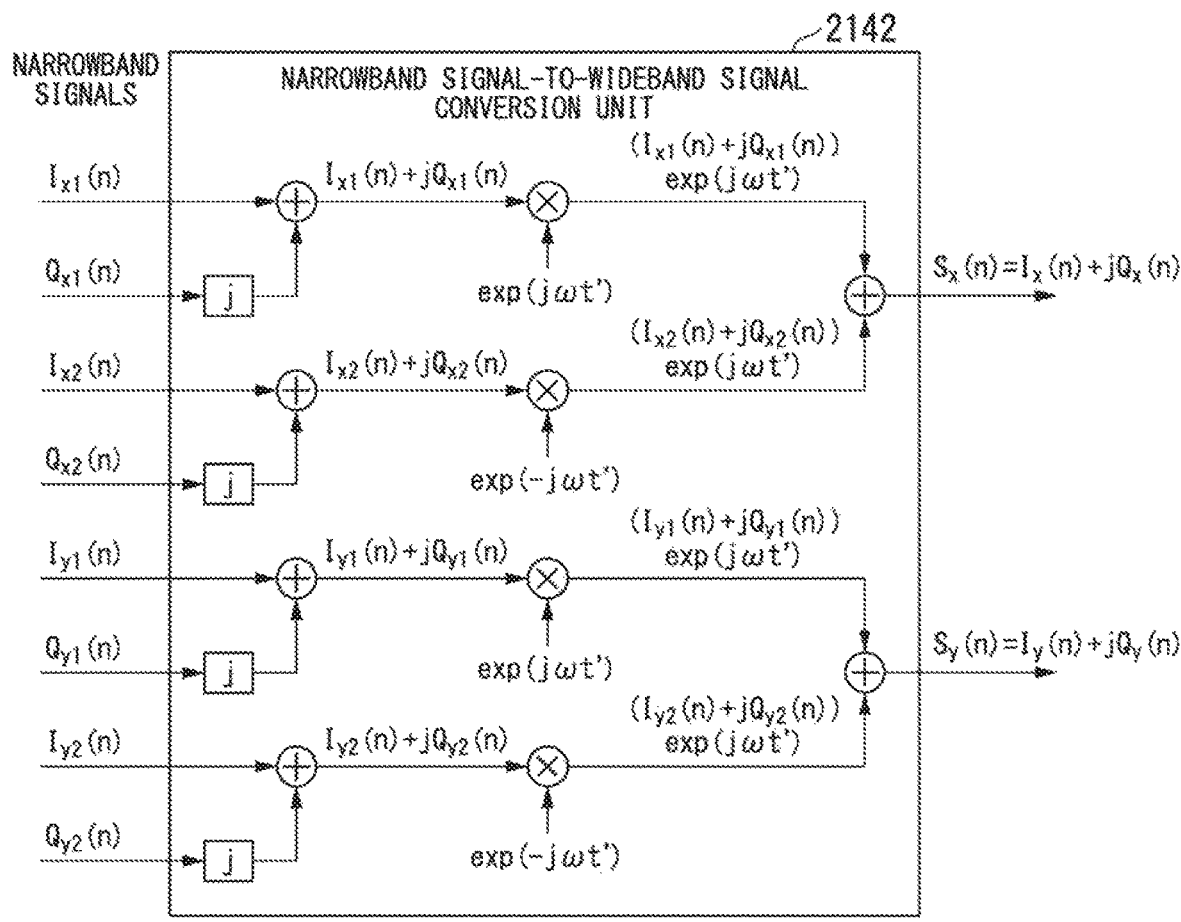
FIG. 31 is a diagram showing a configuration of a narrowband signal-to-wideband signal conversion unit of the optical receiver according to the eighth embodiment of the present invention.

FIG. 31 is a diagram showing a configuration of the narrowband signal-to-wideband signal conversion unit 2142 of the optical receiver 2001 according to the eighth embodiment of the present invention.

The narrowband signal-to-wideband signal conversion unit 2142 treats the narrowband signals (($I_{x1}(n)$, $Q_{x1}(n)$), ($I_{x2}(n)$, $Q_{x2}(n)$)), ($I_{y1}(n)$, $Q_{y1}(n)$), ($I_{y2}(n)$, $Q_{y2}(n)$)) input from the analog-to-digital conversion unit 2141 as complex digital signals ($I_{x1}(n)+jQ_{x1}(n)$, $I_{x2}(n)+jQ_{x2}(n)$, $I_{y1}(n)+jQ_{y1}(n)$, $I_{y2}(n)+jQ_{y2}(n)$).

The narrowband signal-to-wideband signal conversion unit 2142 performs a frequency shift by multiplying narrowband signals input from the analog-to-digital conversion unit 2141 by sinusoidal signals exp(jωt') and exp(−jωt'). That is, the narrowband signal-to-wideband signal conversion unit 2142 converts a frequency band of the complex digital signal ($I_{x1}'(n)+jQ_{x1}(n)$) corresponding to the upper sideband of the wideband signal ($I_x(n)+jQ_x(n)$) into a frequency band of the upper sideband. Also, the narrowband signal-to-wideband signal conversion unit 2142 converts a frequency band of the complex digital signal ($I_{x2}(n)+jQ_{x2}(n)$) corresponding to the lower sideband of the wideband signal ($I_x(n)+jQ_x(n)$) into a frequency band of the lower sideband. Also, the narrowband signal-to-wideband signal conversion unit 2142 performs a similar frequency shift on the complex digital signals ($I_{y1}(n)+jQ_{y1}(n)$) and ($I_{y2}(n)+jQ_{y2}(n)$).

The narrowband signal-to-wideband signal conversion unit 2142 performs an addition process on frequency-shifted narrowband signals (($I_{x1}(n)+jQ_{x1}(n)$)exp(jωt'), ($I_{x2}(n)+jQ_{x2}(n)$)exp(−jωt'), ($I_{y1}(n)+jQ_{y1}(n)$)exp(jωt'), ($I_{y2}(n)+jQ_{y2}(n)$)exp(−jωt')) and performs conversion into the wideband signal. That is, the narrowband signal-to-wideband signal conversion unit 2142 performs an addition process on the upper sideband signal and the lower sideband signal of the wideband signal ($I_x(n)+jQ_x(n)$), thereby obtaining the wideband signal ($I_x(n)+jQ_x(n)$). Also, the narrowband signal-to-wideband signal conversion unit 2142 performs an addition process on the upper sideband signal and the lower sideband signal of the wideband signal ($I_y(n)+jQ_y(n)$), thereby obtaining the wideband signal ($I_y(n)+jQ_y(n)$).

The narrowband signal-to-wideband signal conversion unit 2142 outputs wideband signals ($S_x(n)=I_x(n)+jQ_x(n)$, $S_y(n)=I_y(n)+jQ_y(n)$) obtained by the conversion to the waveform equalization unit 2143.

Also, in the above, t'=nT: discrete time (s: second) (n=1, 2, 3 . . . ), T=1/fs: sampling period (s: second), fs: sampling frequency (Hz), J: imaginary unit, $\omega=2\pi f$ (rad/s), f=b/4 (Hz), b: baud rate (baud=1/s).

Although the narrowband signal-to-wideband signal conversion unit 2142 treats the in-phase (I) component and the quadrature (Q) component of the narrowband signal input from the analog-to-digital conversion unit 2141 as a complex digital signal in the above process, the present invention is not limited thereto. For example, the narrowband signal-to-wideband signal conversion unit 2142 may be configured to treat IQ signal components as independent signals and perform a calculation process corresponding to complex number calculation.

When the optical receiver includes a digital signal processing device including a field-programmable gate array (FPGA) or an application specific integrated circuit (ASIC), the device may treat IQ signal components as independent signals as described above.

[Wideband Signal Reception Process (in the Case that a Received Signal is Divided into Two Signals)]

As described above, the optical receiver 2001 according to the present embodiment divides the received wideband signal into two wideband signals, shifts the bands of the two wideband signals obtained by the division to generate narrowband signals, and performs at least one of addition and subtraction processes on the two narrowband signals. The optical receiver 2001 converts the two narrowband signals on which the at least one of the addition and subtraction processes has been performed from analog signals into digital signals.

The optical receiver 2001 shifts the band of the two digital signals, which are narrowband signals, obtained by the conversion, performs an addition process on the two digital signals, and performs conversion into a wideband signal. The above-described process can be represented as follows.

The optical receiver 2001 divides the received wideband signal (I+jQ) into an upper sideband signal (($I_1+jQ_1$)exp(jωt)) and a lower sideband signal (($I_2+jQ_2$) exp(−jωt)). At this time, the received wideband signal can be represented as shown in (Expression 25). When the wideband signal is a baseband signal, the angular frequency ω corresponds to the center frequency of the upper sideband signal band, and the angular frequency −ω corresponds to the center frequency of the lower sideband signal band.

$$I + jQ = (I_1 + jQ_1)\exp(j\omega t) + \\ (I_2 + jQ_2)\exp(-j\omega t) \\ = (I_1 + I_2)\cos\omega t + (-Q_1 + Q_2)\sin\omega t + \\ j[(I_1 - I_2)\sin\omega t + (Q_1 + Q_2)\cos\omega t]$$ (Expression 25)

(Expressions 26) are obtained by multiplying the real part (Re) and the imaginary part (Im) of (Expression 25) by cos ωt and sin ωt, respectively. The signal processing represented by (Expressions 26) corresponds to the signal processing performed by the wideband signal-to-narrowband signal conversion unit 2012 shown in FIG. 27. The wideband signal-to-narrowband signal conversion unit 2012 performs signal processing represented by (Expressions 26) on complex signals ($I_x(t)$, $Q_x(t)$) and ($I_y(t)$, $Q_y(t)$) polarization-multiplexed as two wideband signals.

$$\text{Re}(I+jQ)\times\cos\omega t=(1/2)[(I_1+I_2)+(I_1+I_2)\cos 2\omega t+(-Q_1+Q_2)\sin 2\omega t],$$

$$\text{Re}(I+jQ)\times\sin\omega t=(1/2)[(-Q_1+Q_2)+(I_1+I_2)\sin 2\omega t+(Q_1-Q_2)\cos 2\omega t],$$

$$\text{Im}(I+jQ)\times\cos\omega t=(1/2)[(Q_1+Q_2)+(Q_1+Q_2)\cos 2\omega t+(I_1-I_2)\sin 2\omega t],$$

$$\text{Im}(I+jQ)\times\sin\omega t=(1/2)[(I_1-I_2)+(Q_1+Q_2)\sin 2\omega t+(-I_1+I_2)\cos 2\omega t]$$ (Expressions 26)

When the cos 2ωt and sin 2ωt in (Expressions 26) are harmonic waves outside the band range of the analog signal, when the influence of the harmonic waves can be ignored, or when the harmonic waves are removed by an LPF, the optical receiver 2001 can obtain the above-described upper and lower sideband signals as narrowband signals from the received wideband signal.

The optical receiver 2001 can individually obtain narrowband signals ($I_1+jQ_1$, $I_2+jQ_2$) by performing an addition/subtraction process on the narrowband signals.

The optical receiver 2001 performs analog-to-digital conversion on the narrowband signals ($I_1+jQ_1$) and ($I_2+jQ_2$) acquired from the received wideband signal. The optical receiver 2001 multiplies the digital signal ($I_1+jQ_1$) corresponding to the upper sideband signal by the sinusoidal signal exp(jωt). The optical receiver 2001 multiplies the digital signal ($I_2+jQ_2$) corresponding to the lower sideband signal by the sinusoidal signal exp(−jωt). The optical receiver 2001 can treat an addition result as a wideband signal (I+jQ) by performing an addition process on the digital signals ($I_1+jQ_1$) and ($I_2+jQ_2$) multiplied by the sinusoidal signals.

As described above, because the analog-to-digital conversion unit 2141 performs analog-to-digital conversion on narrowband signals obtained by dividing the wideband signal, the optical receiver 2001 can decrease an operation speed required for the analog-to-digital conversion unit 2141. The wideband signal-to-narrowband signal conversion unit 2012 and the narrowband signal processing unit 2013 for obtaining narrowband signals can be implemented using a mixer or a switch circuit that constitutes a frequency shifter, and an addition/subtraction circuit. Therefore, the optical receiver can obtain narrowband signals by dividing a wideband signal through an analog circuit of a simple configuration. According to the optical receiver 2001, it is possible to perform received signal processing using an analog-to-digital converter that operates at a frequency lower than a modulation frequency of a wideband signal obtained from an optical signal and easily increase a transmission capacity of a communication system.

Ninth Embodiment

Hereinafter, a ninth embodiment of the present invention will be described.

[Configuration of Optical Receiver]

Figure 32:
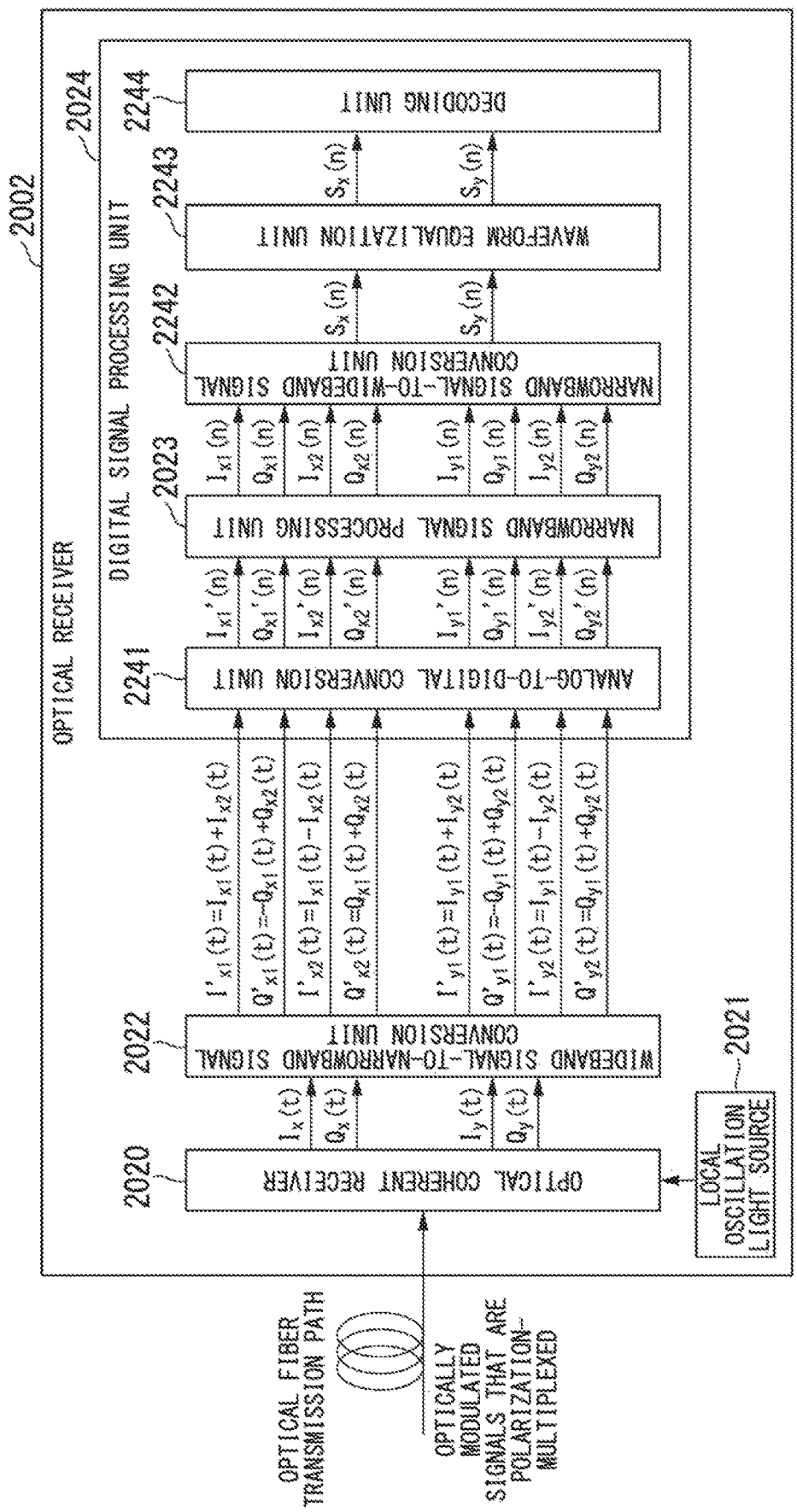
FIG. 32 is a diagram showing a configuration of an optical receiver according to a ninth embodiment of the present invention.

FIG. 32 is a diagram showing a configuration of an optical receiver 2002 according to the ninth embodiment of the present invention.

As shown in FIG. 32, the optical receiver 2002 according to the present embodiment includes a narrowband signal processing unit 2023 in the digital signal processing unit 2024, unlike the optical receiver 2001 according to the eighth embodiment shown in FIG. 26. The optical receiver 2002 according to the ninth embodiment performs an addition/subtraction process by the narrowband signal processing unit 2023 of the digital signal processing unit 2024.

As shown in FIG. 32, the optical receiver 2002 according to the ninth embodiment includes an optical coherent receiver 2020, a local oscillation light source 2021, a wideband signal-to-narrowband signal conversion unit 2022, and a digital signal processing unit 2024. Also, the digital signal processing unit 2024 includes an analog-to-digital conversion unit 2241, a narrowband signal processing unit 2023, a narrowband signal-to-wideband signal conversion unit 2242, a waveform equalization unit 2243, and a decoding unit 2244.

Also, because the configurations and operations of the optical coherent receiver 2020, the local oscillation light source 2021, the waveform equalization unit 2243, and the decoding unit 2244 are similar to those of the optical coherent receiver 2010, the local oscillation light source 2011, the waveform equalization unit 2143, and the decoding unit 2144 of the optical receiver 2001 according to the eighth embodiment described above, description thereof will be omitted.

The wideband signal-to-narrowband signal conversion unit 2022 divides the wideband signals ($I_x(t)$, $Q_x(t)$) and ($I_y(t)$, $Q_y(t)$) input from the optical coherent receiver 2010 into a plurality of wideband signals. The plurality of wideband signals includes two wideband signals in the ninth embodiment. The wideband signal-to-narrowband signal conversion unit 2012 shifts the bands of the plurality of wideband signals obtained by the division to form narrowband signals. The wideband signal-to-narrowband signal conversion unit 2012 outputs a plurality of frequency-shifted narrowband signals (($I_{x1}'(t)$, $Q_{x1}'(t)$), ($I_{x2}'(t)$, $Q_{x2}'(t)$), ($I_{y1}'(t)$, $Q_{y1}'(t)$), ($I_{y2}'(t)$, $Q_{y2}'(t)$)) to the analog-to-digital conversion unit 2241. Each narrowband signal is represented by the above-described (Expressions 23).

The analog-to-digital conversion unit 2241 converts the plurality of narrowband signals input from the wideband signal-to-narrowband signal conversion unit 2022 into digital signals. The analog-to-digital conversion unit 2241 outputs the plurality of digital signals (($I_{x1}'(n)$, $Q_{x1}'(n)$), ($I_{x2}'(n)$, $Q_{x2}'(n)$), ($I_{y1}'(n)$, $Q_{y1}'(n)$), ($I_{y2}'(n)$, $Q_{y2}'(n)$)) obtained by the conversion to the narrowband signal-to-narrowband signal processing unit 2023.

The narrowband signal processing unit 2023 receives the plurality of narrowband signals from the analog-to-digital conversion unit 2241, and performs at least one of addition and subtraction processes on the plurality of narrowband signals. The narrowband signal processing unit 2023 outputs a plurality of narrowband signals (($I_{x1}(n)$, $Q_{x1}(n)$), ($I_{x2}(n)$, $Q_{x2}(n)$), ($I_{y1}(n)$, $Q_{y1}(n)$), ($I_{y2}(n)$, $Q_{y2}(n)$)) obtained by performing the at least one of the addition and subtraction processes to the narrowband signal-to-wideband signal conversion unit 2242.

The narrowband signal-to-wideband signal conversion unit 2242 shifts the bands of the plurality of digital signals that are the narrowband signals input from the narrowband signal processing unit 2023, performs an addition process on the plurality of digital signals, and performs conversion into wideband signals. The narrowband signal-to-wideband signal conversion unit 2242 outputs the wideband signals ($S_x(n)$ and $S_y(n)$) obtained by the conversion to the waveform equalization unit 2243.

[Configuration of Narrowband Signal Processing Unit]

The narrowband signal processing unit 2023 according to the present embodiment has a configuration similar to that of the narrowband signal processing unit 2013 according to the eighth embodiment described with reference to FIG. 29.

Figure 33:
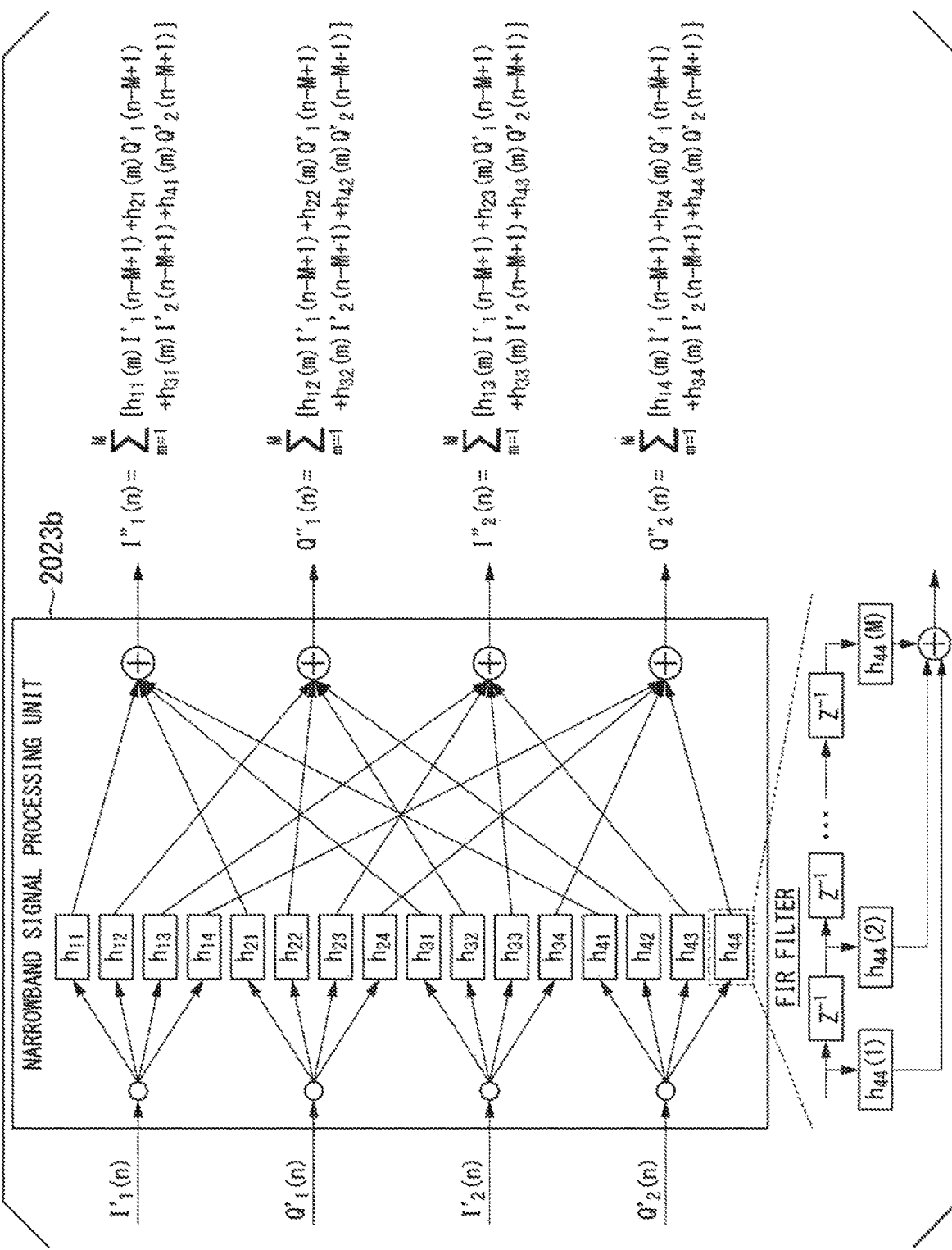
FIG. 33 is a diagram showing a configuration of a narrowband signal processing unit of the optical receiver according to the ninth embodiment of the present invention.

Also, the narrowband signal processing unit 2023 may perform pre-equalization to equalize inter-signal interference caused by device imperfections as in a narrowband signal processing unit 2023b shown in FIG. 33.

$$h_{kl} = (h_{kl}(1), h_{kl}(2), \ldots, h_{kl}(M)),$$

(k=1, 2, 3, 4; l=1, 2, 3, 4)

The above $h_{kl}$ is a tap coefficient for pre-equalization.

For example, $I_1''(n)$ corresponds to an $n^{th}$ output of convolution calculation $I_1'' = h_{11} * I_1' + h_{21} * Q_1' + h_{31} * I_2' + h_{41} * Q_2'$. This convolution calculation can be performed by the FIR filter as shown in FIG. 33.

The convolution calculation in the time domain corresponds to a product of the frequency domain. Therefore, the narrowband signal processing unit may have a configuration in which the tap coefficient and the input signal are subjected to an FFT and multiplied and then subjected to an IFFT. That is, the above-described convolution calculation may be performed in the frequency domain.

As shown in FIG. 33, the narrowband signal processing unit 2023b pre-equalizes a plurality of input narrowband signals (($I_1'(n)$, $Q_1'(n)$), ($I_2'(n)$, $Q_2'(n)$)) and outputs signals (($I_1''(n)$, $Q_1''(n)$), ($I_2''(n)$, $Q_2''(n)$)).

As shown in FIG. 33, the signals $I_1''(n)$, $Q_1''(n)$, $I_2''(n)$, and $Q_2''(n)$ are represented by (Expressions 27).

$$I_1''(n) = \Sigma^M_{m=1}\{h_{11}(m)I_1'(n-M+1) + h_{21}(m)Q_1'(n-M+1) + h_{31}(m)I_2'(n-M+1) + h_{41}(m)Q_2'(n-M+1)\},$$

$$Q_1''(n) = \Sigma^M_{m=1}\{h_{12}(m)I_1'(n-M+1) + h_{22}(m)Q_1'(n-M+1) + h_{32}(m)I_2'(n-M+1) + h_{42}(m)Q_2'(n-M+1)\},$$

$$I_2''(n) = \Sigma^M_{m=1}\{h_{13}(m)I_1'(n-M+1) + h_{23}(m)Q_1'(n-M+1) + h_{33}(m)I_2'(n-M+1) + h_{43}(m)Q_2'(n-M+1)\},$$

$$Q_2''(n) = \Sigma^M_{m=1}\{h_{14}(m)I_1'(n-M+1) + h_{24}(m)Q_1'(n-M+1) + h_{34}(m)I_2'(n-M+1) + h_{44}(m)Q_2'(n-M+1)\} \quad \text{(Expression 27)}$$

Also, only the signals (($I_1'(n)$, $Q_1'(n)$), ($I_2'(n)$, $Q_2'(n)$)) are shown in FIG. 33 as the narrowband signals input to the narrowband signal processing unit 2023b for simplicity of description in FIG. 33. However, signals ($I_{x1}''(n)$, $Q_{x1}''(n)$), ($I_{x2}''(n)$, $Q_{x2}''(n)$), ($I_{y1}''(n)$, $Q_{y1}''(n)$), ($I_{y2}''(n)$, $Q_{y2}''(n)$)) are output to the narrowband signal-to-wideband signal conversion unit 2242 because the input narrowband signals are (($I_{x1}'(n)$, $Q_{x1}'(n)$), ($I_{x2}'(n)$, $Q_{x2}'(n)$), ($I_{y1}'(n)$, $Q_{y1}'(n)$), ($I_{y2}'(n)$, $Q_{y2}'(n)$)) in the case of the narrowband signal processing unit 2023 shown in FIG. 32.

Tenth Embodiment

Hereinafter, a tenth embodiment of the present invention will be described.

[Configuration of Optical Receiver]

Figure 34:
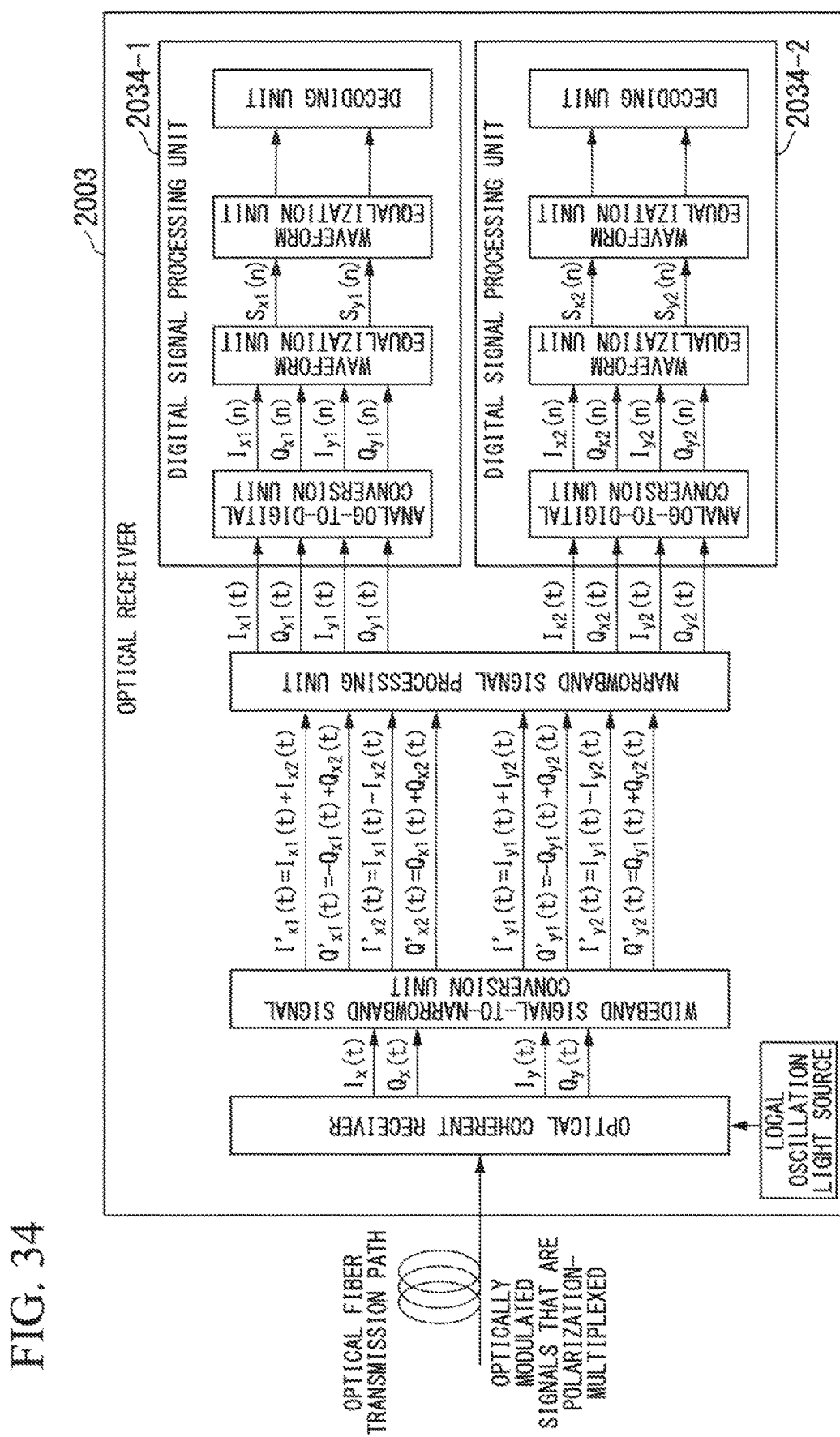
FIG. 34 is a diagram showing a configuration of an optical receiver according to a tenth embodiment of the present invention.

FIG. 34 is a diagram showing a configuration of an optical receiver 2003 according to the tenth embodiment of the present invention.

The optical receiver 2003 according to the tenth embodiment receives a wideband signal including two independent narrowband signals. The optical receiver 2003 according to the tenth embodiment has a configuration in which narrowband signals are assumed to be processed in parallel by a plurality of digital signal processors (DSPs). Thus, the optical receiver 2003 according to the tenth embodiment includes two digital signal processing units (digital signal processing units 2034-1 and 2034-2) as shown in FIG. 34. It is not necessary to provide a narrowband signal-to-wideband signal conversion unit in each digital signal processing unit. For example, the digital signal processing unit 2034-1 performs decoding on upper sideband signals (($I_{x1}$, $Q_{x1}$), ($I_{y1}$, $Q_{y1}$)) in the wideband signal. The digital signal processing unit 2034-2 performs decoding on lower sideband signals (($I_x$, $Q_{x2}$), ($I_{y2}$, $Q_{y2}$)) in the wideband signal. The optical receiver 2003 may be used for a reception process of an optically modulated signal including two transmission data sequences transmitted by the optical transmitter 6 shown in FIG. 19.

Also, the optical receiver 2003 may include three or more digital signal processing units. Although the optical receiver 2003 includes a plurality of digital signal processing units (a digital signal processing unit 2034-1 and a digital signal processing unit 2034-2) in the present embodiment, the optical receiver may has a single digital signal processing unit processes a plurality of independent narrowband signals.

Eleventh Embodiment

Hereinafter, an eleventh embodiment of the present invention will be described.

[Configuration of Optical Receiver]

Figure 35:
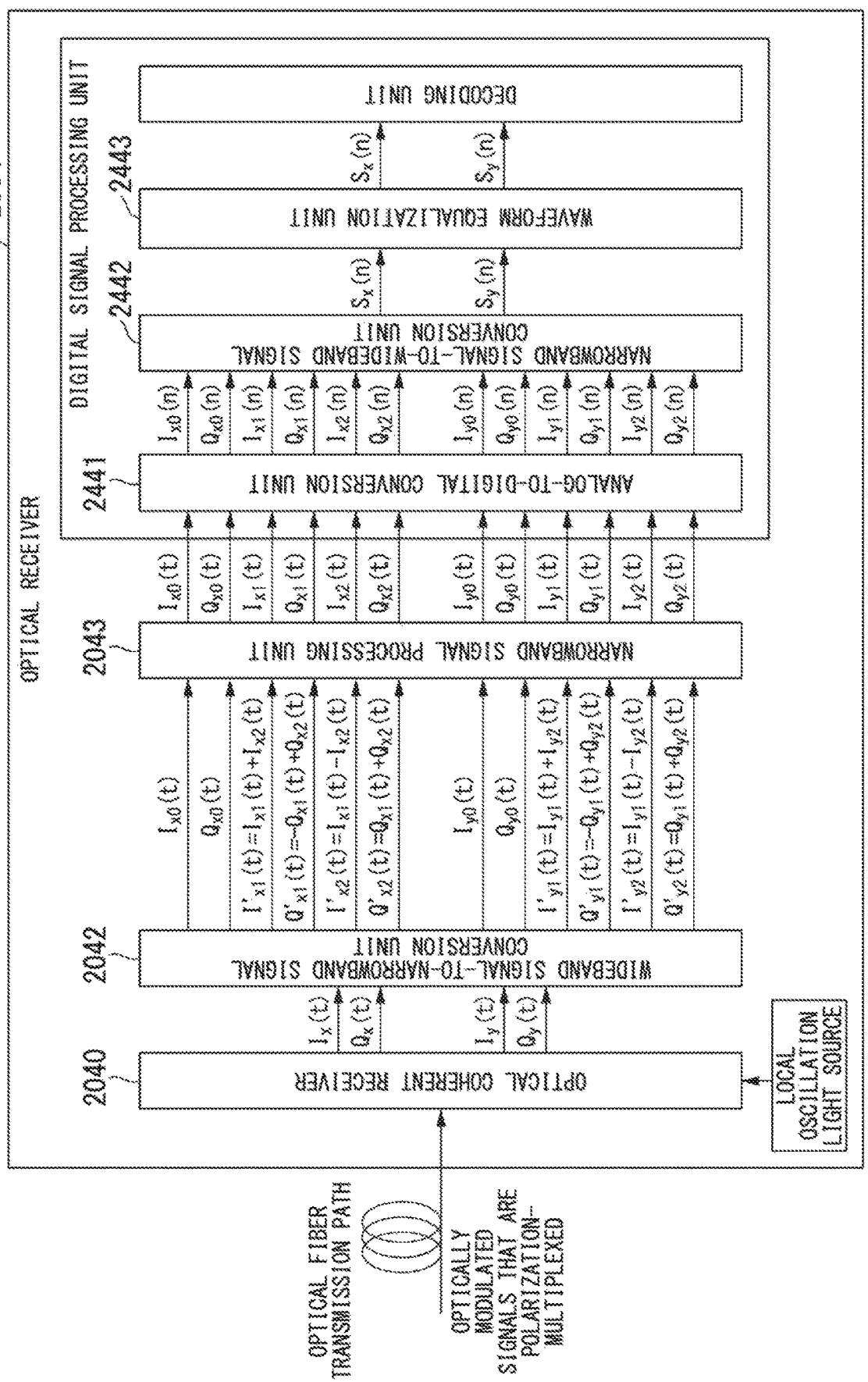
FIG. 35 is a diagram showing a configuration of an optical receiver according to an eleventh embodiment of the present invention.

FIG. 35 is a diagram showing a configuration of an optical receiver 2004 according to the eleventh embodiment of the present invention.

In the eighth, ninth, and tenth embodiments described above, the optical receiver is configured to divide a wideband signal into two narrowband signals. On the other hand, the optical receiver 2004 according to the eleventh embodiment has a configuration in which a wideband signal is divided into three narrowband signals.

[Configuration of Wideband Signal-to-Narrowband Signal Conversion Unit]

FIG. 36 is a diagram showing a configuration of a wideband signal-to-narrowband signal conversion unit 2042 of the optical receiver 2004 according to the eleventh embodiment of the present invention. The wideband signal-to-narrowband signal conversion unit 2042 divides each of the wideband signals ($I_x(t)$, $Q_x(t)$) and ($I_y(t)$, $Q_y(t)$) input from the optical coherent receiver 2040 shown in FIG. 35 into three wideband signals by a power divider. The wideband signal-to-narrowband signal conversion unit 2042 shifts the bands of two signals of the three wideband signals obtained by the division by the frequency shifter 2421 to form a narrowband signal.

The wideband signal-to-narrowband signal conversion unit 2012 removes the harmonic waves of the three narrowband signals by an LPF. Also, the LPF may be omitted when the influence of harmonic waves can be ignored, for example, such as when harmonic waves are generated outside the band range of the analog signals. Also, in the case of a system in which harmonic waves are allowed, the LPF can be omitted.

The wideband signal-to-narrowband signal conversion unit 2042 generates three signals from each of the in-phase component $I_x(t)$ and the quadrature component $Q_x(t)$ of the received wideband signal ($I_x(t)$, $Q_x(t)$). The wideband signal-to-narrowband signal conversion unit 2042 uses the LPF to generate a low band part signal ($I_{x0}(t)$) of the in-phase component $I_x(t)$ and a low band part signal ($Q_{x0}(t)$) of the quadrature component $Q_x(t)$. Also, similar to the wideband signal-to-narrowband signal conversion unit 2012, the wideband signal-to-narrowband signal conversion unit 2042 obtains narrowband signals (($I_{x1}'(t)$, $Q_{x1}'(t)$), ($I_{x2}'(t)$, $Q_{x2}'(t)$)) by multiplying the in-phase component $I_x(t)$ and the quadrature component $Q_x(t)$ by sinusoidal signals ($\cos(\omega t)$, $\sin(\omega t)$) having a phase difference of ($\pi/2$).

Also, the wideband signal-to-narrowband signal conversion unit 2042 obtains narrowband signals (($I_{y1}'(t)$, $Q_{y1}'(t)$), ($I_{y2}'(t)$, $Q_{y2}'(t)$)) by performing signal processing similar to signal processing on the wideband signal ($I_x(t)$, $Q_x(t)$) with respect to the received wideband signal ($I_y(t)$, $Q_y(t)$).

The wideband signal-to-narrowband signal conversion unit 2042 outputs narrowband signals ($I_{x0}(t)$, $I_{x1}'(t)=I_{x1}(t)+I_{x2}(t)$, $Q_{x1}'(t)=-Q_{x1}(t)+Q_{x2}(t)$, $Q_{x0}(t)$, $I_{x2}'(t)=I_{x1}(t)-I_{x2}(t)$, $Q_{x2}'(t)=Q_{x1}(t)+Q_{x2}(t)$, $I_{y0}(t)$, $I_{y1}'(t)=I_{y1}(t)+I_{y2}(t)$, $Q_{y1}'(t)=-Q_{y1}(t)+Q_{y2}(t)$, $Q_{y0}(t)$, $I_{y2}'(t)=I_{y1}(t)-I_{y2}(t)$, $Q_{y2}'(t)=Q_{y1}(t)+Q_{y2}(t)$) obtained by removing harmonic waves using the LPF to the narrowband signal processing unit 2043.

Also, a wideband signal-to-narrowband signal conversion unit 2042 may have a configuration in which a differential signal output circuit is provided within the frequency shifter 2421 as in the wideband signal-to-narrowband signal conversion unit 2012b shown in FIG. 28 in the above-described eighth embodiment.

Also, the differential signal output circuit may be provided outside the frequency shifter 2421 and in a stage previous to the wideband signal-to-narrowband signal conversion unit 2012.

Also, when the optical coherent receiver 2040 has a differential output, the differential signal output circuit can be omitted.

Also, the input signals of the switch circuit may be differential inputs.

[Configuration of Narrowband Signal Processing Unit]

Figure 37:
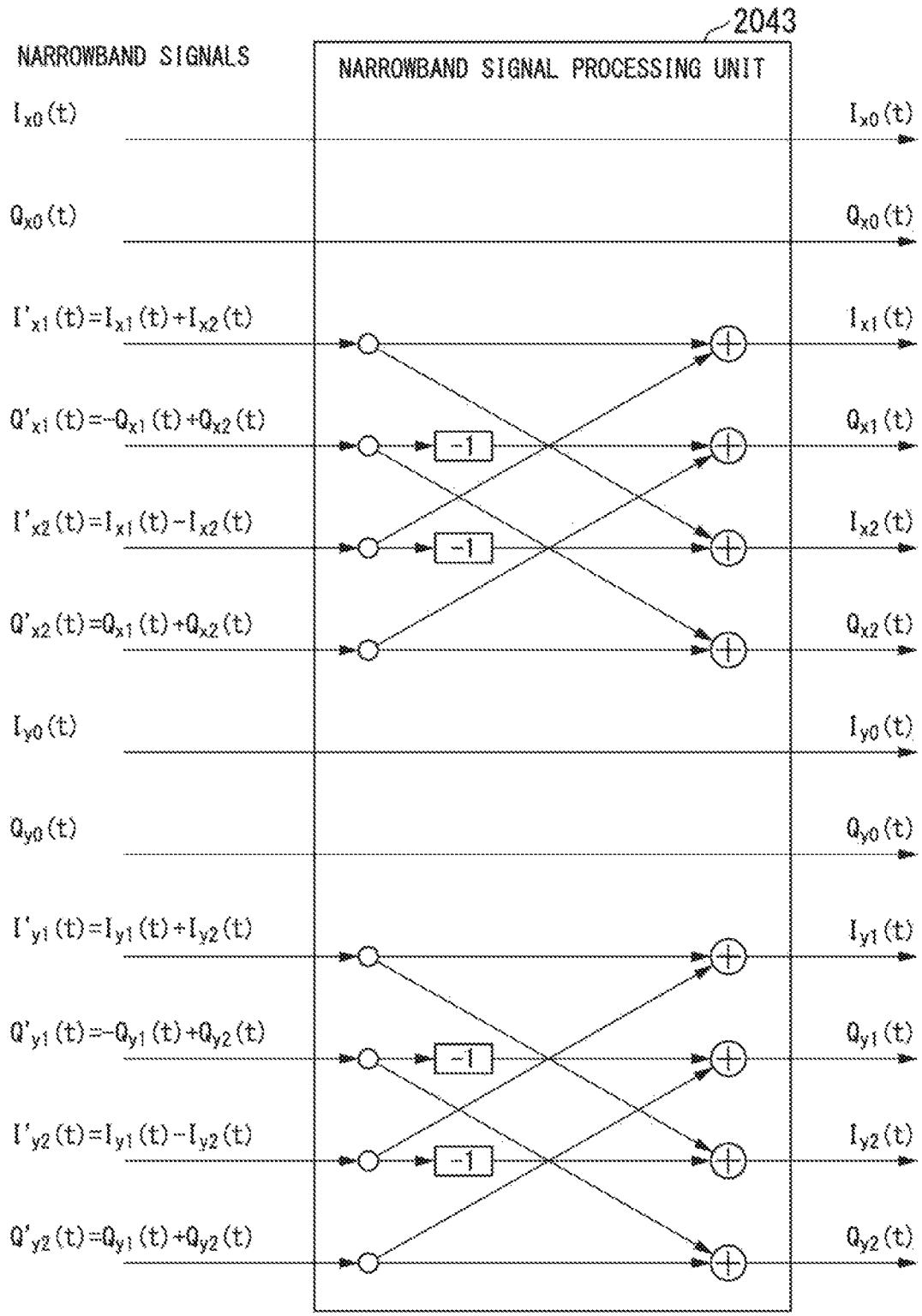
FIG. 37 is a diagram showing a configuration of a narrowband signal processing unit of the optical receiver according to an eleventh embodiment of the present invention.

FIG. 37 is a diagram showing a configuration of a narrowband signal processing unit 2043 of the optical receiver 2004 according to the eleventh embodiment of the present invention.

The narrowband signal processing unit 2043 receives the plurality of narrowband signals ($I_{x0}(t)$, $Q_{x0}(t)$, $I_{x1}'(t)=I_{x1}(t)+I_{x2}(t)$, $Q_{x1}'(t)=-Q_{x1}(t)+Q_{x2}(t)$, $I_{x2}'(t)=I_{x1}(t)-I_{x2}(t)$, $Q_{x2}'(t)=Q_{x1}(t)+Q_{x2}(t)$, $I_{y0}(t)$, $Q_{y0}(t)$, $I_{y1}'(t)=I_{y1}(t)+I_{y2}(t)$, $Q_{y1}'(t)=-Q_{y1}(t)+Q_{y2}(t)$, $I_{y2}'(t)=I_{y1}(t)-I_{y2}(t)$, $Q_{y2}'(t)=Q_{y1}(t)+Q_{y2}(t)$) input from the wideband signal-to-narrowband signal conversion unit 2042, and performs at least one of the addition and subtraction processes on the plurality of narrowband signals as shown in FIG. 37.

The narrowband signal processing unit 2043 performs addition and subtraction processes shown in (Expressions 24) as in the narrowband signal processing unit 2013 with respect to narrowband signals ($I_{x1}'(t)$, $Q_{x1}'(t)$), ($I_{x2}'(t)$, $Q_{x2}'(t)$) among a plurality of narrowband signals that have been input. The narrowband signal processing unit 2043 obtains a signal ($I_{x1}$(t), $Q_{x1}$(t)) included in an upper sideband and a signal ($I_{x2}$(t), $Q_{x2}$(t)) included in a lower sideband among three bands into which a band of a wideband signal ($I_x$(t), $Q_x$(t)) is divided, according to the addition and subtraction processes. Also, the narrowband signal processing unit 2043 performs addition and subtraction processes shown in (Expressions 24) as in the narrowband signal processing unit 2013 with respect to narrowband signals ($I_{y1}$'(t), $Q_{y1}$'(t)), ($I_{y2}$'(t), $Q_{y2}$'(t)) among a plurality of narrowband signals that have been input. The narrowband signal processing unit 2043 obtains a signal ($I_{y1}$(t), $Q_{y1}$(t)) included in an upper sideband and a signal ($I_{y2}$(t), $Q_{y2}$(t)) included in a lower sideband among three bands into which a band of a wideband signal ($I_y$(t), $Q_y$(t)) is divided, according to the addition and subtraction processes.

The narrowband signal processing unit 2043 outputs a plurality of narrowband signals (($I_{x0}$(t), $Q_{x0}$(t)), ($I_{x1}$(t), $Q_{x1}$(t)), ($I_{x2}$(t), $Q_{x2}$(t)), $I_{y0}$(t), $Q_{y0}$(t)), ($I_{y1}$(t), $Q_{y1}$(t)), ($I_{y2}$(t), $Q_{y2}$(t))) obtained by performing at least one of the addition and subtraction processes to the analog-to-digital conversion unit 2441 shown in FIG. 35.

Also, the narrowband signal processing unit 2043 includes an analog circuit as in the narrowband signal processing unit 2013*b* shown in FIG. 30 in the above-described eighth embodiment. Also, the analog circuit may have any configuration capable of obtaining an equivalent output.

[Configuration of Narrowband Signal-to-Wideband Signal Conversion Unit]

Figure 38:
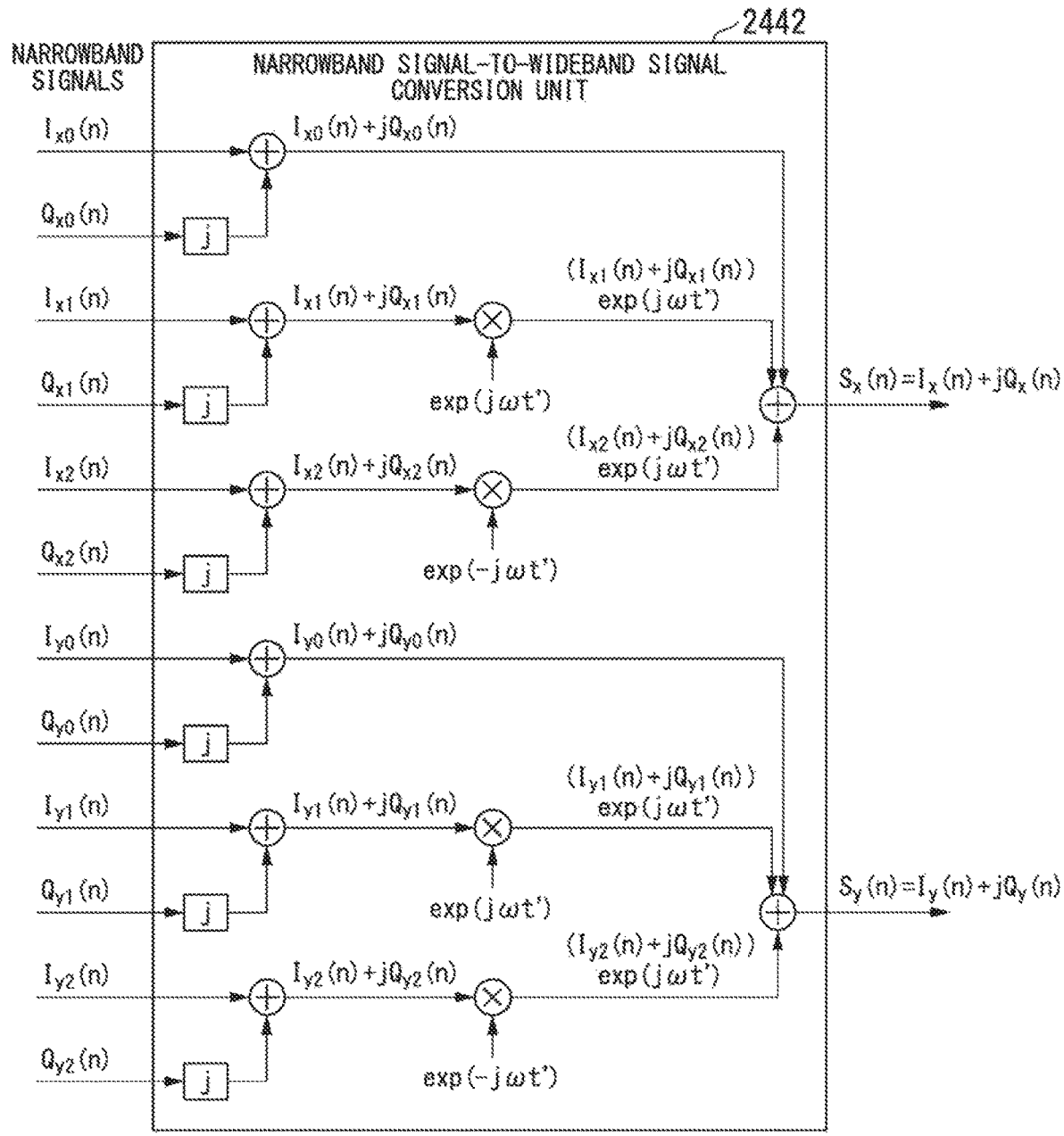
FIG. 38 is a diagram showing a configuration of a narrowband signal-to-wideband signal conversion unit of the optical receiver according to the eleventh embodiment of the present invention.

FIG. 38 is a diagram showing a configuration of the narrowband signal-to-wideband signal conversion unit 2442 of the optical receiver 2004 according to the eleventh embodiment of the present invention.

The narrowband signal-to-wideband signal conversion unit 2442 treats narrowband signals (($I_{x0}$(n), $Q_{x0}$(n)), ($I_{x1}$(n), $Q_{x1}$(n)), ($I_{x2}$(n), $Q_{x2}$(n)), ($I_{y0}$(n), $Q_{y0}$(n)), ($I_{y1}$(n), $Q_{y1}$(n)), ($I_{y2}$(n), $Q_{y2}$(n))) input from the analog-to-digital conversion unit 2441 as complex digital signal ($I_{x0}$(n)+j$Q_{x0}$(n), $I_{x1}$(n)+j$Q_{x1}$(n), $I_{x2}$(n)+j$Q_{x2}$(n), $I_{y0}$(n)+j$Q_{y0}$(n), $I_{y1}$(n)+j$Q_{y1}$(n), $I_{y2}$(n)±j$Q_{y2}$(n)).

The narrowband signal-to-wideband signal conversion unit 2442 performs a frequency shift by multiplying ($I_{x1}$(n)+j$Q_{x1}$(n), $I_{x2}$(n)+j$Q_{x2}$(n), $I_{y1}$(n)+j$Q_{y1}$(n), $I_{y2}$(n)+j$Q_{y2}$(n)) among the narrowband signals input from the analog-to-digital conversion unit 2441 by sinusoidal signals exp(jωt') and exp(−jωt').

The narrowband signal-to-wideband signal conversion unit 2442 performs an addition process on frequency-shifted narrowband signals (($I_{x0}$(n), $Q_{x0}$(n)), ($I_{x1}$(n)+j$Q_{x1}$(n))exp(jωt'), ($I_{x2}$(n)+j$Q_{x2}$(n))exp(jωt')) and (($I_{y0}$(n), $Q_{y0}$(n)), ($I_{y1}$(n)+j$Q_{y1}$(n))exp(jωt'), ($I_{y2}$(n)+j$Q_{y2}$(n))exp(jωt')) and performs conversion into a wideband signal.

The narrowband signal-to-wideband signal conversion unit 2442 outputs wideband signals ($S_x$(n)=$I_x$(n)+j$Q_x$(n), $S_y$(n)=$I_y$(n)+j$Q_y$(n)) obtained by the conversion to the waveform equalization unit 2443 shown in FIG. 35.

Also, in the above, t'=nT: discrete time (s: second) (n=1, 2, 3 . . . ), T=1/fs: sampling period (s: second), fs: sampling frequency (Hz), J: imaginary unit, ω=2πf (rad/s), f=b/4 (Hz), b: baud rate (baud=1/s).

[Wideband Signal Reception Process (in Case that a Received Signal is Divided into Three Signals)]

As described above, the optical receiver 2004 according to the present embodiment divides the band of the received wideband signal into three bands, and obtains signals of the three bands. The optical receiver 2004 performs a frequency shift in which the center frequency of the band is close to 0 Hz with respect to the signal included in the upper sideband of the wideband signal and the signal included in the lower sideband of the wideband signal among the signals of the three bands. The optical receiver 2004 obtains three narrowband signals, i.e., a signal corresponding to a central part of the band of the wideband signal and two frequency-shifted signals, according to the band division and the frequency shift. Division into wideband signals is performed, the bands of two of three wideband signals obtained by the division are shifted to form narrowband signals, and at least one of addition and subtraction processes on the narrowband signals is performed. The optical receiver 2004 converts three narrowband signals subjected to at least one of the addition and subtraction processes from analog signals to digital signals.

The optical receiver 2004 shifts the bands of two signals of the three converted digital signals (which are narrowband signals) obtained by the conversion, performs an addition process on the three digital signals, and performs conversion into a wideband signal. The above-described process can be represented as follows.

The optical receiver 2004 divides the band of the wideband signal (I+jQ) into, for example, three bands. Among the signals of the three bands obtained by the division, a signal having a high-frequency band is set as a signal (($I_1$+j$Q_1$)exp(j2ωt)) of a first band, a signal having a low-frequency band is set as a signal ($I_2$+j$Q_2$)exp(−j2ωt)) of a second band, and a signal having a band between the first band and the second band is set as a signal ($I_0$+j$Q_0$) of a third band. In this case, the received wideband signal can be represented as shown in (Expression 28) using signals of the first, second, and third bands.

$$I + jQ = I_0 + jQ_0 + (I_1 + jQ_1)\exp(j2\omega t) + \quad \text{(Expression 28)}$$
$$(I_2 + jQ_2)\exp(-j2\omega t)$$
$$= I_0 + jQ_0 + (I_1 + I_2)\cos 2\omega t +$$
$$(-Q_1 + Q_2)\sin 2\omega t +$$
$$j[(I_1 - I_2)\sin 2\omega t + (Q_1 + Q_2)\cos 2\omega t]$$

(Expressions 29) are obtained by multiplying the real part (Re) and the imaginary part (Im) of the above expression by cos 2ωt and sin 2ωt, respectively. The signal processing represented by (Expression 28) and (Expressions 29) corresponds to the signal processing performed by the wideband signal-to-narrowband signal conversion unit 2042 shown in FIG. 36. The wideband signal-to-narrowband signal conversion unit 2042 performs signal processing represented by (Expression 28) and (Expressions 29) on complex signals ($I_x$(t), $Q_x$(t)) and ($I_y$(t), $Q_y$(t)) polarization-multiplexed as two wideband signals.

Re(I+jQ)×cos ωt=(1/2)[($I_1$+$I_2$)+($I_1$+$I_2$)cos 4ωt+(−$Q_1$+$Q_2$)sin 4ωt]+$I_0$ cos 2ωt, Re(I+jQ)×sin ωt=(1/2)[(−$Q_1$+$Q_2$)+($I_1$+$I_2$)sin 4ωt+(−$Q_1$−$Q_2$)cos 4ωt]+$I_0$ sin 2ωt, Im(I+jQ)×cos ωt=(1/2)[($Q_1$+$Q_2$)+($Q_1$+$Q_2$)cos 4ωt+($I_1$−$I_2$)sin 4ωt]+$Q_0$ cos 2ωt, Im(I+jQ)×sin ωt=(1/2)[($I_1$−$I_2$)+($Q_1$+$Q_2$)sin 4ωt+(−$I_1$+$I_2$)cos 4ωt]+$I_0$ cos 2ωt  (Expressions 29)

When the terms cos 4ωt, sin 4ωt, cos 2ωt, and sin 2ωt in (Expressions 29) are harmonic waves outside the band range of the analog signal, when the influence of the harmonic waves can be ignored, or when the harmonic waves are removed by an LPF, the optical receiver 2004 can obtain signals of three bands (i.e., a first band, a second band, and a third band) obtained by the division in the above as narrowband signals obtained by dividing the wideband signal.

The optical receiver 2004 can individually obtain narrowband signals ($I_1+jQ_1$, $I_2+jQ_2$) by performing addition and subtraction processes on the narrowband signals of the first and second bands.

In the optical receiver 2004, the narrowband signal-to-wideband signal conversion unit 2442 performs a frequency shift by multiplying the narrowband signals ($I_1+jQ_1$) and ($I_2+jQ_2$) by sinusoidal signals $\exp(j\omega t)$ and $\exp(-j\omega t)$ in digital signal processing. The narrowband signal-to-wideband signal conversion unit 2442 shifts the band of the digital signal ($I_1+jQ_1$) to the upper sideband by multiplying the digital signal ($I_1+jQ_1$) corresponding to the signal of the first band by the sinusoidal signal $\exp(j\omega t)$. The optical receiver 2004 shifts the band of the digital signal ($I_2+jQ_2$) to the lower sideband by multiplying the digital signal ($I_2+jQ_2$) corresponding to the signal of the second band by the sinusoidal signal $\exp(-j\omega t)$. That is, a frequency shift opposite to the frequency shift by the wideband signal-to-narrowband signal conversion unit 2042 is performed. The narrowband signal-to-wideband signal conversion unit 2442 performs an addition process on the frequency-shifted digital signals (($I_1+jQ_1$) and ($I_2+jQ_2$)) of the first and second bands and the digital signal ($I_0+jQ_0$) of the third band and obtains an addition result as a wideband signal (I+jQ).

<Wideband Signal Reception Process (Extension to 2N or (2N+1) Divisions)>

Also, as described above, the optical receivers according to the eighth to tenth embodiments of the present invention divide a wideband signal into two narrowband signals (two divisions), perform analog-to-digital conversion, and convert the two narrowband signals converted into digital signals into a wideband signal. As described above, the optical receiver 2004 according to the eleventh embodiment of the present invention divides a wideband signal into three narrowband signals (three divisions), performs analog-to-digital conversion, and converts the three narrowband signals converted into digital signals into a wideband signal.

In the present invention, as will be described below, the optical receiver can also be expanded to divide the received wideband signal into 2N (2, 4, 6, or the like) narrowband signals. Also, the optical receiver can also be expanded to divide the wideband signal into 2N+1 (3, 5, 7, or the like) narrowband signals.

When a reception process is performed by dividing a wideband signal into 2N signals, the received wideband signal (I+jQ) can be represented as shown in (Expression 30).

$$I + jQ = \sum_k [(I_{2k-1} + jQ_{2k-1})\exp(j(2k-1)\omega t) + \quad \text{(Expression 30)}$$
$$(I_{2k} + jQ_{2k})\exp(-j(2k-1)\omega t)]$$
$$= \sum_k \{(I_{2k-1} + I_{2k})\cos(2k-1)\omega t +$$
$$(-Q_{2k-1} + Q_{2k})\sin(2k-1)\omega t +$$
$$j[(I_{2k-1} - I_{2k})\sin(2k-1)\omega t +$$
$$(Q_{2k-1} + Q_{2k})\cos(2k-1)\omega t]\}$$

The optical receiver can obtain narrowband signals $I_{2k-1}+I_{2k}$, $-Q_{2k-1}+Q_{2k}$, $I_{2k-1}-I_{2k}$, and $Q_{2k-1}+Q_{2k}$ by multiplying the real part (Re) and the imaginary part (Im) of the wideband signal shown in (Expression 30) by $\cos(2k-1)\omega t$ and $\sin(2k-1)\omega t$, respectively, and applying the LPF to remove harmonic waves. The optical receiver can individually obtain the narrowband signals ($I_{2k-1}+jQ_{2k-1}$, $I_{2k}+jQ_{2k}$) by performing addition and subtraction processes on these narrowband signals. The addition and subtraction processes on the narrowband signals are the addition and subtraction processes shown in (Expressions 24). $I_{x1}'(t)$, $I_{x2}'(t)$, $Q_{x1}'(t)$, and $Q_{x2}'(t)$ in (Expressions 24) correspond to $I_{2k-1}$, $I_{2k}$, $Q_{2k-1}$, and $Q_{2k}$.

When a wideband signal is divided into (2N+1) signals to perform the reception process, the received wideband signal (HQ) can be represented as shown in (Expression 31).

$$I + jQ = I_0 + jQ_0 + \sum_k [(I_{2k-1} + jQ_{2k-1})\exp(j2k\omega t) + \quad \text{(Expression 31)}$$
$$(I_{2k} + Q_{2k})\exp(-j2k\omega t)]$$
$$= I_0 + jQ_0 + \sum_k \{(I_{2k-1} + I_{2k})\cos 2k\omega t +$$
$$(-Q_{2k-1} + Q_{2k})\sin 2k\omega t +$$
$$j[(I_{2k-1} - I_{2k})\sin 2k\omega t +$$
$$(Q_{2k-1} + Q_{2k})\cos 2k\omega t]\}$$

The optical receiver can obtain narrowband signals $I_{2k-1}+I_{2k}$, $-Q_{2k-1}+Q_{2k}$, $I_{2k-1}-I_{2k}$, $Q_{2k-1}+Q_{2k}$ by multiplying the real part (Re) and imaginary part (Im) of the wideband signal represented by (Expression 31) by $\cos 2k\omega t$ and $\sin 2k\omega t$, respectively, and applying the LPF to remove the harmonic waves. The optical receiver can obtain the narrowband signals ($I_{2k-1}+jQ_{2k-1}$, $I_{2k}+jQ_{2k}$) individually by performing the addition and subtraction processes on these narrowband signals. The addition and subtraction processes for the narrowband signals are the addition and subtraction processes shown in (Expressions 24). $I_{x1}'(t)$, $I_{x2}'(t)$, $Q_{x1}'(t)$, and $Q_{x2}'(t)$ in (Expressions 24) correspond to $I_{2k-1}$, $I_{2k}$, $Q_{2k-1}$, and $Q_{2k}$. Also, the optical receiver can individually obtain the narrowband signals $I_0$ and $Q_0$ by simply applying the LPF to the received signal.

As described above, according to the optical receiver of the present invention, it is possible to divide a high-speed signal (wideband signal) into a plurality of low-speed signals (narrowband signals) in an analog signal processing manner. Specifically, the high-speed signal can be divided into low-speed signals with a simple configuration using a frequency shifter (for example, a switch circuit or the like) and an addition/subtraction circuit.

Thereby, according to the optical receiver of the present invention, the modulation speed can be increased without being limited to the band of the ADC.

Also, as described above, according to the optical receiver of the present invention, the wideband signal can be expanded so that 2N divisions (2 divisions, 4 divisions, 6 divisions, or the like) or (2N+1) divisions (3 divisions, 5 divisions, 7 divisions, or the like) can be received.

Furthermore, according to the optical receiver of the present invention, when a high-speed signal is generated from a low-speed signal, a mechanism for equalizing the deterioration of signal quality caused by imperfection of an analog device of an ADC or a combining unit can also be provided.

Figure 39:
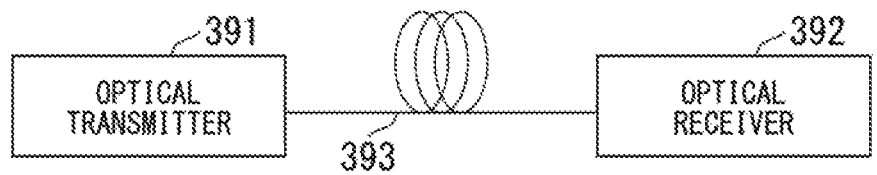
FIG. 39 is a diagram showing a configuration of an optical communication system according to a twelfth embodiment of the present invention.

A twelfth embodiment of the present invention will be described below. FIG. 39 is a diagram showing a configuration of a communication system according to the twelfth embodiment. The communication system according to the twelfth embodiment includes an optical transmitter 391, an optical receiver 392, and an optical fiber 393 serving as a transmission path. The optical transmitter 391 generates an optically modulated signal from a transmission data sequence and outputs the optically modulated signal that has been generated to the optical fiber 393. The optically modulated signal is transmitted to the optical receiver 392 through the optical fiber 393. The optical receiver 392 decodes the transmission data sequence from the optically modulated signal that has been received. Any of the optical transmitters according to the first to seventh embodiments can be used as the optical transmitter 391. Any of the optical receivers according to the eighth to eleventh embodiments can be used as the optical receiver 392. The communication system in which the optical transmitter and the optical receiver described in the embodiments are combined can decrease the operation speed of the digital-to-analog converter and the analog-to-digital converter and easily increase the transmission capacity by a configuration using a simple analog circuit.

According to the optical transmitter of the present invention, a first narrowband signal processing unit (103, 203, 303, 403, or 703) inputs a first narrowband signal ($I_1'(n)$, $Q_1'(n)$) and a second narrowband signal ($I_2'(n)$, $Q_2'(n)$) output from a band division unit and outputs a first signal ($I_1''(t)$) representing a sum of in-phase components of the first and second narrowband signals, a second signal ($Q_1''(t)$) representing a difference between quadrature components of the first and second narrowband signals, a third signal ($I_2''(t)$) representing a difference between the in-phase components of the first and second narrowband signals, and a fourth signal ($Q_2''(t)$) representing a sum of the quadrature components of the first and second narrowband signals. It is possible to minimize an image component generated in the frequency shift when the wideband signal generation unit generates the wideband signal according to the addition and subtraction processes by the first narrowband signal processing unit. Because the first narrowband signal processing unit and the wideband signal generation unit can be implemented using a mixer or a switch circuit that constitutes a frequency shifter and an addition/subtraction circuit, a wideband signal can be generated from a narrowband signal with a simple analog circuit. According to the optical transmitter, transmission signal processing can be performed using a digital-to-analog converter that operates at a frequency lower than a modulation frequency of the wideband signal output as the optically modulated signal and the transmission capacity of the communication system can be easily increased.

According to the optical receiver of the present invention, a first signal conversion unit (the wideband signal-to-narrowband signal conversion unit 2012, 2022, or 2042) divides a band of a wideband signal and outputs a fifth narrowband signal ($1_{x1}'(t)$) representing a sum of in-phase components of a fifth signal ($1_{x1}(t)$, $Q_{x1}(t)$) corresponding to a band included in an upper sideband among bands obtained by the division and a sixth signal ($1_{x2}(t)$, $Q_{x2}(t)$) corresponding to a band included in a lower sideband, a sixth narrowband signal ($Q_{x1}'(t)$) representing a difference between quadrature components of the fifth and sixth signals, a seventh narrowband signal ($1_{x2}'(t)$) representing a difference between the in-phase components of the fifth and sixth signals, and an eighth narrowband signal ($Q_{x2}'(t)$) representing a sum of the quadrature components of the fifth and sixth signals. It is possible to obtain signals of bands obtained by the division according to the addition and subtraction processes on the fifth, sixth, seventh and eighth narrowband signals by the second narrowband signal processing unit (2013, 2023, or 2043). Because the first signal conversion unit and the second narrowband signal processing unit can be implemented using a mixer or switch circuit that constitutes a frequency shifter, and an addition/subtraction circuit, it is possible to generate signals of bands obtained by the division from a wideband signal with an analog circuit having a simple configuration. According to an optical receiver, it is possible to process a received signal using an analog-to-digital converter that operates at a frequency lower than the modulation frequency of a wideband signal obtained by demodulating an optically modulated signal that has been received and easily increase the transmission capacity of a communication system.

Although embodiments of the present invention have been described above in detail with reference to the drawings, specific configurations are not limited to the embodiments and other designs and the like are also included without departing from the scope of the present invention.

INDUSTRIAL APPLICABILITY

The present invention can be applied to a field of application in which the transmission capacity is required to be easily extended.

REFERENCE SIGNS LIST 1, 2, 3, 4, 5, 6, 7, 391 Optical transmitter
10, 20, 30, 70 Digital signal processing unit
11, 21, 31, 41, 71 Wideband signal generation unit
12, 22, 32, 72 Optical modulator
13, 23, 33, 73 Signal light source
101, 201, 301, 701 Signal generation unit
102, 202, 702 Band division unit
103, 203, 303, 403, 703 Narrowband signal processing unit
104, 204, 304, 704 Digital-to-analog conversion unit
393 Optical fiber
1021, 7021 Band division filter
1022 Frequency shifter
392, 2001, 2002, 2003, 2004 Optical receiver
2010, 2040 Optical coherent receiver
2011 Local oscillation light source
2012, 2022, 2042 Wideband signal-to-narrowband signal conversion unit
2013, 2023, 2043 Narrowband signal processing unit
2014, 2034 Digital signal processing unit
2121 Frequency shifter
2122 Low pass filter (LPF)
2141, 2441 Analog-to-digital conversion unit
2142, 2442 Narrowband signal-to-wideband signal conversion unit
2143, 2443 Waveform equalization unit
2144 Decoding unit
2211 Differential signal output circuit
2212 Switch circuit

The invention claimed is:

1. An optical transmitter comprising:
a band divider configured to divide a band of a signal obtained by modulating a transmission data sequence and output a first transmission-side signal corresponding to a band included in an upper sideband among bands obtained by the division and a second transmission-side signal corresponding to a band included in a lower sideband among the bands obtained by the division;
a digital-to-analog converter configured to convert the first and second transmission-side signals from digital signals to analog signals to generate a third transmission-side signal and a fourth transmission-side signal;
a first narrowband signal processor configured to input the third transmission-side signal and the fourth transmission-side signal and output first, second, third and fourth transmission-side narrowband signals, the first transmission-side narrowband signal representing a sum of in-phase components of the third and fourth transmission-side signals, the second transmission-side narrowband signal representing a difference between quadrature components of the third and fourth transmission-side signals, the third transmission-side narrowband signal representing a difference between the in-phase components of the third and fourth transmission-side signals, and the fourth transmission-side narrowband signal representing a sum of the quadrature components of the third and fourth transmission-side signals;
a wideband signal generator configured to multiply the first and second transmission-side narrowband signals by sinusoidal signals having a phase difference of ($\pi/2$), respectively, to shift bands of the first and second transmission-side narrowband signals, and combine the shifted first and second transmission-side narrowband signals to generate a first wideband signal, the wideband signal generator being configured to multiply the third and fourth transmission-side narrowband signals by sinusoidal signals having a phase difference of ($\pi/2$), respectively, to shift bands of the third and fourth transmission-side narrowband signals, and combine the shifted third and fourth transmission-side narrowband signals to generate a second wideband signal; and
an optical modulator configured to modulate an optical signal using the first and second wideband signals and output the modulated optical signal.

2. The optical transmitter according to claim 1, wherein the signal obtained by modulating the transmission data sequence has only an in-phase component or a quadrature component.

3. The optical transmitter according to claim 1, wherein the optical modulator is configured to perform polarization multiplexing on an optically modulated signal subjected to modulation using the first and second wideband signals with another optically modulated signal and outputs a polarization-multiplexed signal.

4. An optical transmitter comprising:
a band divider configured to divide a band of a signal obtained by modulating a transmission data sequence, output a signal corresponding to a band included in an upper sideband among bands obtained by the division as a first transmission-side signal, and output a signal corresponding to a band included in a lower sideband among the bands obtained by the division as a second transmission-side signal;
a first narrowband signal processor configured to input the first transmission-side signal and the second transmission-side signal and output first, second, third and fourth transmission-side narrowband signals, the first transmission-side narrowband signal representing a sum of in-phase components of the first and second transmission-side signals, the second transmission-side narrowband signal representing a difference between quadrature components of the first and second transmission-side signals, the third transmission-side narrowband signal representing a difference between the in-phase components of the first and second transmission-side signals, and the fourth transmission-side narrowband signal representing a sum of the quadrature components of the first and second transmission-side signals;
a digital-to-analog converter configured to convert the first, second, third, and fourth transmission-side narrowband signals from digital signals to analog signals, and output the first, second, third, and fourth transmission-side narrowband signals that have been converted into analog signals;
a wideband signal generator configured to multiply the converted first and second transmission-side narrowband signals by sinusoidal signals having a phase difference of ($\pi/2$), respectively, to shift bands of the converted first and second transmission-side narrowband signals, and combine the shifted first and second transmission-side narrowband signals to generate a first wideband signal, the wideband signal generator being configured to multiply the converted third and fourth transmission-side narrowband signals by sinusoidal signals having a phase difference of ($\pi/2$), respectively, to shift bands of the converted third and fourth transmission-side narrowband signals, and combine the shifted third and fourth transmission-side narrowband signals to generate a second wideband signal; and
an optical modulator configured to modulate an optical signal using the first and second wideband signals and output the modulated optical signal.

5. The optical transmitter according to claim 4, wherein the optical modulator is configured to perform polarization multiplexing on an optically modulated signal subjected to modulation using the first and second wideband signals with another optically modulated signal and outputs a polarization-multiplexed signal.

6. An optical transmitter comprising:
a first digital signal processor configured to convert a signal obtained by modulating a first transmission data sequence from a digital signal to an analog signal to generate a first transmission-side signal;
a second digital signal processor configured to convert a signal obtained by modulating a second transmission data sequence from a digital signal to an analog signal to generate a second transmission-side signal;
a first narrowband signal processor configured to input the first transmission-side signal and the second transmission-side signal and output first, second, third and fourth transmission-side narrowband signals, the first transmission-side narrowband signal representing a sum of in-phase components of the first and second transmission-side signals, the second transmission-side narrowband signal representing a difference between quadrature components of the first and second transmission-side signals, the third transmission-side narrowband signal representing a difference between the in-phase components of the first and second transmission-side signals, and the fourth transmission-side narrowband signal representing a sum of the quadrature components of the first and second transmission-side signals;

a wideband signal generator configured to multiply the first and second transmission-side narrowband signals by sinusoidal signals having a phase difference of ($\pi$/2), respectively, to shift bands of the first and second transmission-side narrowband signals, and combine the shifted first and second transmission-side narrowband signals to generate a first wideband signal, the wideband signal generator being configured to multiply the third and fourth transmission-side narrowband signals by sinusoidal signals having a phase difference of ($\pi$/2), respectively, to shift bands of the third and fourth transmission-side narrowband signals, and combine the shifted third and fourth transmission-side narrowband signals to generate a second wideband signal; and an optical modulator configured to modulate an optical signal using the first and second wideband signals and output the modulated optical signal.

7. The optical transmitter according to claim 6, wherein the optical modulator is configured to perform polarization multiplexing on an optically modulated signal subjected to modulation using the first and second wideband signals with another optically modulated signal and outputs a polarization-multiplexed signal.

8. An optical receiver comprising:
a receiver configured to receive an optically modulated signal and output a wideband signal obtained from the optically modulated signal;
a first signal converter configured to divide a band of the wideband signal and output first, second, third, and fourth reception-side narrowband signals, the first reception-side narrowband signal representing a sum of in-phase components of a first reception-side signal corresponding to a band included in an upper sideband among bands obtained by the division and a second reception-side signal corresponding to a band included in a lower sideband, the second reception-side narrowband signal representing a difference between quadrature components of the first and second reception-side signals, the third reception-side narrowband signal representing a difference between the in-phase components of the first and second reception-side signals, and the fourth reception-side narrowband signal representing a sum of the quadrature components of the first and second reception-side signals;
an analog-to-digital converter configured to convert the first, second, third, and fourth reception-side narrowband signals from analog signals to digital signals, and output the first, second, third, and fourth reception-side narrowband signals that have been converted into digital signals; and
a second narrowband signal processor configured to generate a third reception-side signal representing the in-phase components of the first and second reception-side signals according to addition and subtraction processes of the converted first reception-side narrowband signal and the converted third reception-side narrowband signal and generate a fourth reception-side signal representing the quadrature components of the first and second reception-side signals according to addition and subtraction processes of the converted second reception-side narrowband signal and the converted fourth reception-side narrowband signal.

9. The optical receiver according to claim 8, wherein the receiver is configured to acquire the optically modulated signal from a plurality of optically modulated signals that are polarization-multiplexed.

10. A communication system comprising:
an optical transmitter comprising:
a first narrowband signal processor configured to input a first signal and a second signal and output first, second, third and fourth narrowband signals, the first narrowband signal representing a sum of in-phase components of the first and second signals, the second narrowband signal representing a difference between quadrature components of the first and second signals, the third narrowband signal representing a difference between the in-phase components of the first and second signals, and the fourth narrowband signal representing a sum of the quadrature components of the first and second signals;
a wideband signal generator configured to multiply the first and second narrowband signals by sinusoidal signals having a phase difference of ($\pi$/2), respectively, to shift bands of the first and second narrowband signals, and combine the shifted first and second narrowband signal to generate a first wideband signal, the wideband signal generator being configured to multiply the third and fourth narrowband signal by sinusoidal signals having a phase difference of ($\pi$/2), respectively, to shift bands of the third and fourth narrowband signals, and combine the shifted third and fourth narrowband signals to generate a second wideband signal; and
an optical modulator configured to modulate an optical signal using the first and second wideband signals and output the modulated optical signal, and
an optical receiver comprising:
a receiver configured to receive the modulated optical signal and output a wideband signal obtained from the modulated optical signal;
a first signal converter configured to divide a band of the wideband signal and output fifth, sixth, seventh and eighth narrowband signals, the fifth narrowband signal representing a sum of in-phase components of a fifth signal corresponding to a band included in an upper sideband among bands obtained by the division and a sixth signal corresponding to a band included in a lower sideband, the sixth narrowband signal representing a difference between quadrature components of the fifth and sixth signals, the seventh narrowband signal representing a difference between the in-phase components of the fifth and sixth signals, and the eighth narrowband signal representing a sum of the quadrature components of the fifth and sixth signals; and
a second narrowband signal processor configured to generate a seventh signal representing the in-phase components of the fifth and sixth signals according to addition and subtraction processes of the fifth narrowband signal and the seventh narrowband signal and generate an eighth signal representing the quadrature components of the fifth and sixth signals according to addition and subtraction processes of the sixth narrowband signal and the eighth narrowband signal.

* * * * *